US006904263B2

(12) United States Patent
Grudnitski et al.

(10) Patent No.: US 6,904,263 B2
(45) Date of Patent: Jun. 7, 2005

(54) METHOD AND SYSTEM FOR INTERACTIVE CASE AND VIDEO-BASED TEACHER TRAINING

(76) Inventors: Paul Grudnitski, 19401 Hinsdale Ave., Torrance, CA (US) 90503; Gail Hood, 2502 5th St., Santa Monica, CA (US) 90405; Aisha Sims, 7217 Hannum Ave., Culver City, CA (US) 90230; Jim Stigler, 2356 Valleyfield Ave., Thousand Oaks, CA (US) 90360

( * ) Notice: Subject to any disclaimer, the term of this patent is extended or adjusted under 35 U.S.C. 154(b) by 238 days.

(21) Appl. No.: 09/922,223

(22) Filed: Aug. 1, 2001

(65) Prior Publication Data

US 2003/0027121 A1 Feb. 6, 2003

(51) Int. Cl.⁷ .............................. G09B 5/00; G09B 3/00
(52) U.S. Cl. ..................... 434/308; 434/322; 434/350; 434/118
(58) Field of Search ................................ 434/219, 118, 434/322, 350, 308; 706/927

(56) References Cited

U.S. PATENT DOCUMENTS 6,086,382 A  *  7/2000  Thomas ...................... 434/323
6,091,930 A  *  7/2000  Mortimer et al. ........... 434/362
6,099,320 A  *  8/2000  Papadopoulos .............. 434/322
6,336,029 B1 *  1/2002  Ho et al. ..................... 434/362
6,464,505 B1 * 10/2002  Pocock ........................ 434/219
6,599,130 B2 *  7/2003  Moehrle ...................... 434/365

* cited by examiner

*Primary Examiner*—Joe H. Cheng
*Assistant Examiner*—Cameron Saadat

(57) ABSTRACT

A method and system for interactive case and video-based teacher training is provided. The invention includes a server portion 200 and a client portion 202. A media database 100, a video assignment or video assessment database 102, an administration database 104, and a user database 106 interact with a computer system 108 and with a lesson-builder program 114 and a lesson viewer program 116 in order to allow for the development of time-indexed video case-centric lessons and courses, which are stored in a lesson database 110. The computer system 108 communicates with a plurality of client computers 206 via a browser program 208, allowing teacher-users or general users to interact with the lesson-builder program 114 and the lesson viewer program 116 for the creation and use of lessons. The lessons generated and used in the present invention are video-centric, and the present invention provides for the use of time-coded or time-indexed references to relevant portions of the video.

42 Claims, 41 Drawing Sheets

Tasks — 1900

Add / Edit a Task

Task Name: — 1902

Description: — 1904

Task Type: ● Question / Answer — 1908
○ Marking Codes

View Responses: ● Restrict to Viewing Own Responses Only — 1910
○ View All

Applies To: ● Only This Lesson — 1914
○ All Lessons and Cases
○ Selected Lessons and/or Cases Available To: ● All Users — 1912
○ Selected Groups Attachments: ○ Yes. Allow users to attach documents — 1916
● No. Do not allow users to attach documents

[ SAVE TASK ]  [ CANCEL ] — 1918

Forums

Add / Edit a Forum

Forum Name:

Forum Type:
- ● Free Discussion – Users can add topics and/or respond to topics crated by others.
- ○ Guided Discussion – Only the forum owner can crate new topics. Users are able to respond to the pre-created topics.

Description:

Applies To:
- ● Only This Lesson
- ○ All Lessons and Cases
- ○ Selected Lessons and/or Cases

Available To:
- ○ All Users
- ● Selected Groups

ACO4061000Builders
ACO4061000Builders 1
ACO4061000Commentary

[SAVE] [CANCEL]

Fig. 22

METHOD AND SYSTEM FOR INTERACTIVE CASE AND VIDEO-BASED TEACHER TRAINING

TECHNICAL FIELD

The present invention relates to computer-based educational systems. More particularly, it relates to an interactive, case-based system for video-centric professional development of teachers and other professionals.

BACKGROUND

For years, U.S. schools and children have lagged behind international standards in reading, arithmetic, and other areas of academic achievement. American schools are in dire need of improvement, and education is increasingly becoming a top priority. Although nearly every state in the country is developing higher standards for what students should be learning, along with means for assessing student progress, most of the solutions to-date have been quick-fixes with no noticeable long-term impact.

Most efforts undertaken to improve education fail because they are student-focused, rather than being directed to impact the quality of teaching inside classrooms. Teachers are not incompetent, but the methods they use are severely limited, and the system of instruction currently used has no means in place for self-improvement. Thus, often it is the teaching technique, rather than the teachers that must be improved.

Studies such as the Third International Mathematics and Science Study (TIMSS) have observed teaching techniques in several cultures in order to learn about effective classroom teaching styles in order to help refocus educational reform efforts. In order to improve teaching styles and efforts, a forum must be provided to enable teachers to engage in career-long learning. Classrooms must become laboratories for teacher improvement. If provided with a method for improving their lesson plans and classroom time usage, teachers can change the way in which students learn. With improved capability for delivering multimedia content, modern computer networks can serve as a delivery means for facilitating teacher improvement.

Computer-based education systems are known in the art, and have made major technical advances in recent years, especially with the advent of the Internet as a cross-platform communication means. One of the first and most well-known systems can be found in U.S. Pat. No. 3,405,457, titled "Versatile Display Teaching System" to Bitzer. In this system, a plurality of display stations serve as terminals which interact with a mainframe computer to display educational materials and to allow the user to interact with the mainframe via an input device such as a keyboard.

Much progress and specialization has been made in the years since the development the invention covered by U.S. Pat. No. 3,405,457. As processing costs have dropped and computer-networking equipment has become faster and more reliable, so have educational software products. More recent systems incorporate multimedia systems as well as high-speed networks such as the Internet, in which students may connect to an educational server system through phone lines as well as through network connections such as T1, cable connections, and ADSL. Many modern computer-based educational systems emphasize interactivity and group communication to allow students and teachers to interact in real-time. An example of a system that allows a teacher to interact with students who are geographically remote may be found in U.S. Pat. No. 5,437,555.

More recently, the personal computer has become a highly saturated general-purpose tool with a great deal of processing power. By coupling the power of the personal computer with the communication capabilities offered by the Internet, many colleges have begun offering online study courses in which students interact with one-another and with teachers via common communication channels available on the Internet such as chat rooms, e-mail, and other messaging systems, and with educational materials presented in the form of web pages.

Computer-based education systems have helped to address logistical drawbacks associated with the traditional classroom, in which all students were expected to be physically present to receive instruction at one time. By divorcing the requirement of physical presence and, in some cases, the need for simultaneous presence, modern computer-based education systems allow for the education of many students who otherwise may be unable to attend.

Despite their advantages, until recently computer-based education systems required specialized software, and in some cases specialized hardware. More recently, computer-based education systems have begun to embrace the Internet as a cross-platform medium to avoid the need for costly and specialized software and hardware. An example of a computer-based education system which uses the Internet as an information transport means may be found in U.S. Pat. No. 6,149,411, titled "Computer-Based Educational System", which also uses the Internet as a stockpile of reference material with which teachers may enhance their coursework for students.

Although computer-based educational systems have been adapted to address many of the logistical problems associated with the need for a physical classroom, their improvements have been student-centered. They ignore the fact that the traditional classroom has been, and still is, the means by which the majority of students are taught. Currently, there is a need for an interactive, case-based system for professional development of teachers. Because it should be geared toward improving the teaching skills of teachers, it is desirable that it incorporate multimedia content such as video cases of teachers giving lessons to students in order to allow a user-teacher to observe the classroom behavior of both the teacher and the students. It is equally important to incorporate video content into assessments or exercises (assignments) in order to allow teacher mentors to measure the effectiveness of such interactive, case-based teacher professional development systems in assisting user-teachers in the observation of classroom behavior of teachers and students.

It is an object of the present invention to provide such a system. Other more specific objects will be apparent to one of ordinary skill in the art in light of the disclosure provided herein.

SUMMARY

The present invention provides an interactive, case-based system for video-centric professional development of users by teacher-users, the interactive system comprising a computer system including a processor for executing programs and a memory for storing programs, with the computer system having at least one display and an input element. The computer system further includes a media database for storing at least one time-indexed digital video case, optionally at least one time-indexed text track (preferably a transcript of the contents of the video case) with each time-indexed text track corresponding to a digital video case (potentially serving as a time-coded subtitle track for a lesson video), and with the time-indexes of the text track corresponding to time-indexes of the digital video case; the media database further, and optionally, including a time-indexed table of contents for each digital video case, time-indexed digital resources relevant to each digital video case, and time-indexed commentary or reflections relevant to each digital video case; a video assignment database for storing time-indexed video case exercises and time-indexed video case user responses; an administration database for storing user access permissions and system settings; a user database for storing time-indexed personal user notes and lesson reflections; and a lesson database for storing lessons including a combination of items from the media database, the video assignment database, and the administration database that are organized to create a video-based lesson, and for storing groups of related lessons as courses. The system incorporates a lesson building program for allowing a teacher-user to combine elements from the media database, the video assignment database, and the administration database to create a case-based video lesson and video assignment therefrom and to store the lessons within the lesson database, the lesson building program further allowing the teacher-user to add elements to (e.g., text tracks, resources, commentaries, table of contents elements, etc.), to delete elements from, and to alter elements within the media database, the video assignment database, and the administration database; the lesson building program further allowing the teacher-user to organize lessons and exercises (e.g., exercises posed to a user or other exercises) to create courses and video assignments, each including a plurality of lessons. Further included in the system is a lesson viewer program for allowing a user to view and navigate through the courses and lessons to select a lesson to perform, to navigate through and view the elements of the lesson to perform, and to provide input into the video assignments in the form of time-indexed video case user responses to exercises and to view, create, and edit time-indexed video case entries into a notebook of personal user notes.

In a network-oriented embodiment, the present invention provides an interactive, case-based system for video-centric professional development of users by teacher-users, the interactive system, wherein the interactive system comprises a computer network including a server system and at least one client system, with the server system and each respective client system including a processor for executing programs, a memory for storing programs, and input and output devices for interconnecting the server system and client systems. At least one of the server system and client systems includes at least one display for providing output to a user and a user input device. The server system of the network-oriented embodiment further includes a media database for storing at least one time-indexed digital video case, at least one time-indexed text track case (potentially serving as a time-coded subtitle track for a lesson video), with each text track corresponding to a digital video case, and with the time-indexes in the text track corresponding to time-indexes of the digital video case; the media database further, and optionally, including a time-indexed table of contents for each digital video case, time-indexed digital resources relevant to each digital video case, and time-indexed commentary relevant to each digital video case; a video assignment database for storing time-indexed video case exercises and time-indexed video case user responses; an administration database for storing user access permissions and system settings; a user database for storing time-indexed video case personal user notes and reflections; and a lesson database for storing lessons including a combination of items from the media database, the video assignment database, and the administration database that are organized to create a video-based lesson, and for storing groups of related lessons as courses. The network-oriented embodiment further includes a lesson building program for allowing a teacher-user to combine elements from the media database, the video assignment database, and the administration database to create a case-based video lesson therefrom and to store the lessons within the lesson database, the lesson building program further allowing the teacher-user to add elements (e.g., text tracks, resources, commentaries, table of contents elements, etc.) to, to delete elements from, and to alter elements within the media database, the video assignment database, and the administration database; the lesson building program further allowing the teacher-user to organize lessons and exercises to create courses, each including a plurality of lessons The client computers in the network-oriented embodiment further include a lesson viewer program for allowing a user to view and navigate through the courses and lessons to select a lesson to perform, to navigate through and view the elements (e.g., text tracks, resources, commentaries, table of contents elements, etc.) of the lesson to perform, and to provide input into the video assignments in the form of time-indexed video case exercises and time-indexed video case user responses to exercises and to view, create, and edit entries into a notebook of time-indexed video case personal user notes and reflections.

In another embodiment, extending the network-oriented embodiment, the interactive, case-based system for video-centric professional development of teacher-users, further includes a web server system for serving lessons to the client computers, and the lesson viewer program on the client computers is a web browser.

In a further embodiment, the digital video cases are stored locally on the client systems to minimize the information transfer across the network during lessons. This feature assists by conserving network bandwidth.

In a still further embodiment, the digital video cases are provided on a storage medium selected from the group consisting of hard disks, optical disks, magnetic disks, and magnetic tapes.

In yet another embodiment of the present invention, the digital video cases are downloaded from the server system onto the client systems so that they may be played back locally during lessons.

In another embodiment, the server system further comprises a video and index builder, whereby a teacher-user can build a time-indexed text track, time-indexed digital resources, time-indexed commentaries, and a time-coded table of contents for a time-coded digital video case.

In still another embodiment, the interactive, case-based system for video-centric professional development of teacher-users further includes means for uploading digital video cases, time-indexed text track, and time-indexed tables of contents, time-indexed digital resources, and time-indexed commentaries from the client computers to the server computer for use by a teacher-user in creating a lesson.

In a yet further embodiment, the lesson exercises or video assignments include requests for user input in the form of time-indexed exercises and answers, wherein the lesson exercises may be configured to allow user responses to be viewable only by the user or by a plurality of users and to be applicable to only one lesson or to a plurality of lessons, and wherein lesson exercises can optionally accommodate the use of file attachments to allow for uploading supplemental information from the client systems to the server system.

Another embodiment of the present invention provides a client system for an interactive, case-based system for video-centric professional development of users by teacher-users, wherein the interactive system includes a server system including a processor for executing programs, a memory for storing programs, and input and output devices for connecting with at least one client system, the server system further including a media database for storing at least one time-indexed digital video case, at least one time-indexed text track with each text track corresponding to a digital video case, and with the time-indexes in the text track corresponding to time-indexes of the digital video case; the media database further, and optionally, including a time-indexed table of contents for each digital video case, time-indexed digital resources relevant to each digital video case, and time-indexed commentary relevant to each digital video case; a video assignment database for storing time-indexed video case exercises and time-indexed video case user responses thus providing at least one lesson exercise for a user to perform and at least one workbook to store user responses to the lesson exercise; an administration database for storing user access permissions and system settings; a user database for storing personal time-indexed video case user notes; and a lesson database for storing lessons including a combination of items from the media database, the video assignment database, and the administration database that are organized to create a video-based lesson, and for storing groups of related lessons as courses; and a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons. The client computer in this embodiment includes a computer system including a processor for executing programs, a memory for storing programs, input and output devices for communicating with the server system, and at least one display for providing output to a user and a user input device; a lesson viewer program for allowing a user to view and navigate through the courses and lessons to select a lesson to perform, to navigate through and view the elements of the lesson to perform, and to provide input into the video assignments in the form of time-indexed video case user responses to exercises and to view, create, and edit time-indexed video case entries into a notebook of personal user notes.

In a further embodiment of the client system for an interactive, case-based system for video-centric professional development of teacher-users, the digital video cases are stored locally on the client systems to minimize the information transfer across the network during lessons. Again, this feature allows for conservation of bandwidth.

A further embodiment of the present invention provides a client system for an interactive, case-based system for video-centric professional development of teacher-users as previously described, where the digital video cases are provided on a storage medium selected from the group consisting of hard disks, optical disks, magnetic disks, and magnetic tapes.

In a still further embodiment, in the client system for an interactive, case-based system for video-centric professional development of teacher-users, the digital video cases are downloaded from the server system onto the client systems so that they may be played back locally during lessons.

In another embodiment of the present invention, the client system for an interactive, case-based system for video-centric professional development of teacher-users further includes means for uploading digital video cases, time-coded text tracks, time-coded indexes, and time-coded tables of contents from the client computers to the server computer for use by a teacher-user in creating a lesson.

In a further embodiment, in the client system for an interactive, case-based system for video-centric professional development of teacher-users, the lesson exercises or video assignments include requests for user input in the form of time-indexed video case exercises and time-indexed video case answers, wherein the lesson assignments may be configured to allow time-indexed video case user responses to be viewable only by the user or by a plurality of users and to be applicable to only one lesson or to a plurality of lessons, and wherein lesson exercises can optionally accommodate the use of file attachments to allow for uploading answers from the client systems to the server system. In a further embodiment, the present invention provides a server system for an interactive, case-based system for video-centric professional development of users by teacher-users, wherein the interactive system includes at least one client system, each client system including a processor for executing programs, a memory for storing programs, input and output devices for connecting with the server system, a display for providing output to a user, a user input device, and a lesson viewer program for allowing a user to view and navigate through the courses and lessons to select a lesson to perform, to navigate through and view the elements of the lesson to perform, and to provide input into the video assignments in the form of time-indexed video case user responses to exercises and to view, create, and edit time-indexed video case entries into a notebook of personal user notes. The server system in this embodiment includes a computer including a including a processor for executing programs, a memory for storing programs, and input and output devices for interconnecting the server system and client systems. The server system further includes a media database for storing at least one time-indexed digital video case, at least one time-indexed text track with each text track corresponding to a digital video case, and with the time-indexes in the text track corresponding to time-indexes of the digital video case; the media database further, and optionally, including a time-indexed table of contents for each digital video case, resources relevant to each digital video case, and commentary relevant to each digital video case; a video assignment database for storing at least one lesson exercise for a user to perform and at least one workbook to store user responses to the lesson exercise; an administration database for storing user access permissions and system settings; a user database for storing personal user notes; and a lesson database for storing lessons including a combination of items from the media database, the video assignment database, and the administration database that are organized to create a video-based lesson, and for storing groups of related lessons as courses. Further included is a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons.

In a further embodiment, in the server system for an interactive, case-based system for video-centric professional development of teacher-users, the server system further includes a web server system for serving lessons to the client computers, and wherein the lesson viewer program on the client computers is a web browser.

In a still further embodiment, in the server system for an interactive, case-based system for video-centric professional development of teacher-users, the digital video cases are stored locally on the client systems to minimize the information transfer across the network during lessons.

In another embodiment, in the server system for an interactive, case-based system for video-centric professional development of teacher-users, the digital video cases are provided on a storage medium selected from the group consisting of hard disks, optical disks, magnetic disks, and magnetic tapes.

In yet another embodiment, in the server system for an interactive, case-based system for video-centric professional development of teacher-users, the digital video cases are downloaded from the server system onto the client systems so that they may be played back locally during lessons.

In still another embodiment of the present invention, in the server system for an interactive, case-based system for video-centric professional development of teacher-users, the server system further comprises a video and index builder, whereby a teacher-user can build a time-coded text track, a time-coded index, and a time-coded table of contents for a time-coded digital video case.

In a further embodiment of the present invention, the server system for an interactive, case-based system for video-centric professional development of teacher-users further includes means for uploading digital video cases, time-coded text tracks, time-coded indexes, and time-coded tables of contents from the client computers to the server computer for use by a teacher-user in creating a lesson.

In another embodiment, the present invention provides an interactive, case-based method for providing video-centric professional development of users by teacher-users, the method comprising the steps of:
  a. providing a computer system including a processor for executing programs and a memory for storing programs, with the computer system having at least one display and an input element;
  b. providing a media database on the computer system for storing at least one time-indexed digital video case, at least one time-indexed text track with each text track corresponding to a digital video case, and with the time-indexes of the text track corresponding to time-indexes of the digital video case; the media database further, and optionally, including a time-indexed table of contents for each digital video case, resources relevant to each digital video case, and commentary relevant to each digital video case;
  c. providing a video assignment database consisting of time-indexed video case exercises and time-indexed video case user responses on the computer system for storing at least one lesson exercise for a user to perform and at least one workbook to store user responses to the lesson exercise;
  d. providing an administration database on the computer system for storing user access permissions and system settings;
  e. providing a user database on the computer system for storing time-indexed video case personal user notes; and providing a lesson database on the computer system for storing lessons including a combination of items from the media database, the video assignment database, and the administration database that are organized to create a video-based lesson, and for storing groups of related lessons as courses;
  f. providing a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons; and
  g. providing a lesson viewer program for allowing a user to view and navigate through the courses and lessons to select a lesson to perform, to navigate through and view the elements of the lesson to perform, and to provide input into the video assignments in the form of time-indexed video case user responses to exercises and to view, create, and edit entries into a notebook of time-indexed video case personal user notes.

In another embodiment of the present invention, the method includes the steps of providing a computer network including a server system and at least one client system, with the server system and each respective client system including a processor for executing programs, a memory for storing programs, and input and output devices for interconnecting the server system and client systems, with at least one of the server system and client systems including at least one display for providing output to a user and a user input device. A further step includes providing, on the server system, a media database for storing at least one time-indexed digital video case, at least one time-indexed text track with each text track corresponding to a digital video case, and with the time-indexes in the text track corresponding to time-indexes of the digital video case; the media database further, and optionally, including a time-indexed table of contents for each digital video case, resources relevant to each digital video case, and commentary relevant to each digital video case; a video assignment database for storing time-indexed video case exercises and time-indexed video case user responses thus providing at least one lesson exercise for a user to perform and at least one workbook to store user responses to the lesson exercise; an administration database for storing user access permissions and system settings; a user database for storing time-indexed video case personal user notes; and a lesson database for storing lessons including a combination of items from the media database, the video assignment database, and the administration database that are organized to create a video-based lesson, and for storing groups of related lessons as courses. The method further includes the step of providing a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons; and a step of providing on the client computers a lesson viewer program for allowing a user to view and navigate through the courses and lessons to select a lesson to perform, to navigate through and view the elements of the lesson to perform, and to provide input into the video assignments in the form of time-indexed video case responses to exercises and to view, create, and edit entries into a notebook of time-indexed video case personal user notes.

In a further embodiment, the interactive, case-based method for video-centric professional development of teacher-users, further includes the step of providing the server system with a web server system for serving lessons to the client computers, wherein the lesson viewer program provided on the client computers is a web browser.

In still another embodiment, in the interactive, case-based method for video-centric professional development of teacher-users, the digital video cases are stored locally on the client systems to minimize the information transfer across the network during lessons.

In yet another embodiment, in the interactive, case-based method for video-centric professional development of teacher-users, the digital video cases are provided on a storage medium selected from the group consisting of hard disks, optical disks, magnetic disks, and magnetic tapes.

In a still further embodiment, in the interactive, case-based method for video-centric professional development of teacher-users, the digital video cases may be downloaded from the server system onto the client systems so that they can be played back locally during lessons.

In another embodiment, the interactive, case-based method for video-centric professional development of teacher-users further includes the step of providing the server system with a video and index builder, whereby a teacher-user can build a time-coded text track, a time-coded index, and a time-coded table of contents for a time-coded digital video case.

In still another embodiment, the interactive, case-based method for video-centric professional development of teacher-users further includes the step of providing means for uploading digital video cases, time-coded text tracks, time-coded indexes, and time-coded tables of contents from the client computers to the server computer for use by a teacher-user in creating a lesson.

In another embodiment, in the interactive, case-based method for video-centric professional development of teacher-users, the lesson exercises include requests for user input in the form of time-indexed video case exercises and time-indexed video case user responses and marking codes, wherein the lesson exercises may be configured to allow time-indexed video case user responses to be viewable only by the user or by a plurality of users and to be applicable to only one lesson or to a plurality of lessons, and wherein lesson exercises can optionally accommodate the use of file attachments to allow for uploading answers from the client systems to the server system.

The present invention further includes a method of providing a client system for an interactive, case-based system for video-centric professional development of users by teacher-users, wherein the interactive system includes a server system including a processor for executing programs, a memory for storing programs, and input and output devices for connecting with at least one client system, the server system further including a media database for storing at least one time-indexed digital video case, at least one time-indexed text track with each text track corresponding to a digital video case, and with the time-indexes in the text track corresponding to time-indexes of the digital video case; the media database further, and optionally, including a time-indexed table of contents for each digital video case, resources relevant to each digital video case, and commentary relevant to each digital video case; a video assignment database for storing time-indexed video case exercises and time-indexed video case user responses thus providing at least one lesson exercise for a user to perform and at least one workbook to store time-indexed video case user responses to the lesson exercise; an administration database for storing user access permissions and system settings; a user database for storing time-indexed video case personal user notes; and a lesson database for storing lessons including a combination of items from the media database, the video assignment database, and the administration database that are organized to create a video-based lesson, and for storing groups of related lessons as courses; and a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons, wherein the method of providing the client system comprising the steps of: providing a computer system including a processor for executing programs, a memory for storing programs, input and output devices for communicating with the server system, and at least one display for providing output to a user and a user input device; and providing, on the client system, a lesson viewer program for allowing a user to view and navigate through the courses and lessons to select a lesson to perform, to navigate through and view the elements of the lesson to perform, and to provide input into the video assignments in the form of time-indexed video case responses to exercises and to view, create, and edit entries into a notebook of time-indexed video case personal user notes.

In the method of providing a client system for an interactive, case-based system for video-centric professional development of teacher-users, the lesson viewer program provided on the client computers may be a web browser.

In a further embodiment, the method of providing a client system for an interactive, case-based system for video-centric professional development of teacher-users further includes the step of providing means whereby digital video cases may be stored locally on the client systems to minimize the information transfer across the network during lessons.

In the method of providing a client system for an interactive, case-based system for video-centric professional development of teacher-users, the digital video cases may be provided on a storage medium selected from the group consisting of hard disks, optical disks, magnetic disks, and magnetic tapes.

In another embodiment, the method of providing a client system for an interactive, case-based system for video-centric professional development of teacher-users further includes the step of providing means by which the digital video cases may be downloaded from the server system onto the client systems so that they may be played back locally during lessons.

In a yet further embodiment, the method of providing a client system for an interactive, case-based system for video-centric professional development of teacher-users further includes a step of providing means for uploading digital video cases, time-coded text tracks, time-coded indexes, and time-coded tables of contents from the client computers to the server computer for use by a teacher-user in creating a lesson.

In a further embodiment, in the method of providing a client system for an interactive, case-based system for video-centric professional development of teacher-users, the lesson video assignments include requests for user input in the form of time-indexed video case exercises and time-indexed video case answers and marking codes, wherein the lesson assignments may be configured to allow time-indexed video case user responses to be viewable only by the user or by a plurality of users and to be applicable to only one lesson or to a plurality of lessons, and wherein lesson exercises can optionally accommodate the use of file attachments to allow for uploading answers from the client systems to the server system.

Still another embodiment of the present invention provides a method for providing a server system for an interactive, case-based system for video-centric professional development of users by teacher-users, wherein the interactive system includes at least one client system, each client system including a processor for executing programs, a memory for storing programs, input and output devices for connecting with the server system, a display for providing output to a user, a user input device, and a lesson viewer program for allowing a user to view and navigate through the courses and lessons to select a lesson to perform, to navigate through and view the elements of the lesson to perform, and to provide input into the video assignments in the form of time-indexed video case responses to exercises and to view, create, and edit time-indexed video case entries into a notebook of time-indexed video case personal user notes. The method of providing the server system comprises the steps of: providing a computer including a including a processor for executing programs, a memory for storing programs, and input and output devices for interconnecting the server system and client systems. The method further includes the steps of providing the server system with: a media database for storing at least one time-indexed digital video case, at least one time-indexed text track with each text track corresponding to a digital video case, and with the time-indexes in the text track corresponding to time-indexes of the digital video case; the media database further, and optionally, including a time-indexed table of contents for each digital video case, resources relevant to each digital video case, and commentary relevant to each digital video case; a video assignment database for storing time-indexed video case exercises and time-indexed video case user responses thus providing at least one lesson exercise for a user to perform and at least one workbook to store user time-indexed video case responses to the lesson exercise; an administration database for storing user access permissions and system settings; a user database for storing personal user notes; and a lesson database for storing lessons including a combination of items from the media database, the video assignment database, and the administration database that are organized to create a video-based lesson, and for storing groups of related lessons as courses. This embodiment further includes the step of providing a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons.

A further embodiment of the present invention provides a method for providing a server system for an interactive, case-based system for video-centric professional development of teacher-users further comprising the step of providing the server system with a web server system for serving lessons to the client computers, and wherein the lesson viewer program on the client computers is a web browser.

A still further embodiment of the present invention, a method for providing a server system for an interactive, case-based system for video-centric professional development of teacher-users is presented, further comprising means for storing the digital video cases locally on the client systems to minimize the information transfer across the network during lessons.

In another embodiment, in the method for providing a server system for an interactive, case-based system for video-centric professional development of teacher-users, the digital video cases are provided on a storage medium selected from the group consisting of hard disks, optical disks, magnetic disks, and magnetic tapes.

In another embodiment, the method for providing a server system for an interactive, case-based system for video-centric professional development of teacher-users further comprises the step of providing means for downloading the digital video cases from the server system onto the client systems so that they may be played back locally during lessons.

In a yet further embodiment, the method for providing a server system for an interactive, case-based system for video-centric professional development of teacher-users further comprises the step of providing the server system with a video and index builder, whereby a teacher-user can build a time-coded text track, a time-coded index, and a time-coded table of contents for a time-coded digital video case.

In still another embodiment, the method for providing a server system for an interactive, case-based system for video-centric professional development of teacher-users further comprises the step of providing means for uploading digital video cases, time-coded text tracks, time-coded indexes, and time-coded tables of contents from the client computers to the server computer for use by a teacher-user in creating a lesson.

The details and advantages of the aforementioned embodiments will be clarified and exemplified when taken in conjunction with the detailed description and the accompanying drawings.

BRIEF DESCRIPTION OF THE DRAWINGS

FIG. 19(b) is a screen shot depicting another view of an exercise adding/editing page for the lesson-building program;

FIG. 22 is a screen shot depicting a forum adding/editing page for the lesson-building program;

DETAILED DESCRIPTION

Figure 1:
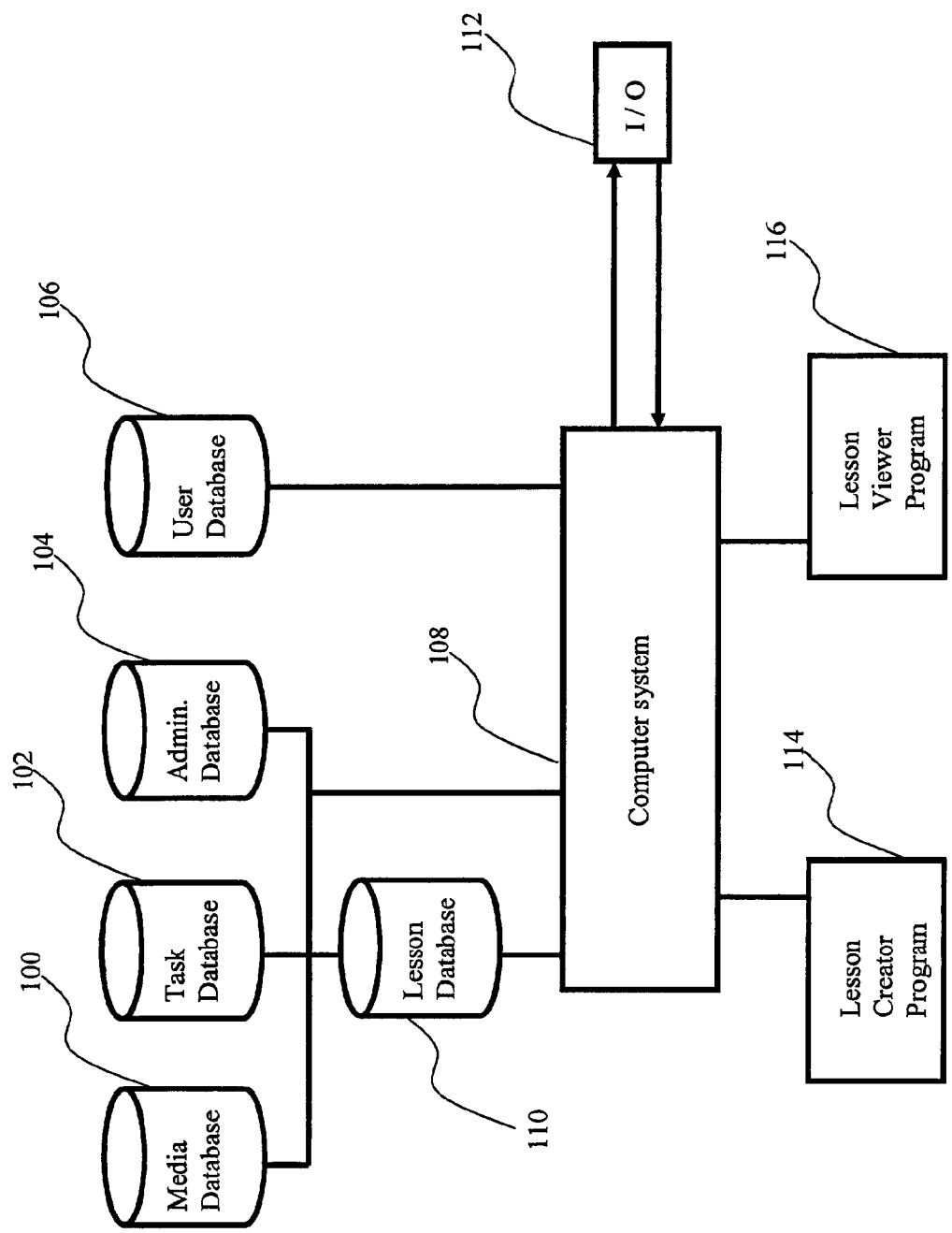
FIG. 1 is a block diagram depicting a single-computer embodiment of the present invention.

The present invention relates to computer-based education systems, and more particularly to a method and system for interactive case and video-based teacher training. The following description is presented to enable one of ordinary skill in the art to make and use the invention and to incorporate it in the context of particular applications. Various modifications to the preferred embodiment, as well as a variety of uses in different applications will be readily apparent to those skilled in the art, and the general principles defined herein may be applied to other embodiments. Thus, the present invention is not intended to be limited to the embodiments shown, but is to be accorded the widest scope consistent with the principles and novel features disclosed herein.

The following glossary of terms is provided in order to assist the reader in gaining a strong grasp of the essence of the present invention.

Glossary

Base page: The term base page is used herein to identify the main window of a program, which may be overlaid or cascaded with pop-up or floating pages. Examples of base pages are common in nearly all windowing software. Generally, a program will have one instance, which serves as the base page, and various sub-functions of that instance can be controlled or accessed via floating windows/pages (also known as pop-up windows or pages). Note that the terms window and page are used interchangeably within this disclosure.

Exercise: The term exercise is generally used herein in the traditional sense of an educational task, assignment, or assesment. Examples of exercises include question and answer exercises and exercises in which a user is asked to verify the truth of a statement. The term exercise is intended to be inclusive of all tasks requested of a user in order to facilitate the learning process. Generally, responses to exercises are recorded through the input device to the system, though some exercise may not include the need for a user response, or may require a user response that cannot be input via the input device (or that may be summarized via input through the input device).

Floating page: The term floating page is used herein to identify a page or window of a windowing program other than the base page. The term floating page, as used herein, is generally interchangeable with the words floating window, pop-up page, and pop-up window. Also, depending on the particular situation, some items designated as floating pages could also be implemented through the use of pop-up menus, which are submenus in windowing programs that are typically accessed by, for example, right-clicking on a mouse.

Network: This term is used to identify means of connection between a server computer and client computers, and is intended to refer generally to a computer network. The computer network could encompass architectures such as a local area network (LAN), a wide area network (WAN), a metropolitan area network (MAN), or a global computer network such as the Internet, and can include various network topologies and interconnections.

Resources: This term is used to identify items or information used by a subject during a video lesson based on the subject. For example, assuming the subject is a teacher and the video lesson is based on the teacher teaching a class to a group of students, the resources could comprise items such as handouts that the teacher gave to the students, assignments given to the students to prepare for the videoed class, pictures of exhibits used by the teacher during the class, and pictures representing markings by the teacher on the chalkboard during the lesson.

Subject: This term is used to identify the subject of a video case. For example, in the case of a medical practices video, it could be the medical practitioner providing instruction to a patient.

Teacher-user: This term is generally used to identify a user of the lesson-building program. A teacher-user uses the lesson-building program to compile a video case, resources, commentary, as well as a video case text track, index, and other items in order to build a lesson. The teacher-user can collect a group of lessons together as a course, and can control access to various aspects of lessons or courses.

Text Track—The term text track is generally used herein to indicate a text file related to a video via its time indexes. In the preferred embodiment, text tracks are time-coded transcripts of the verbal content of the video, and they may be used for subtitles similar to closed-captioned broadcasts for hearing impaired individuals.

Time-code: The term time-code is used herein to define a temporal point in a video. Time-codes could take the form of a time-based indicator of position within a video, e.g. [HH:MM:SS] where HH, MM, and SS indicate hours, minutes, and seconds elapsed, respectively, or they could take a more general form such as frames of the video or another time-based measure (for example, in milliseconds). The important quality of time-codes is that they indicate particular points in the video. Time codes are used by teacher-users and other users to indicate points of interest in a video as well as in the index, table of contents, and text track of a video to allow the user to coordinate points with the actual video content. Note that the term time-code may be used interchangeably with the word time-index.

User: The term user is generally used to indicate a person who uses the lesson-viewing program in order to take a lesson or course. The access to be granted to a particular user is generally controlled by the teacher-user. Usually, a user is a student or mentee of the teacher-user, with the teacher-user serving as a guide to assist the user in learning from a video case.

Video case: This term is used to identify a particular video session. For example, a class videoed to observe the teaching practices of the teacher could be designated as a video case.

Wizard: This term is used to identify a subprogram that walks a user through a particular exercise in a simple, step-by-step manner. For example, a wizard could be used to assist a teacher-user in properly assembling a lesson. Wizard-type programs are provided as a simple way to ensure that an exercise is accomplished properly. However, in some instances, a wizard may be limited to generating somewhat standard results, and an experienced user may prefer to bypass the wizard program in order to take steps in an order not allowed by the wizard or to take advantage of features not included in the wizard.

Introduction

The present invention provides an interactive, case-based system for the professional development of users by teacher-uses. A database of time-coded videos showing the practices of a subject is provided, around which a teacher-user may develop a lesson. Resources relevant to each video are also stored in a resource database for incorporation along with the video. In addition, along with the time-codes in the video, a table of contents, an index, and a text track are typically provided with the video to assist in the understandability of the video by the user, to allow the teacher user to indicate certain points in the video for study, and to allow the user to provide answers and discussion relative to certain points in the video. The teacher-user uses a lesson creator program in order to assemble the time-coded video, the table of contents, the index, and the text track of the video along with resources, comments, and exercises, or video assignments into a case-based lesson for the user to study. The teacher-user can assemble groups of case-based lessons into courses of related lessons, and can create forums with which users may interact. The user uses a lesson-viewing program to browse the contents of the lesson, to keep time-indexed video case personal user notes, and to provide input in the form of time-indexed video case answers to time-indexed video case exercises for review by the teacher and/or by peers. The lesson-viewing and lesson creating programs are preferably operated via a web page server on a server computer, and the interaction between the teacher-user and the users and the server computer is preferably operated via a web browser.

The components of the present invention will be discussed more fully in the following subsections.

System Overview

A single computer embodiment of the present invention is presented in FIG. 1. As shown, the system comprises a media database 100, an exercise database 102, an administration database 104, and a user database 106, which are each communicatively connected with a computer system 108. Additionally, the media database 100, the exercise database 102, and the administration database 104 are connected with a lesson database 110, which, in turn, is also connected with the computer system 108. The computer system 108 includes an input/output port 112 to allow for connection with a display (not shown), an input device (not shown), storage devices (not shown), and other computers (not shown). The lesson creator program 114 and the lesson viewer program 116 operate on the computer system 108 and interact with the media database 100, the exercise database 102, the administration database 104, and the user database 106 in order to allow for the creation and the use of lessons and courses.

Figure 2:
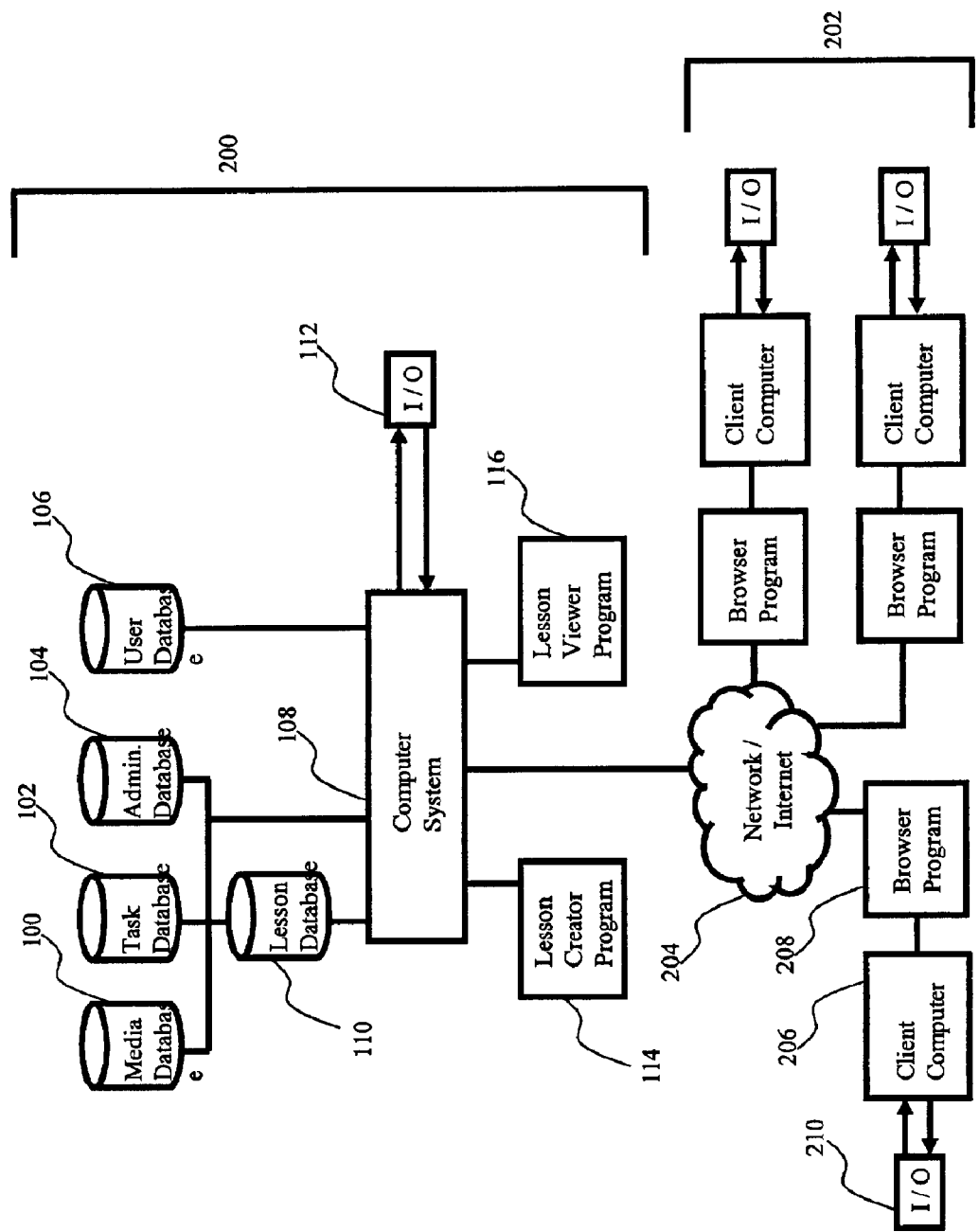
FIG. 2 is a block diagram depicting a computer network embodiment of the present invention.

A computer network embodiment of the present invention is presented in FIG. 2. As shown, the network comprises a server portion 200 and a client portion 202. A network 204 such as the Internet is used to provide a connection between the server portion 200 and the client portion 202. The server portion 200 corresponds to the single computer embodiment presented in FIG. 1, comprising a media database 100, a exercise database 102, an administration database 104, and a user database 106, which are each communicatively connected with a computer system 108. Additionally, the media database 100, the exercise database 102, and the administration database 104 are connected with a lesson database 110, which, in turn, is also connected with the computer system 108. The computer system 108 includes an input/output port 112 to allow for connection with a display (not shown), an input device (not shown), storage devices (not shown), and other computers (not shown). The lesson creator program 114 and the lesson viewer program 116 operate on the computer system 108 and interact with the media database 100, the exercise database 102, the administration database 104, and the user database 106 in order to allow for the creation and the use of lessons and courses.

In the network embodiment of the present invention, the lesson creator program 114 and the lesson viewer program 116 preferably allow interaction with the client computers 206 via the network 204 without the requirement of running specialized software on the client computers 206. Preferably, the server computer 108 operates with web server software and the client computers 206 operate with web browsers 208, with the lesson creator program 114 and the lesson viewer program 116 residing on the server and assisting in the generation of content for web pages served to the client computers 206 by the server software. The client computers 206 also include input/output ports 210 to allow for connection with a display (not shown), an input device (not shown), storage devices (not shown), and other computers (not shown).

Figure 3:
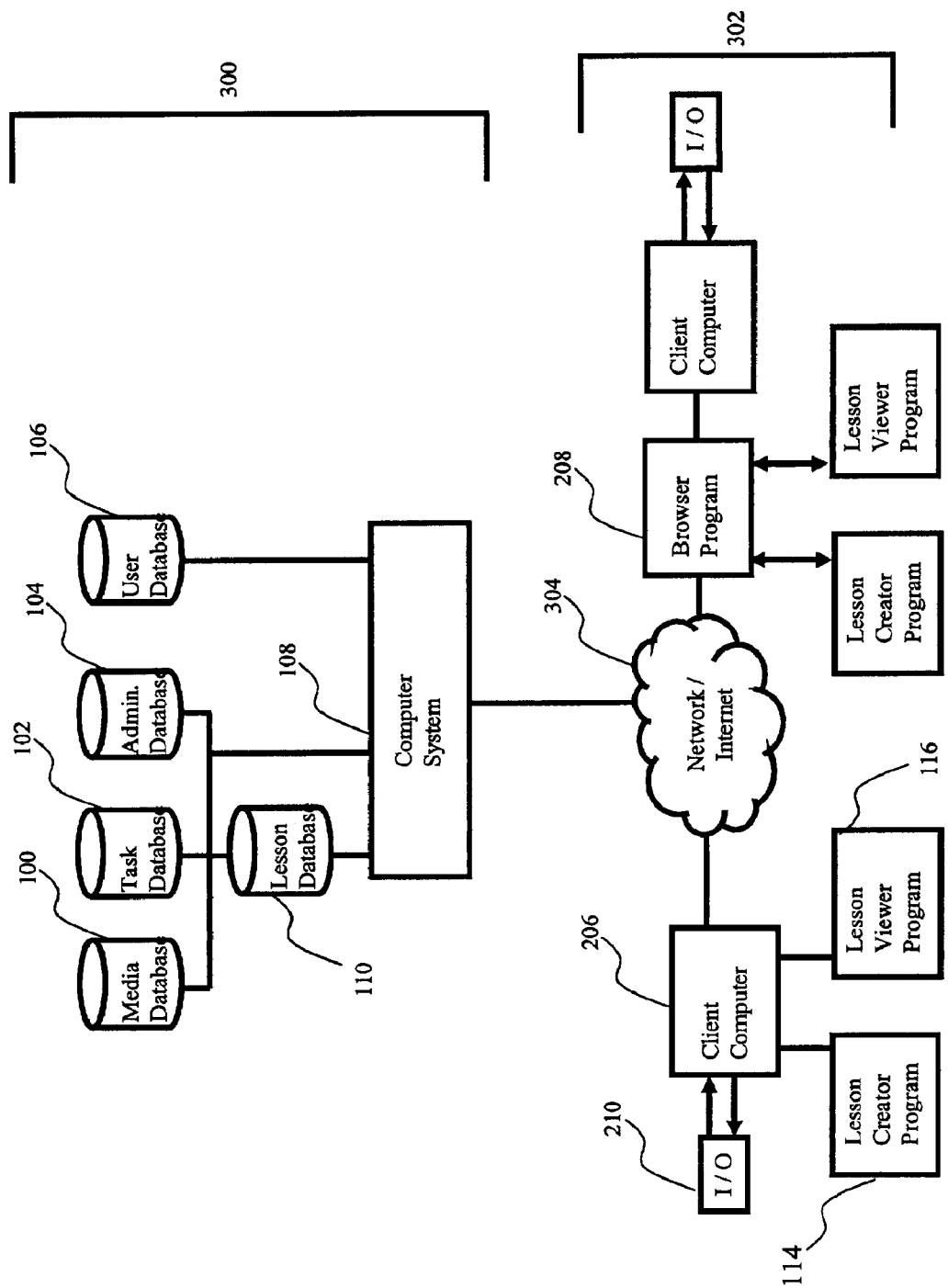
FIG. 3 is a block diagram depicting another network embodiment of the present invention.

Another network embodiment of the present invention is shown in FIG. 3, wherein a server system 300 is connected with client systems 302 via a computer network 304 such as the Internet. The server system 300 corresponds to the single computer embodiment presented in FIG. 1, comprising a media database 100, a exercise database 102, an administration database 104, and a user database 106, which are each communicatively connected with a computer system 108. Additionally, the media database 100, the exercise database 102, and the administration database 104 are connected with a lesson database 110, which, in turn, is also connected with the computer system 108. The computer system 108 includes an input/output port 112 to allow for connection with a display (not shown), an input device (not shown), storage devices (not shown), and other computers (not shown).

In this network embodiment of the present invention, the lesson creator program 114 and the lesson viewer program 116 incorporate specialized software, which runs on the client computers 206, and interacts with the media database 100, the exercise database 102, the administration database 104, and the user database 106 through the computer system 108 in order to allow for the creation and the use of lessons and courses. The computer system 108 thus acts as a data server, with the lesson creator program 114 and the lesson viewer program 116 acting somewhat as specialized browsers. The client computers 206 also include input/output ports 210 to allow for connection with a display (not shown), an input device (not shown), storage devices (not shown), and other computers (not shown). Note that, as shown in FIG. 3, in a particular network, client computers 206 may be configured differently from one another, with some including a local lesson creator program 114 and a local lesson viewer program 116, and some transmitting and receiving data from the server computer system 108 via a web browser 208. Additionally, embodiments may be configured in a hybrid manner such that the lesson creator program 114 or the lesson viewer program 116, or portions thereof may reside either locally or on the server computer system 108. The exact nature location of the lesson creator program 114 and the lesson viewer program 116 may be tailored to the needs of a specific system.

Figure 4:
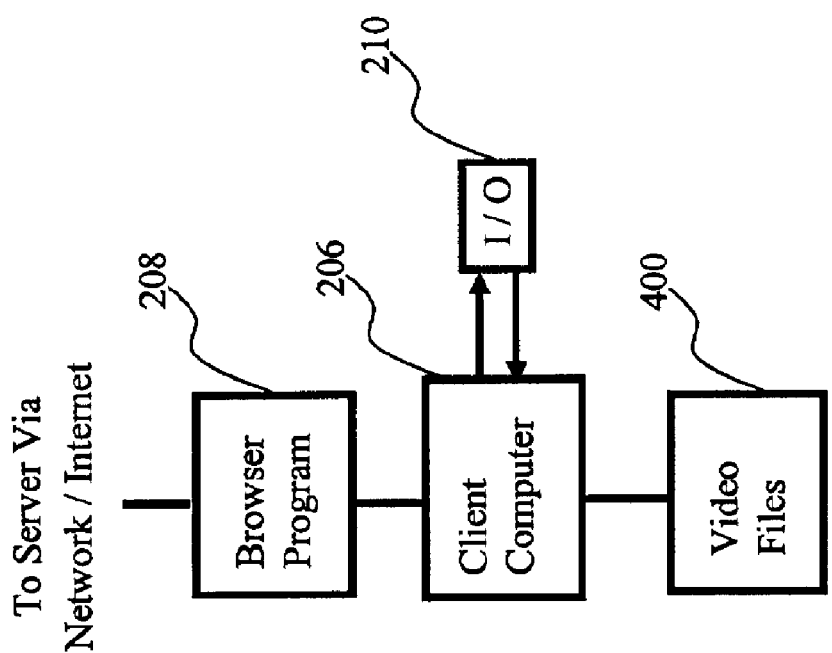
FIG. 4 is a block diagram depicting a portion of a network connection.

Depending on network congestion and on the connection speed of a particular client computer 206, video files may be stored locally in order to minimize the bandwidth requirements over a connection. A portion of a network connection is shown in FIG. 4, wherein the client computer 206 utilizes a web browser 208 for communicating with the server computer system 108 (not shown in FIG. 4). The video files 400 may be provided and stored on computer readable media, non-limiting examples of which include devices such as hard drives; optical drives for instance CD-ROMs or DVDs; magnetic disks; and magnetic tapes. In addition to being provided on computer readable media, the video files 400 may also be downloaded from the server computer system 108 (not shown in FIG. 4) during times when the system is not being used or during non-peak times when bandwidth conservation is not important. Because the system of the present invention is specifically centered on the provision of video-based lessons, ensuring video transmission quality is very important. By providing an option for local storage of the videos, the present invention allows for minimization of network overhead when necessary. Furthermore, in some cases, depending on the particular software used, and on the video compression algorithm employed, some videos take the form of large files that would exceed capacity even for relatively fast connections such as ADSL, T1, or even some direct network connections such as Ethernet or Fast Ethernet, thus making provision in the form of computer-readable media necessary. A particular network used with the present invention could comprise a hybrid of local video storage and remote video storage, depending on system capacity and the capacity of particular connections therein.

Figure 5:
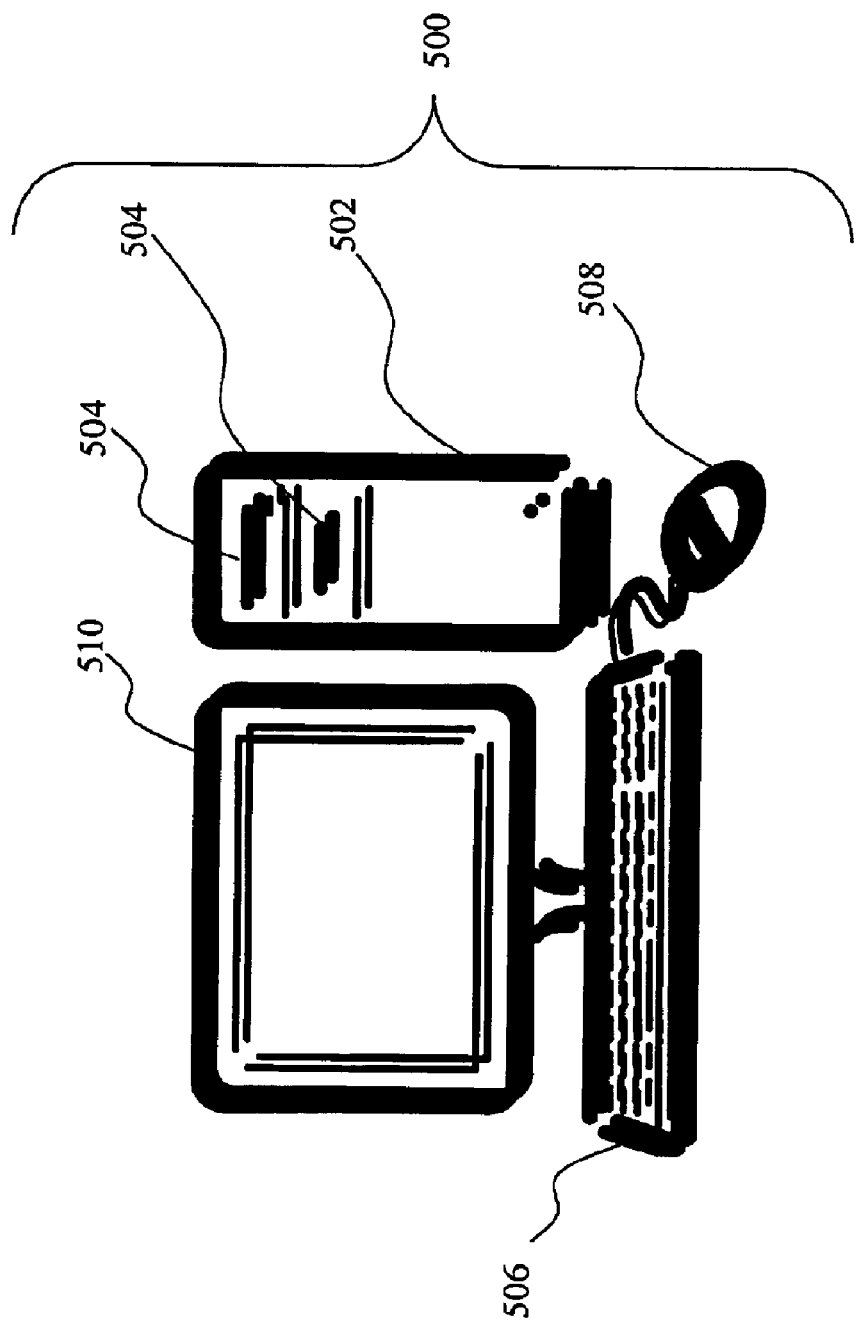
FIG. 5 is an illustration depicting a typical computer used for either a client system or a server computer system incorporated in the present invention.

For illustrative purposes and for further clarity, FIG. 5 illustrates a typical computer 500 that may be used for either a client system 206 (not shown in FIG. 5) or a server computer system 108 (not shown in FIG. 5) incorporated in the present invention. The computer 500 includes a processor unit 502 having a hard drive (not shown), a processor (not shown), and a memory (not shown). Input devices, such as a keyboard 506 and a pointing device 508 are used to allow a user to provide input to the processor unit 502. A display 510 is also connected with the processor unit 502 to allow a user to view lessons. Various types of input devices and displays may be used with the present invention. Many different configurations of the computer 500 may be used in conjunction with the present invention. In particular, many different styles of keyboards 506, pointing devices 508, and displays 510 currently exist in the marketplace, and new styles are constantly evolving. The processor unit 502, as shown includes storage media bays 504 for portable media such as magnetic disks, magnetic tapes, CD-ROMs, and DVDs.

It is worth noting that computers 500 used in conjunction with the present invention can employ a variety of operating systems (e.g., Microsoft Windows, Apple OS, Linux, and Unix) on a variety of different processor platforms (e.g., VAX, Intel X86, and Motorola). Additionally, the embodiments incorporating a web server along with web browsers may utilize any of a variety of web server programs, and any of a number of web browsers (e.g., Microsoft Internet Explorer and Netscape Navigator) without departing from the scope of the present invention. Furthermore, many different database programs (e.g., Microsoft Access and SQL Server) and configurations (e.g., the particular layout of the databases) may be used for the present invention. The division of the data storage into a media database 100 (not shown in FIG. 5), a exercise database 102 (not shown in FIG. 5), a administration database 104 (not shown in FIG. 5), and a user database 106 (not shown in FIG. 5) are simply provided as one example of a possible database layout, and many alternative database layouts are easily achievable and are considered within the scope of the present invention.

Next, the operational details of the lesson-building program 114 will be discussed in the context of the system described in the System Overview.

Lesson-building Program 114

The lesson-building program 114 will be discussed in the context of web pages displayed and interacted with via a web browser. The same discussion generally applies whether the system incorporates the use of a web server to provide for user interaction via a web browser or whether local, specialized software is used on the client computers 206 and the server computer system 108. Should specialized software be employed for the lesson-building program 114 and the lesson-viewing program 116, it may be optionally provided on the server computer system 108 for downloading to the client computers 206 in order to mitigate the need to copy the specialized software via computer-readable medium. This feature will allow the software to be updated more easily in the event of an upgrade, or in the event of a system failure on a client computer 206. As stated previously, however, it is preferred that the client computer 206 and the server computer system 108 communicate through the use of standard web pages viewed through a web browser.

Figure 6:
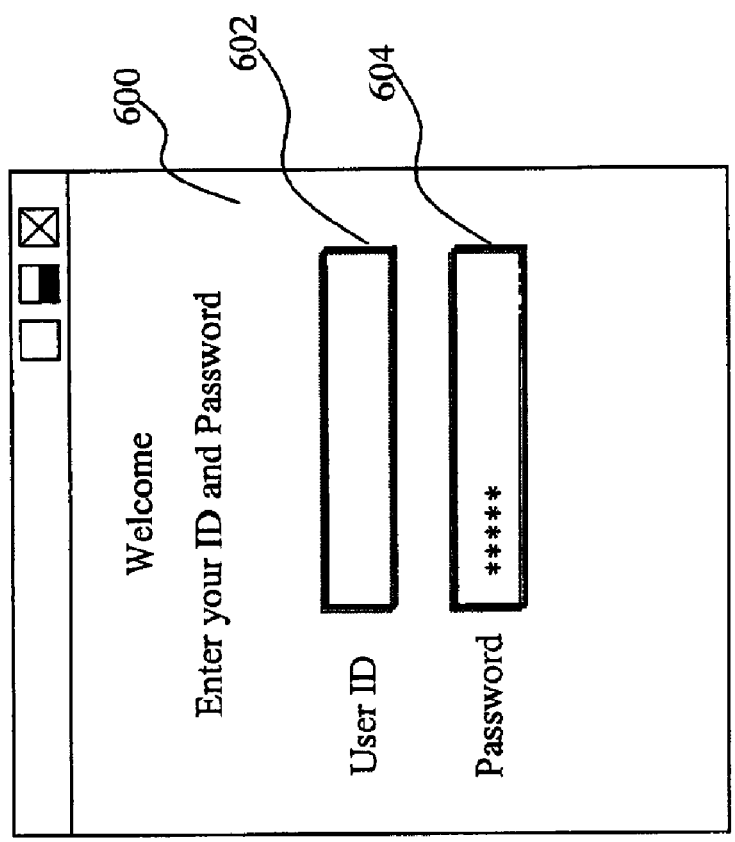
FIG. 6 is a screen shot depicting a welcome screen for the lesson-building program.

Generally, upon opening the lesson-building program 114 or the lesson-viewing program 116, a welcome screen such as that presented in FIG. 6 is shown to a user, whether they are a teacher-user or a general user. Typically, the welcome screen 600 provides a welcome message to the user, which may include news items such as software updates available, new lessons added, or other information of importance to a user. In addition to news items, the welcome screen 600 may provide a link to introductory information regarding the system or, depending on the particular embodiment; it could include pricing or other marketing related information so that users may determine whether use of the system is of interest to them. Additionally, the welcome screen 600 could provide access to a demonstration version of the system to enable a potential user to test the system without accessing the general system. Preferably, the welcome screen 600 also provides for the entry of a user ID 602 and password 604, which must be provided by a user prior to using the system. The user ID 602 and password 604 allow for a system administrator to assign certain usage permissions to a particular user, as well as to track usage of particular users, which may aid both in billing, if applicable, and in optimization of the user interface.

Figure 7:
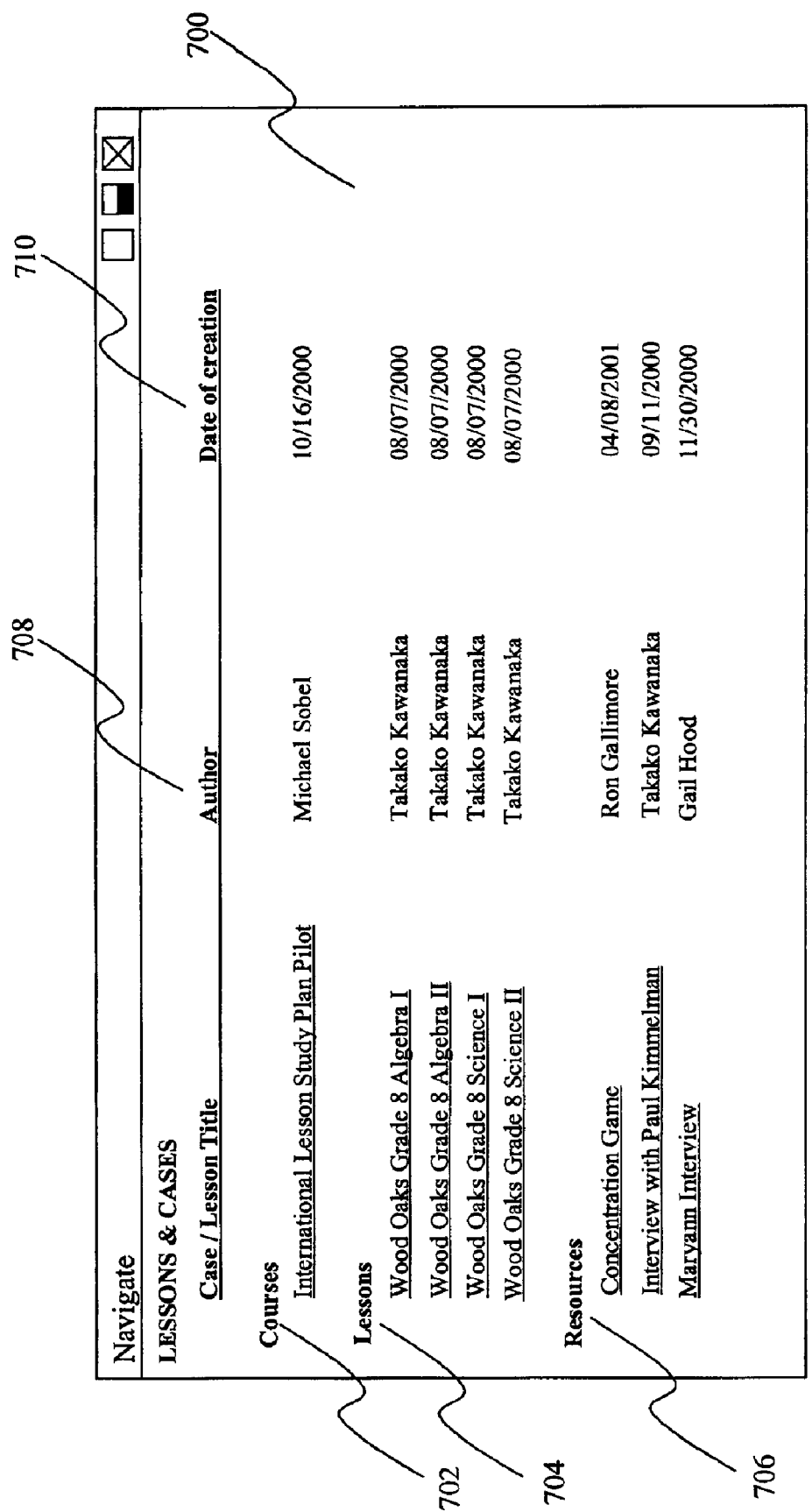
FIG. 7 is a screen shot depicting the main screen for the lesson-building program.

After a user has entered their user ID 602 and password 604, the user is then taken to a main screen. The screen used as the main screen may vary with a particular embodiment and for particular users depending on the access permissions granted to the user. A menu of lessons and cases is presented in FIG. 7, which, for purposes of this disclosure serves as the main screen. Note that depending on the specifics of a particular embodiment and on the permissions granted to a user, the main screen could include general system information, could take a user to a specific lesson for which they have access permission or which they have created, or to a lesson creator "wizard". As shown in FIG. 7, the navigation screen 700 provides a user with a menu comprising courses 702, lessons 704, and resources 706 available to the user. Also, the author 708 and date of creation 710 are provided to help the user know the relevancy of these items. The inclusion of these items is optional, and additional information may also be provided, such as a description of each course 702, lesson 704, and resource 706. Also, more specific information may be included, such as the title of the video case forming the basis of a lesson as an aid to a teacher-user in determining whether the lesson is likely to contain information that the teacher-user would like to include in a newly created lesson. Typically, each course 702, lesson 704, and resource 706 listed serves as a link to pages relevant to them. A teacher-user who had partially created a lesson could, for example, find his or her lesson on the menu of lessons 704 in order to continue development of the lesson.

Figure 8:
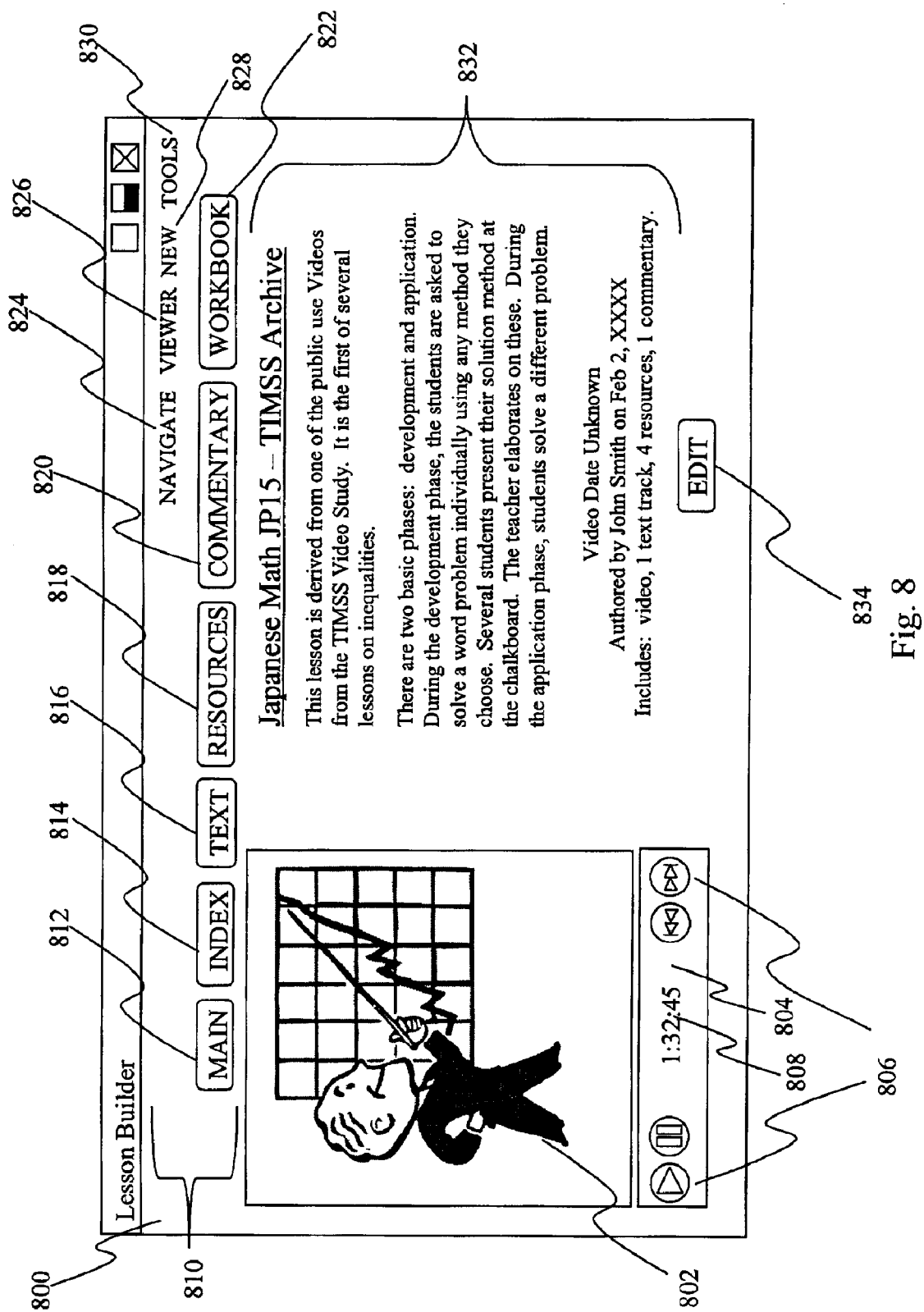
FIG. 8 is a screen shot depicting a summary page for the lesson-building program.

After a user opens a link to a course 702, a lesson 704, or a resource 706, a lesson summary page, as presented in FIG. 8 may be shown. The lesson summary page 800 generally serves as the main, or entry, page for the lesson that was selected from the menu of lessons 704, and serves as an entry point for modifying the lesson. The lesson summary page 800 typically comprises a media player 802 with a control panel 804. The control panel 804 generally includes a plurality of control buttons 806, and a time-code indicator 808. The plurality of control buttons 806 typically includes pause, play, fast-forward, and rewind buttons, although more or less buttons may be provided depending on the desired functionality. The lesson summary page 800 also includes a navigation system 810, which includes several link buttons and links. The navigation system 810 includes a main button 812 for linking with the lesson summary page 800, an index button 814 for linking with an index associated with the video case associated with the lesson and to be displayed in the media player 802, a text button 816 for optionally linking with one or more time-coded text tracks typically representing one or more transcript or meta data track of the video case, a resources button 818 for linking with time-indexed digital resources utilized by the subject of the video case or relevant to the video case, a commentary button 820 for linking with a page including commentary associated with the lesson, and a workbook button 822 for linking with pages including exercises to be performed by the user, forums to be accessed by the user, and a user notebook for allowing the teacher-user or a user to keep personal time-indexed video case notes regarding the lesson. The navigation system 810 also includes a navigation link 824 for linking with the menu of lessons 704 in order to allow a user to navigate through the menu of courses 702, lessons 704, and resources 706, as presented in FIG. 7. A lesson-viewing link 826 and a new lesson link 828, for migrating to the lesson-viewing program 716 and creating a new lesson, respectively, are also provided. The new lesson link 828 can link with either an empty lesson or into a lesson creation wizard depending on the specifics of a particular embodiment. In addition to the new lesson link, a tools link 830 may be provided to allow for access to various preferences and administrator settings. Note that access to the preferences and administrator settings via the tools link 830 may be limited depending on the needs of a particular teacher-user or general user. A lesson summary 832 typically including an abstract/summary of the lesson as well as bibliographical information regarding the lesson is also provided, along with a summary-editing button 834, which provides a link to a lesson summary editor screen.

Preferably, the navigation system 810 of the lesson-building program 714 of the present invention includes a main button 812, an index button 814, a text button 816, a resources button 818, a commentary button 820, a workbook button 822, a navigation link 824, a lesson-viewing link 826, a new lesson link 828, and a tools link 830, with the navigation system being common to each page of the lesson-building program 714 unless the particular page takes the form of a pop-up box or menu in a separate window. Note that, as will be discussed later, the navigation system of the lesson-building program 714 is very similar to that of the lesson-viewing program 716, with the exception of the new lesson link 828. Also, other navigation buttons and links may vary depending on the access privileges of a particular user, for example, in the lesson-viewing program 716, a user may not be granted access to the lesson-building program 716. Additionally, as previously discussed, the main button 812 may not provide access to a menu of courses 702, lessons 704, and resources 706, as presented in FIG. 7. Rather, it may only provide access to a restricted subset.

Figure 9:
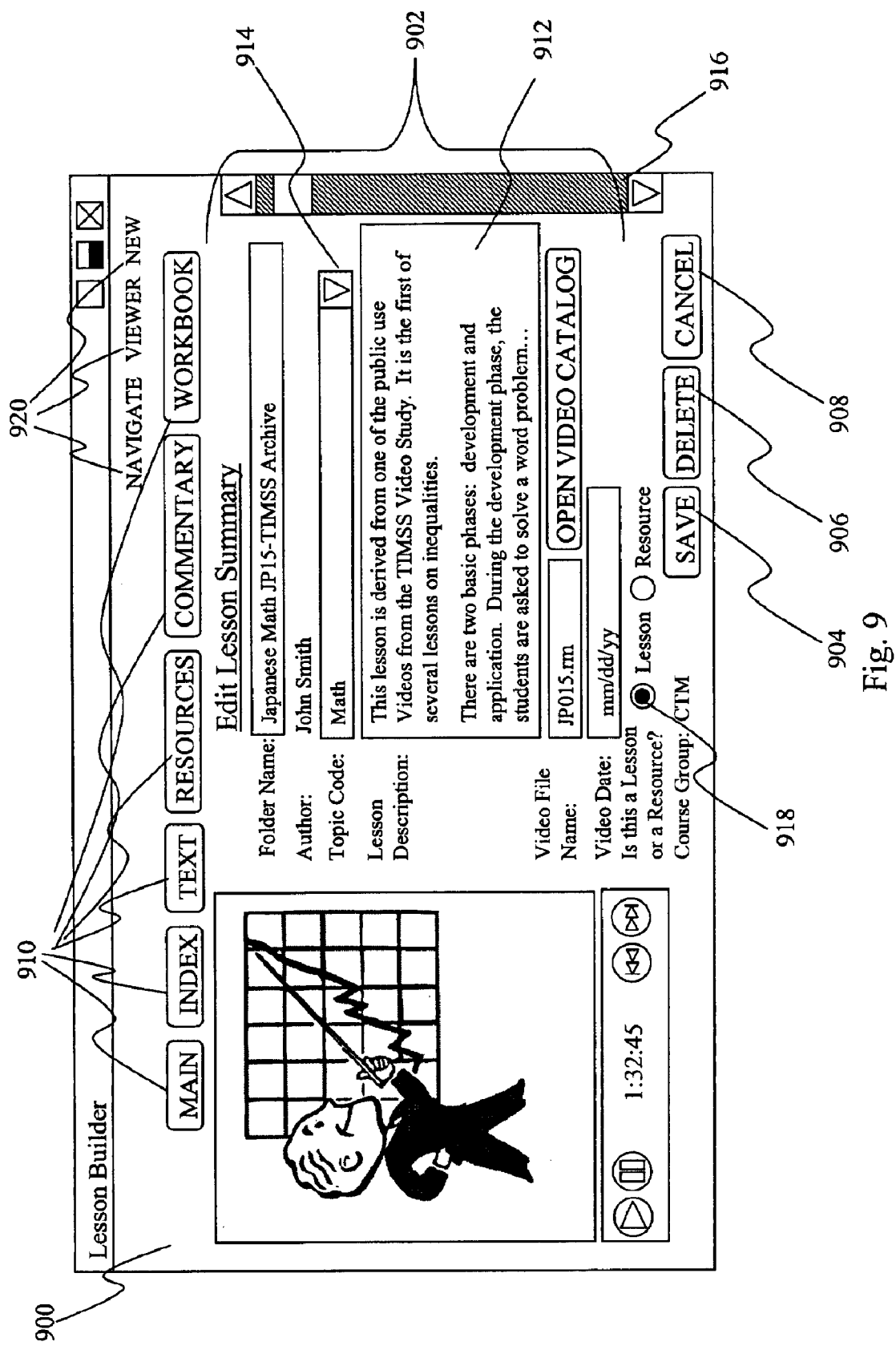
FIG. 9 is a screen shot depicting a lesson summary editor screen for the lesson-building program.

Upon migrating through the summary-editing button 834, the teacher-user is presented with a lesson summary editor screen, as shown in FIG. 9. The lesson summary editor screen 900 includes various controls 902 for providing information included in the lesson summary. Non-limiting examples of controls 902 provided to input information for the lesson summary are presented in the figure, and include options for inputting the folder name in which the lesson resides, the author of the lesson, a topic code based on a set of codes indicative of the particular subject matter of the lesson, a lesson description, a video file name along with a link to open the video catalog in order to find the file name of the applicable video case, the date when the video case was created, whether the summary is actually a lesson or a resource, and what course group the summary applies to. In addition, the lesson summary editor screen includes a save button 904, a delete button 906, and a cancel button 908, for saving, deleting, or canceling the current summary. Note that the controls 902 typically include standard windowing software-type controls such as those exemplified by buttons 910, text boxes 912, pull-down menus 914, slider bars 916, radio buttons 918, and links 920.

Figure 10:
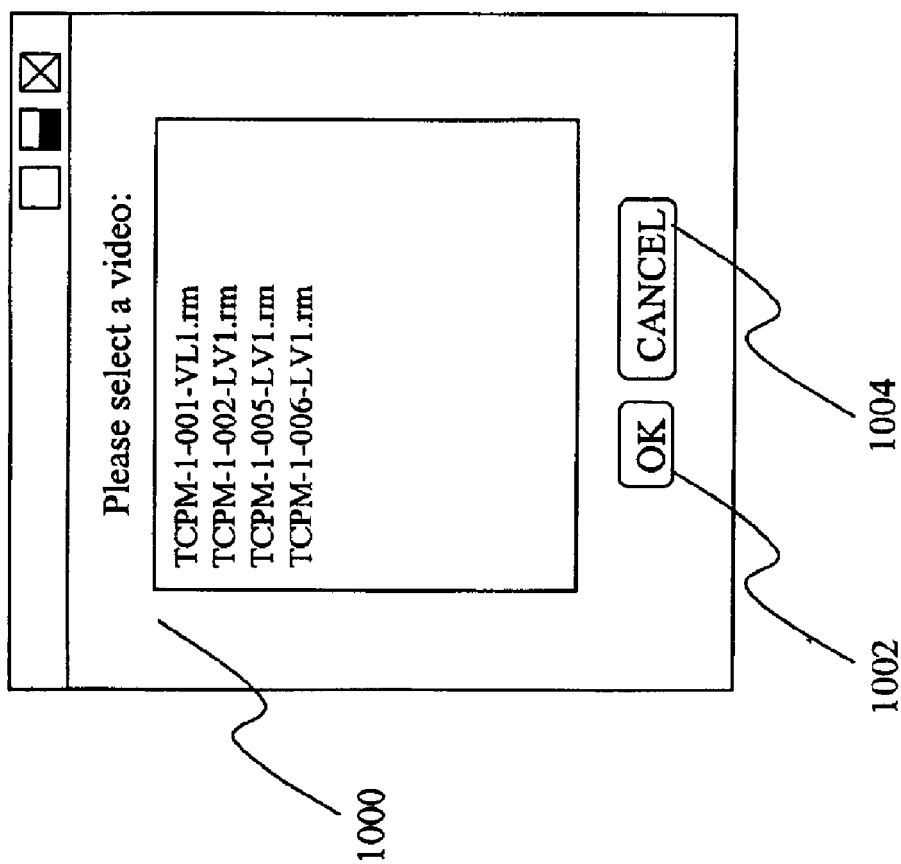
FIG. 10 is a screen shot depicting an example of a video selection box, such as that typically appearing in response to the actuation of a link to open the video catalog for the lesson-building program.

An example of a video selection box such as that responding to the actuation of a link such as the link to open the video catalog discussed relative to FIG. 9 is shown in FIG. 10. The video selection box 1000 typically includes a menu of videos to be selected as well as an "OK" button 1002 and a cancel button 1004. Note that the video selection box may comprise a pop-up window that appears over a window of the lesson-building program 114 (not shown in FIG. 10) or it may be designed integral with the lesson-building program 114 (not shown in FIG. 10).

Figure 11:
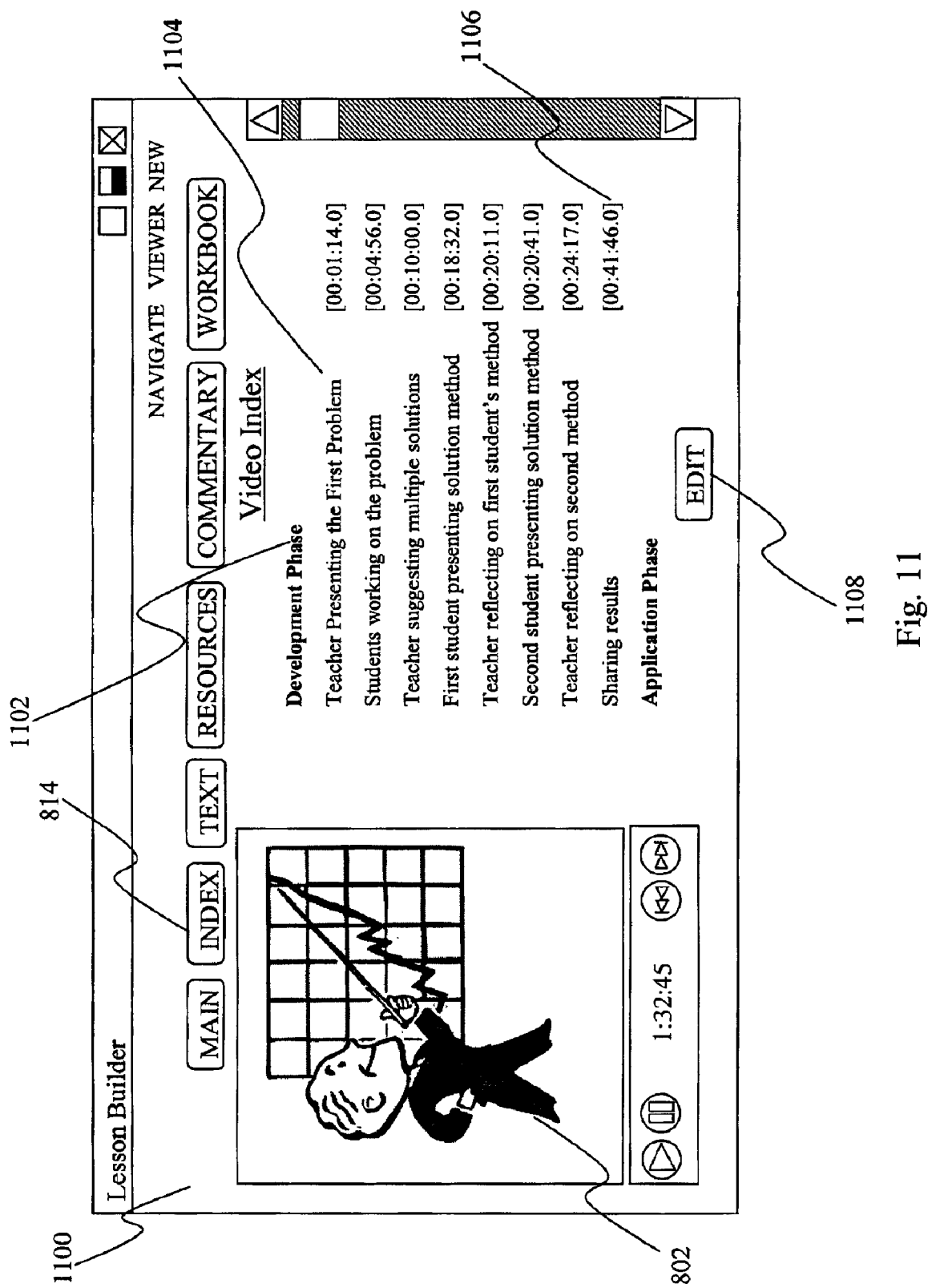
FIG. 11 is a screen shot depicting a video index page for the lesson-building program.

Upon actuating the index button 814 on any page in which it is present, a teacher-user is taken to a video index page as shown in FIG. 11. In addition to the navigation buttons, the video index page 1100 includes a time-coded video index, typically comprising major video chapters 1102 and minor video segments 1104. Either or both of the video chapters 1102 and minor video segments 1104 include video time-codes 1106. The video time-codes provide links by which a user may quickly open an associated portion of the video case in the media player 802. The video index page 1100 also includes a video index builder button 1108 for opening a video index builder in order to modify the current video index or to build a new video index.

Figure 12:
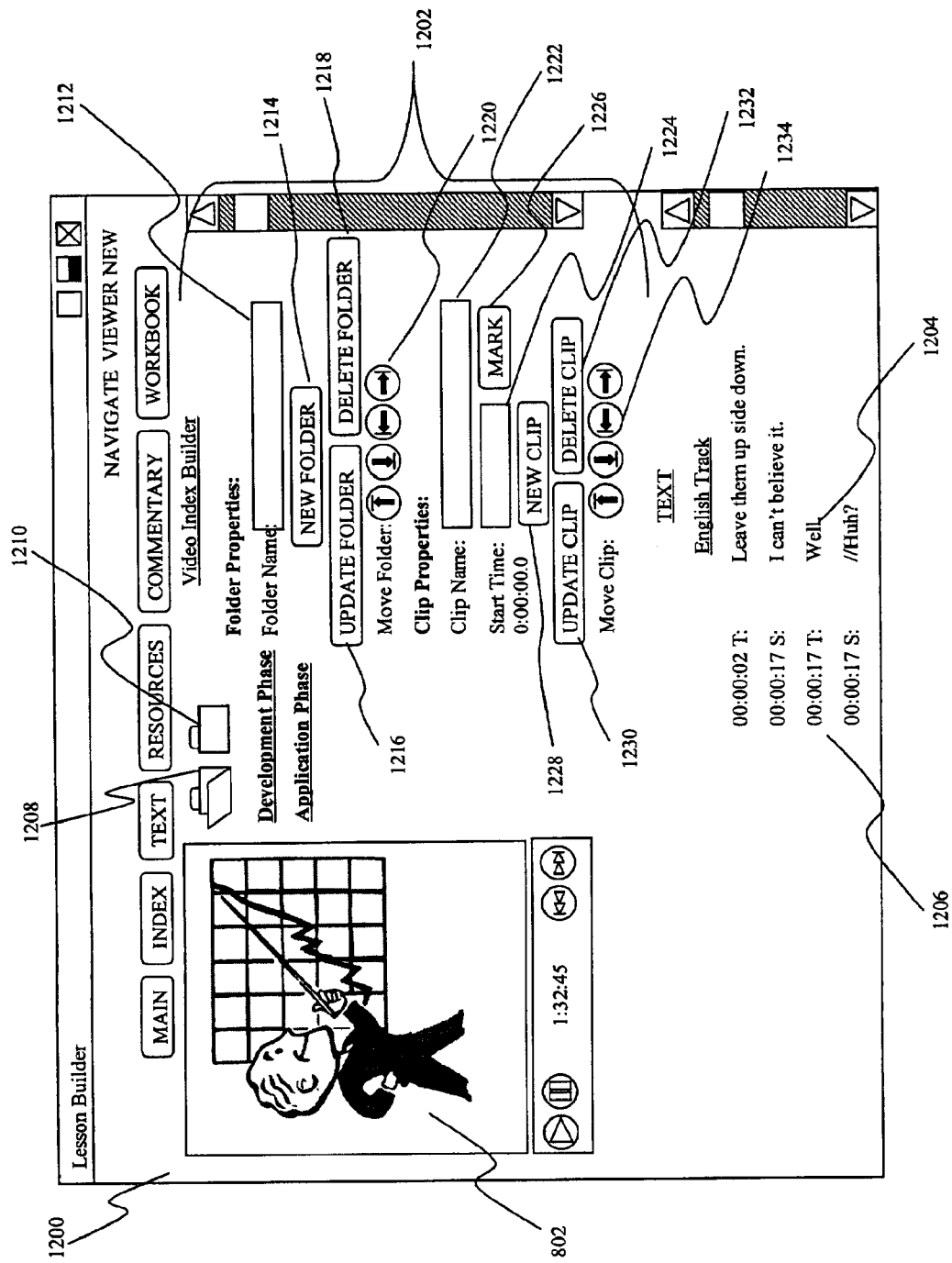
FIG. 12 is a screen shot depicting a video index builder screen for the lesson-building program.

After opening the video index editor, the teacher-user is presented with a video index builder screen as shown in FIG. 12. The video index builder screen 1200 includes a plurality of video index builder controls 1202 and displays the text track 1204 (e.g., a transcript) of the video case. Note in the embodiment depicted in the figure, the text track 1204 includes transcript text for the video case along with time-codes 1206 associated with each line of the transcript text. Each text track in the lesson contains a similar time-code/text description format. The time-codes 1206 provide direct links to portions of the video case with which portions of the transcript text are associated. In the embodiment of the video index builder screen 1200 shown in FIG. 12, the video index builder controls 1202 generally include the controls necessary for generating and editing the video index. Specifically, as shown in FIG. 12, the controls 1202 include buttons for opening folders 1208 and for closing folders 1210, which control the expansion and contraction of the video chapters 1102 (not shown in FIG. 12) in order to display the associated minor video segments 1104 (not shown in FIG. 12) in the corresponding video index page 1100 (not shown in FIG. 12). The controls 1202 also include a folder name text box 1212 for entering the name of a folder to be created, updated, or deleted. A new folder button 1214, an update folder button 1216, and a delete folder button 1218 supplement the folder name text box 1212 in order to allow for actions based on the folder name entered in the folder name text box 1212. In addition, arrow buttons 1220 are provided for moving a folder about in a hierarchy of folders. The arrow buttons 1220 shown include buttons for moving up and down in the hierarchy as well as indenting and un-indenting within the hierarchy. Controls 1202 for generating the text and the time-codes associated with minor video segments 1104 are also provided. A clip name text box 1222 is provided in order to give a name to a particular portion of a video case. In addition, a start time text box 1224 is provided for indicating the start time of the minor video segment 1104 for which a name was provided to the clip name text box 1222. As a video is being played in the media player 802, and the text track 1204 is being reviewed, time codes may be inserted into the start time text box 1224 and the mark may be recorded by actuating the mark button 1226. A minor video segment 1104 (also referred to as a video clip) may be created with the new clip button 1228, may be altered or updated with the update clip button 1230, or may be deleted with the delete clip button 1232. Minor video segments 1104 may be moved about the hierarchy by a plurality of clip arrow buttons 1234. The movement of minor video segments 1104 about the hierarchy is similar to that described relative to the movement of folders about the hierarchy.

Figure 13:
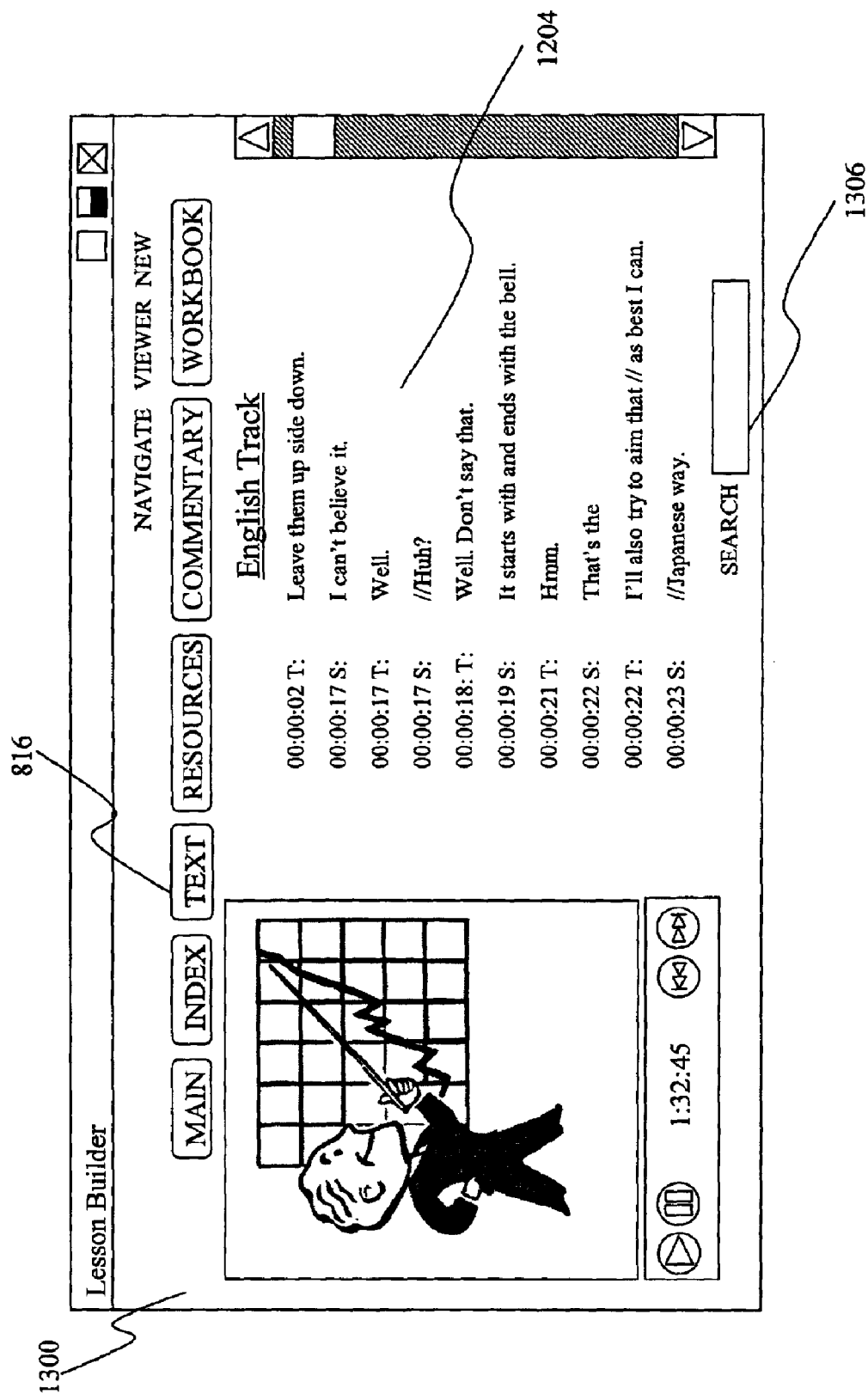
FIG. 13 is a screen depicting a text track page for the lesson-building program.

Upon clicking on the text button 816 in the navigation system, the default video text track page (in this example, the English transcript of the lesson video) is opened, as shown in FIG. 13. The default video text track page 1300 displays the transcript (in this example) 1204 associated with the video case associated with the lesson. The video text track page 1300 preferably includes a search box 1306 to allow a user to enter keywords to search for in the text track 1204. The search box 1306 can assist the user in finding words of interest in the text track 1204. Note that in some cases, there may be more than one text track 1204 can be associated with a video case (e.g., transcripts in different languages). In these cases, it is desirable to provide a menu in a form such as an embedded menu or a pop-up menu to allow a user to select a particular text track 1204 to be displayed.

Figure 14:
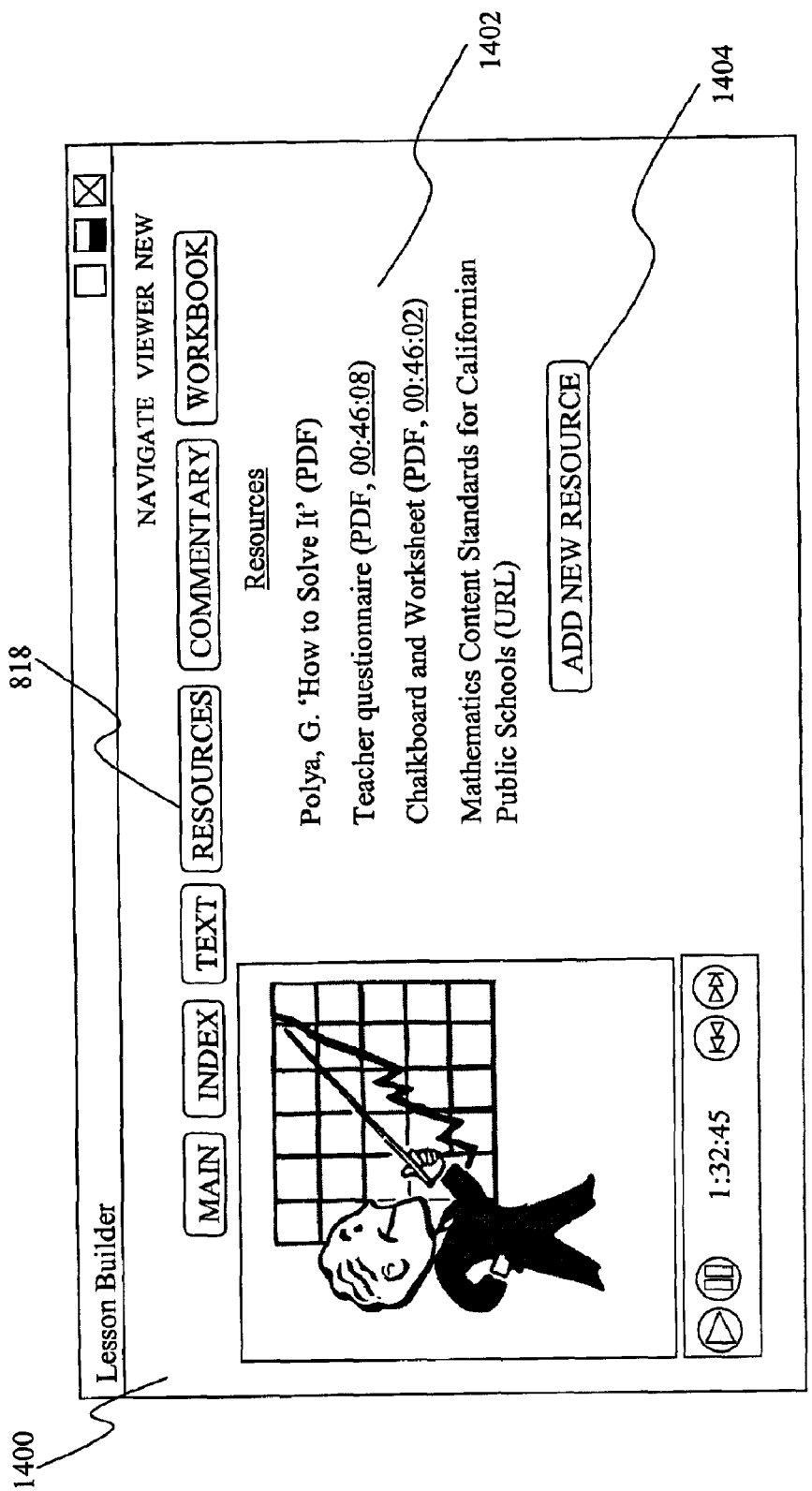
FIG. 14 is a screen shot depicting a resource page for the lesson-building program.

Upon clicking on the resources button 818 in the navigation system, a resources page is displayed, as shown in FIG. 14. In addition to the navigation system, the resources page 1400 includes a resource list 1402, which includes the resource items (which may or may not be time-indexed) associated with the lesson. As mentioned in the glossary above, resources are typically items associated with the video case. A time-indexed resource synchronizes the lesson video to a relevant part of the resource. As a non-limiting example, in the case of a video case showing a teacher teaching a mathematics class, the resources may include items such as a questionnaire issued to the teacher after completing the class in order to provide his/her input on the video case, an image file representing the materials written on the chalkboard during the class, with the video showing the organization's preferred method of instruction for the relevant subject, and a copy of the handouts given to students during class. Note that these files may be provided in any file format readable by either the system of the present invention or by software accessible by the computer of the teacher-user or general user. Non-limiting examples of file formats which may be used by the system include Adobe Acrobat®, Microsoft Word®, Microsoft Excel®, MPEG-1, AVI, MOV, GIF, TIFF, JPEG, Text, and RTF, among many others. Plug-in readers may be provided with the system of the present invention for reading files. The resource list 1402 typically links to a group of files residing in the media database 100, as exemplified in FIG. 1, enabling a user to access the resources relevant to the lesson. The resources page 1400 in the lesson-building program 114 also includes an add new resource button 1404, which enables a teacher-user to open a page to allow for the addition of items to the resource list 1402.

Figure 15:
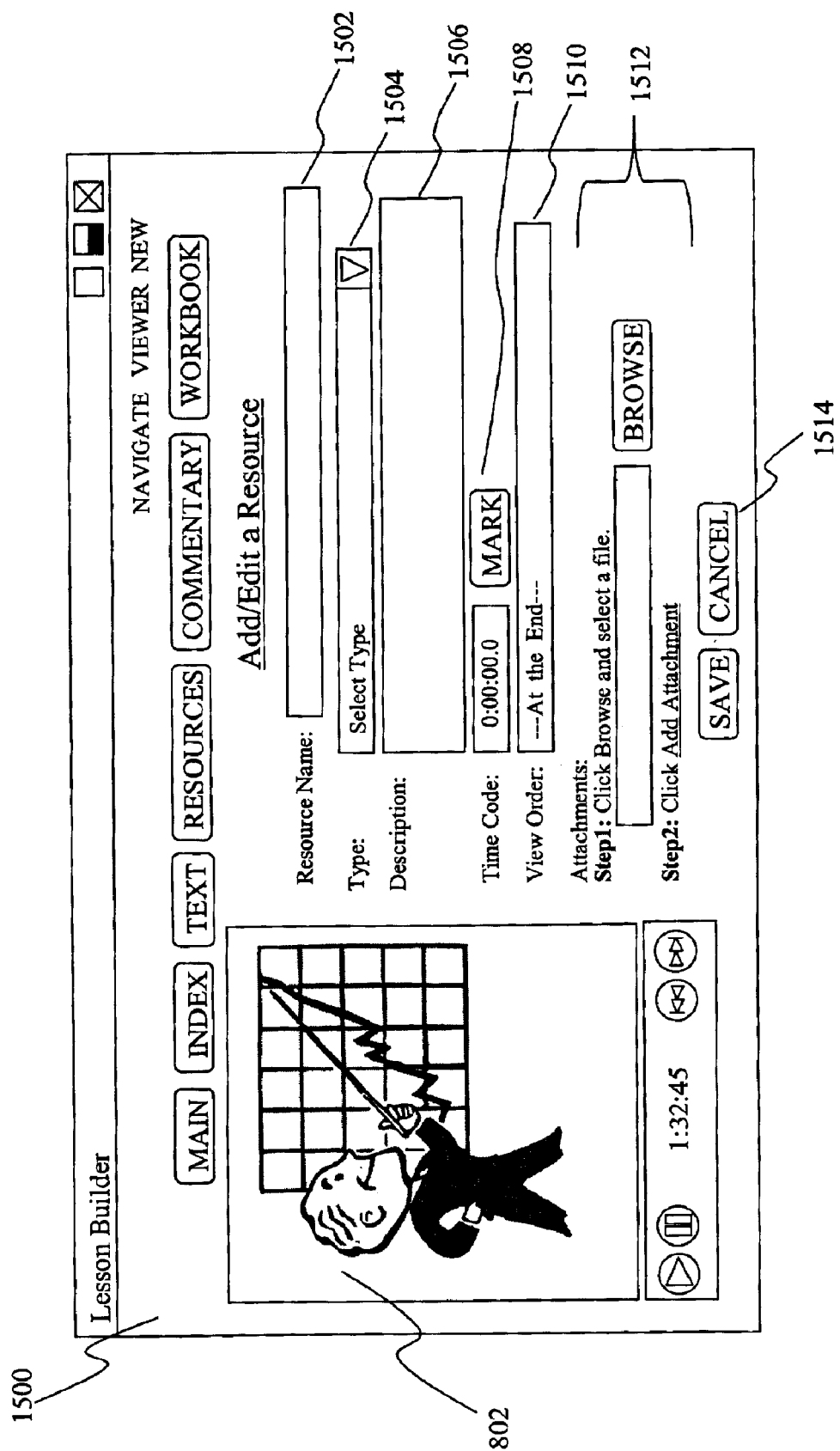
FIG. 15 is a screen shot depicting a resource adding and editing page for the lesson-building program.

The resource adding and editing page opened via the add new resource button 1404 is shown in FIG. 15. As shown, in addition to the usual navigation system, the resource adding and editing page 1500 includes a media player 802, to enable a teacher-user to view portions of a video case in order to include time-codes relevant to the resource added or edited. Controls provided on the resource adding and editing page 1500 typically include a resource name field 1502 to allow a teacher-user to add or edit a name or title of a resource for display in the resource list 1402 (not shown in FIG. 15). As shown, a resource type drop down list 1504 is also included in order to identify the type of resource added. The resource type drop down list 1504 could be used for identifying a resource file type in cases where only certain, standard, file types are allowed for resources. By allowing only certain file types, users may be given a fixed list of file types allowed on by the system, thus enabling them to better ensure that they have the software necessary to display all of the resource file types used by the system. The resource type drop down list 1504 could also be used to identify the resource type included as a member of common resource groups, such as, for example, chalkboard printouts, class handouts, class assignments, teacher questions and answers, and education standards lists.

In addition to the resource type drop down list 1504, the controls on the resource adding and editing page 1500 also typically include a description text box 1506 to allow a teacher-user to enter a textual description of the resource. The textual description can allow a user to get more information about the resource before actually viewing it. This can be particularly important in the case of resources that are peripheral to the lesson, and are large files that would have to be downloaded prior to viewing. By providing a user with further information regarding the file, the user may make a better-informed decision whether to actually download the file. A time-code marker and button 1508 are also provided to allow the teacher-user to associate a particular point in a video case with the resource, if desired. A view order box 1510 is provided in order to permit a teacher-user to indicate whether the resource should be associated with the end of the video clip designated by the time-code marker and button 1508 or with the beginning. File attachment controls 1512, which allow a teacher-user to enter a link to a file containing a resource by either entering an absolute or relative address into a text box or by browsing for the file. Once a teacher-user has designated a file to which they desire to link, the attachment may be affirmatively added to the resource. Note that it is also possible to add multiple file attachments for a particular resource. Finally, save and cancel buttons 1514 are also provided to allow a teacher-user to confirm their addition or editing of a resource.

Figure 16:
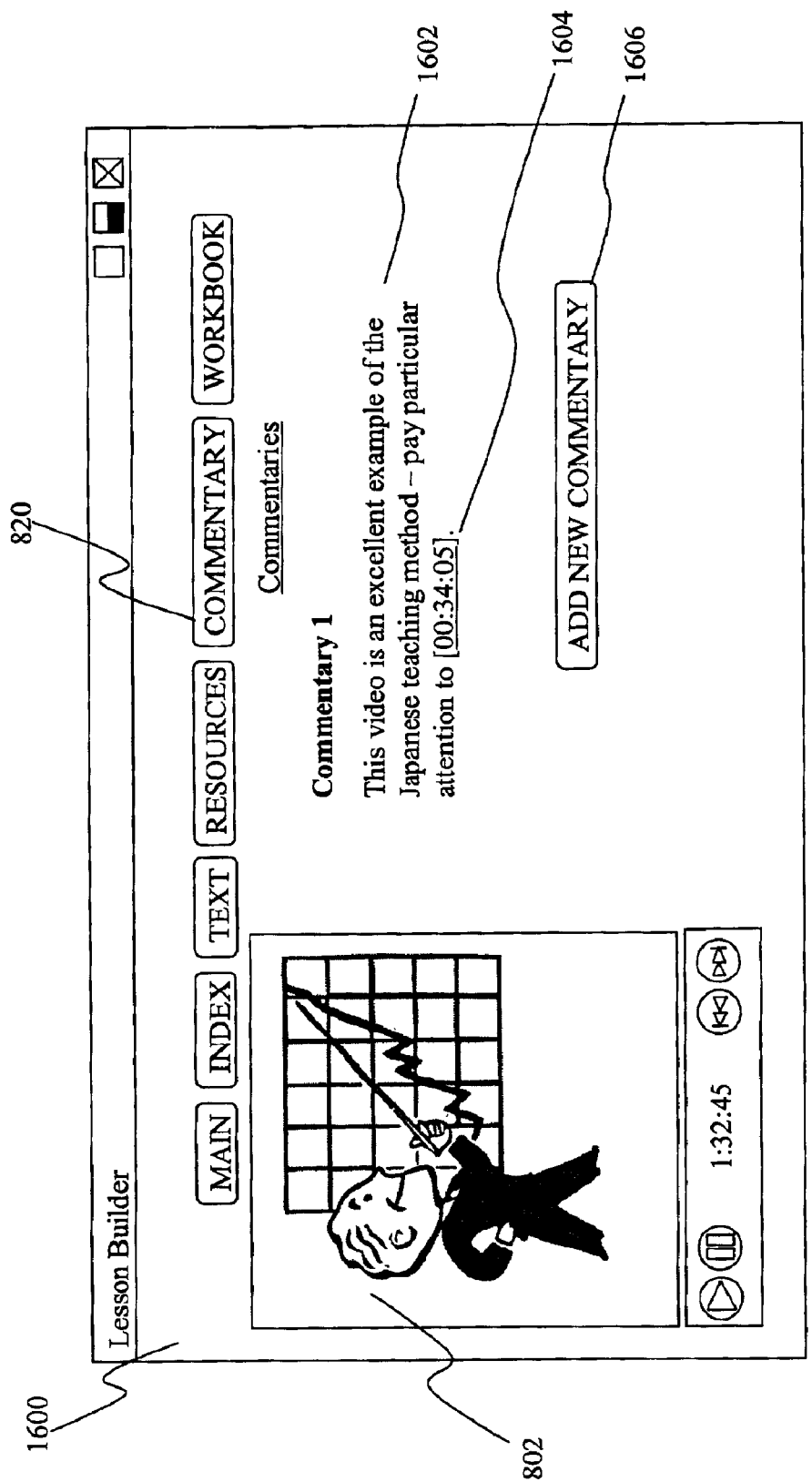
FIG. 16 is a screen shot depicting a commentary page for the lesson-building program.

The commentary button 820 in the navigation system links to a commentary page, as shown in FIG. 16. The commentary page 1600 lists comments 1602 by the teacher-user regarding segments of a video case. Note that comments 1602 can also be provided by other people, such as experts in the field or other students who have ideas of particular interest. The comments 1602 can optionally include time-code markers 1604 to identify a portion of the video to which they apply. The media player 802 is provided to allow the teacher-user to view the portions of a video case relevant to the comments 1602. An add new commentary 1606 button is provided to enable a teacher-user to open a commentary adding/editing page as shown in FIG. 17.

Figure 17:
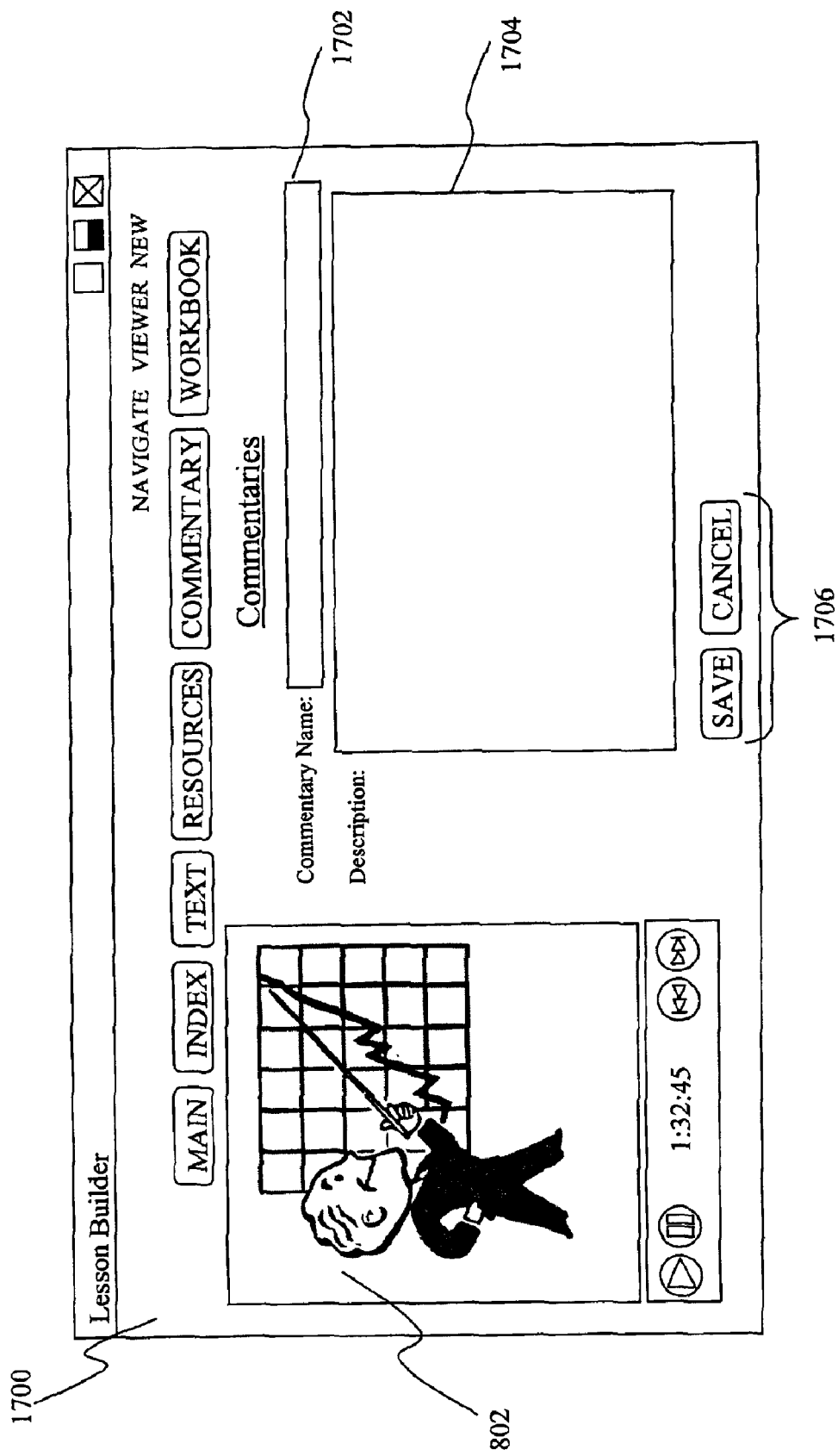
FIG. 17 is a screen shot depicting a commentary adding/editing page for the lesson-building program.

The commentary adding/editing page 1700 includes controls for adding and editing comments 1602 (not shown in FIG. 17). A commentary name box 1702 is provided to enable a teacher-user to add the title for a new comment or to edit a title for a previously existing comment. A comment description text box 1704 is also added in order to allow a teacher-user to enter the text of a comment 1602. Save and cancel buttons 1706 are provided to enable the teacher-user to accept or reject the new or edited comment. The media player 802 is provided to allow a teacher-user to view portions of a video case in order to assist in preparing a comment 1602. Although not shown, time-code markers and options to allow for the addition of file or link attachments may be provided to enhance the utility of comments 1602.

Figure 18:
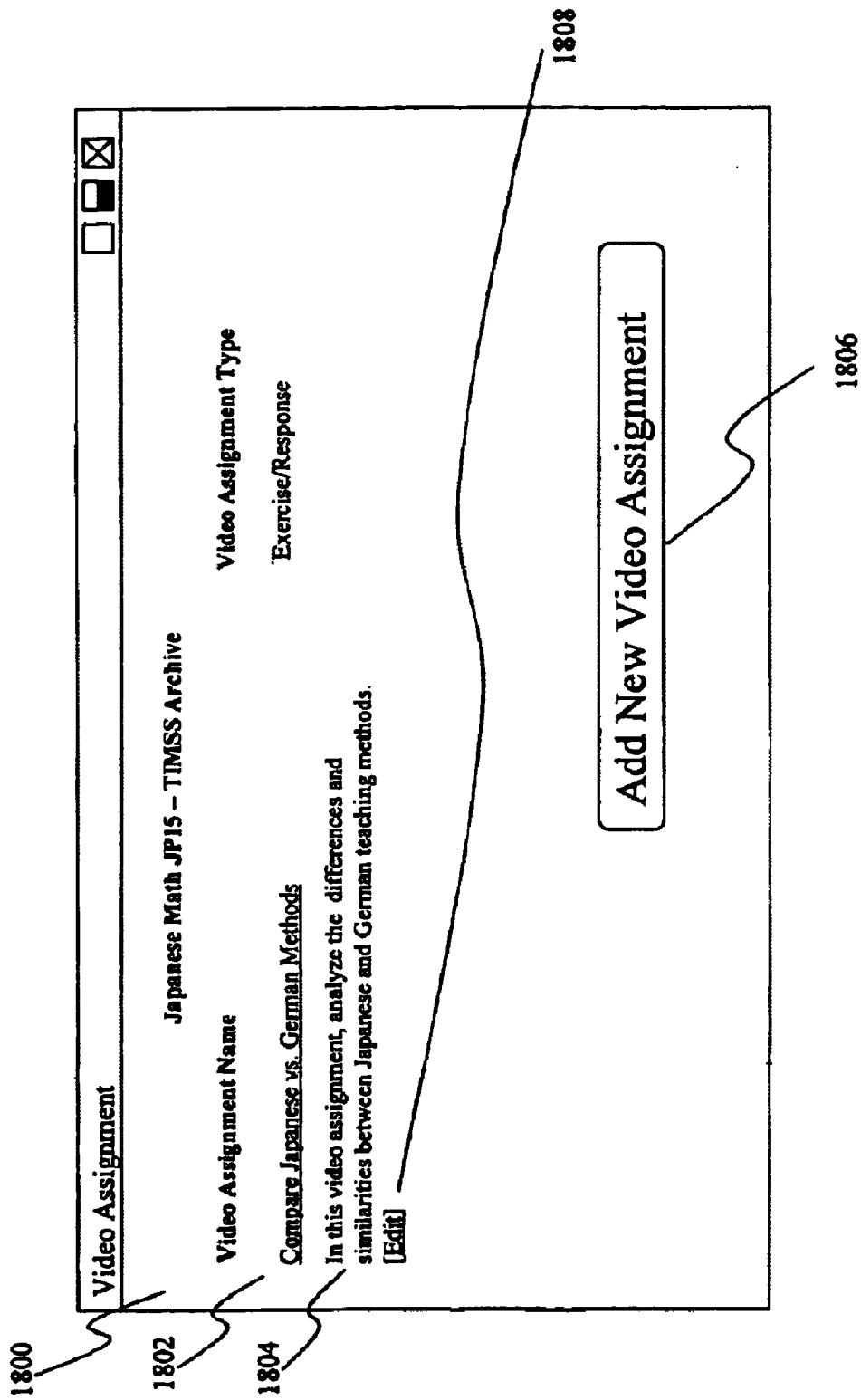
FIG. 18 is a screen shot depicting an exercise page for the lesson-building program.

The workbook button 822 on the navigation system links to one of four pages, an exercises page, a forums page, an add note page, and a view notebook page. As shown in FIG. 18, the exercises page 1800 includes an exercise list 1802, which comprises various exercises designed by the teacher-user for a user to perform. As shown, each exercise 1804 includes an exercise name and description as well as an indication of the exercise type. Responses to the exercises 1804 may be set so that only the teacher-user may view them or they may be set so that they may be reviewed by all users having access to the lesson. In the lesson-building program 114 (not shown in FIG. 18), the teacher user may add new exercises via an add new exercise button 1806 or may edit existing exercises via an exercise-editing link 1808. Note that the exercise page 1800, as shown is in the form of a floating or pop-up window, which would typically appear on top of the page from which it was called. Although the various pages provided by the figures herein are shown as base pages or floating or pop-up windows, the actual configuration of them may be tailored as needed for a particular embodiment.

Figure 19A:
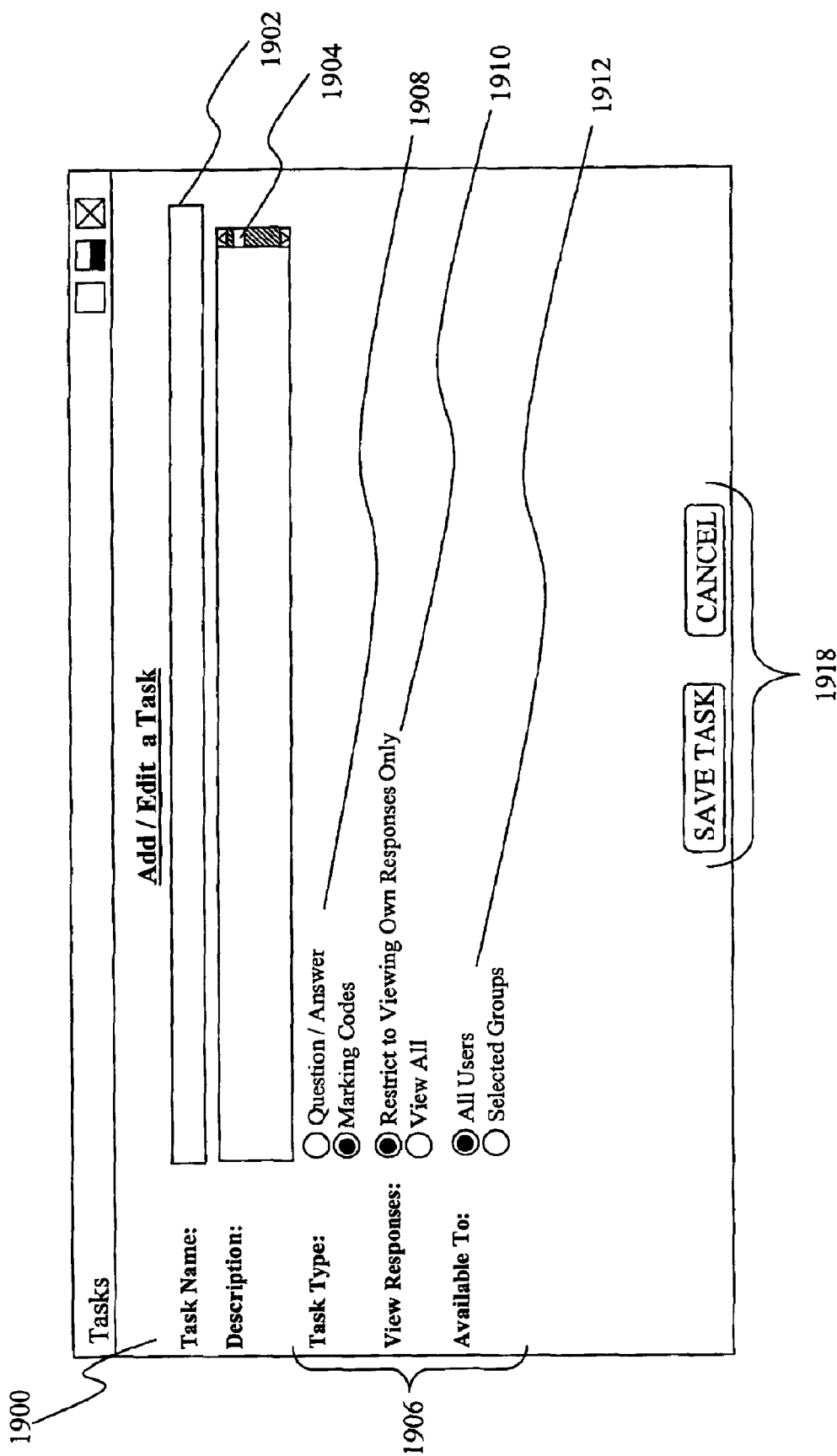
FIG. 19(a) is a screen shot depicting an exercise adding/editing page for the lesson-building program.

The add new exercise button 1806 and the exercise-editing link 1808 link to a exercise adding/editing page as shown in FIG. 19(a) or FIG. 19(b). The exercise adding/editing page 1900 shown in FIG. 19(a) and FIG. 19(b) includes an exercise name text box 1902 and an exercise description text box 1904 for entering or editing the name and description of an exercise, respectively. In the embodiment shown, the exercise adding/editing page 1900 includes a group of exercise-tailoring controls 1906. Depending on the specifics of a particular embodiment, the exercise adding and editing process may occur either as a sequential building with multiple windows to walk a teacher-user through the process, or it may comprise fewer windows that are actively programmed to re-configure in real-time depending on selections made by a teacher-user. A combination of these methods of exercise adding and editing is demonstrated in FIG. 19(a) and FIG. 19(b), supplemented by subsequent figures. As shown in FIG. 19(a), radio buttons are provided for options regarding the exercise (task) type 1908, for indicating by whom the exercise responses may be viewed 1910, and for indicating to whom, among the viewers of the lesson, the exercise is available 1912.

As an example of the process of selection-based real-time re-configuration of the pages, FIG. 19(b) may be compared with FIG. 19(a). Note that the exercise type 1908 in FIG. 19(a) is set to marking codes, while in FIG. 19(b) it is set to exercise/answer. These selections refer to different exercise types, with the marking codes referring to exercises incorporating a multiple choice format (i.e., "a", "b", "c", "d" or "yes/no"—type responses), and with exercise and answer format referring to essay or short-answer type responses. Note that for exercise/answer-type responses, the exercise adding/editing page 1900 configures to the page shown in FIG. 19(b), including a exercise application selection field 1914, which allows the teacher-user to determine whether the exercise applies to only the current lesson, all lessons and cases within a predefined set (such as lessons developed by the teacher-user, other lessons comprising a course including the current lesson, or all lessons in the system), or to a selected lesson and/or course. An option for allowing users to attach documents 1916 is also provided in order to give users an option of submitting answers using a text-editor/word processor of their choice. Attaching documents can also provide users with an option of attaching non-text files, such as drawings, scanned-in documents, etc., which could not be included simply through the use of a text box.

Finally, in the exercise adding/editing page 1900 as shown in FIG. 19(a) and FIG. 19(b), save exercise and cancel buttons 1918 are provided to allow the user to finalize the exercise, or in the case where more information must be provided by the teacher-user, to move to another page to continue the exercise adding/editing process.

Figure 20A:
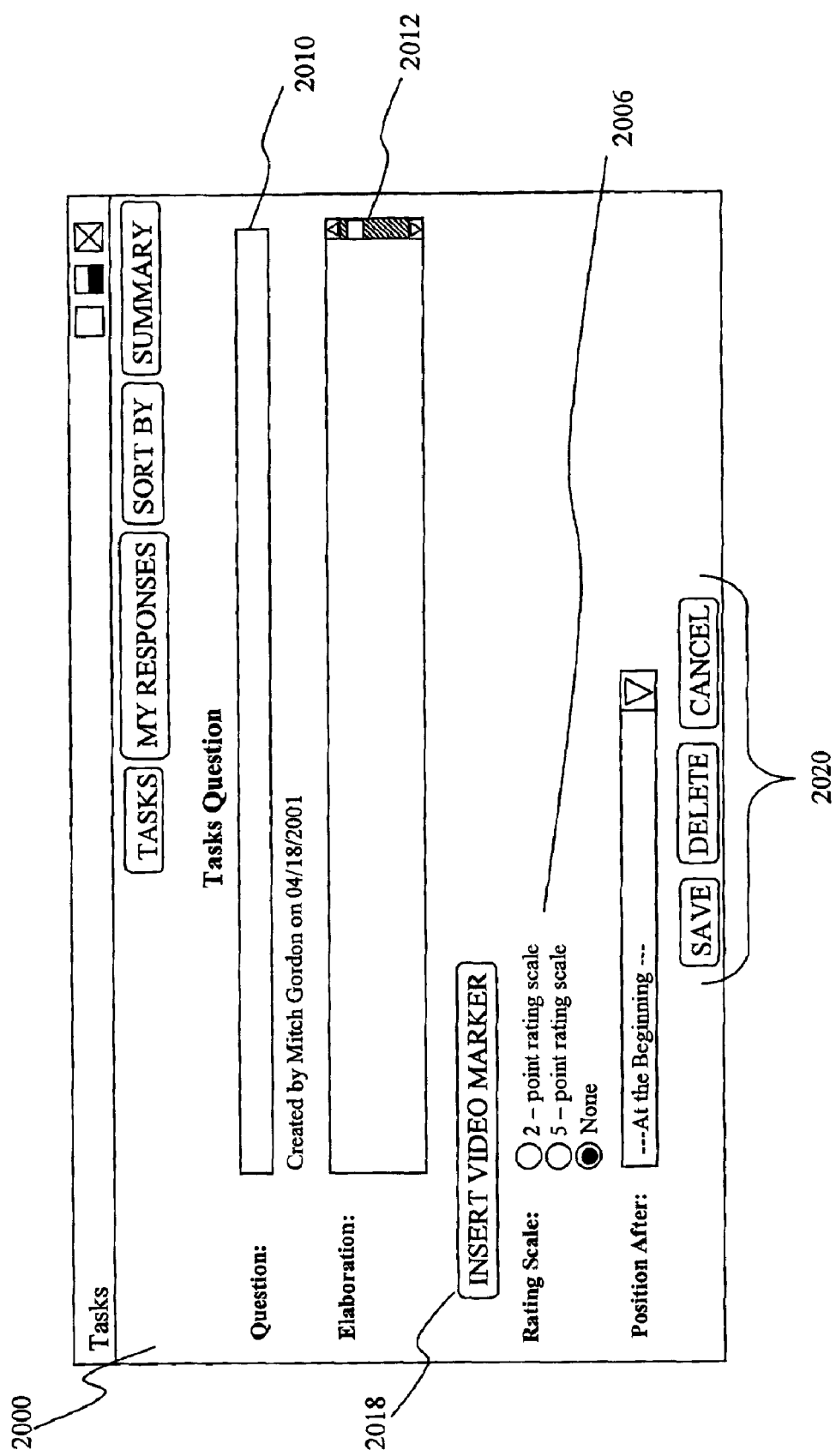
FIG. 20(a) is a screen shot depicting a question/answer exercise (task) information page for the lesson-building program.
Figure 20B:
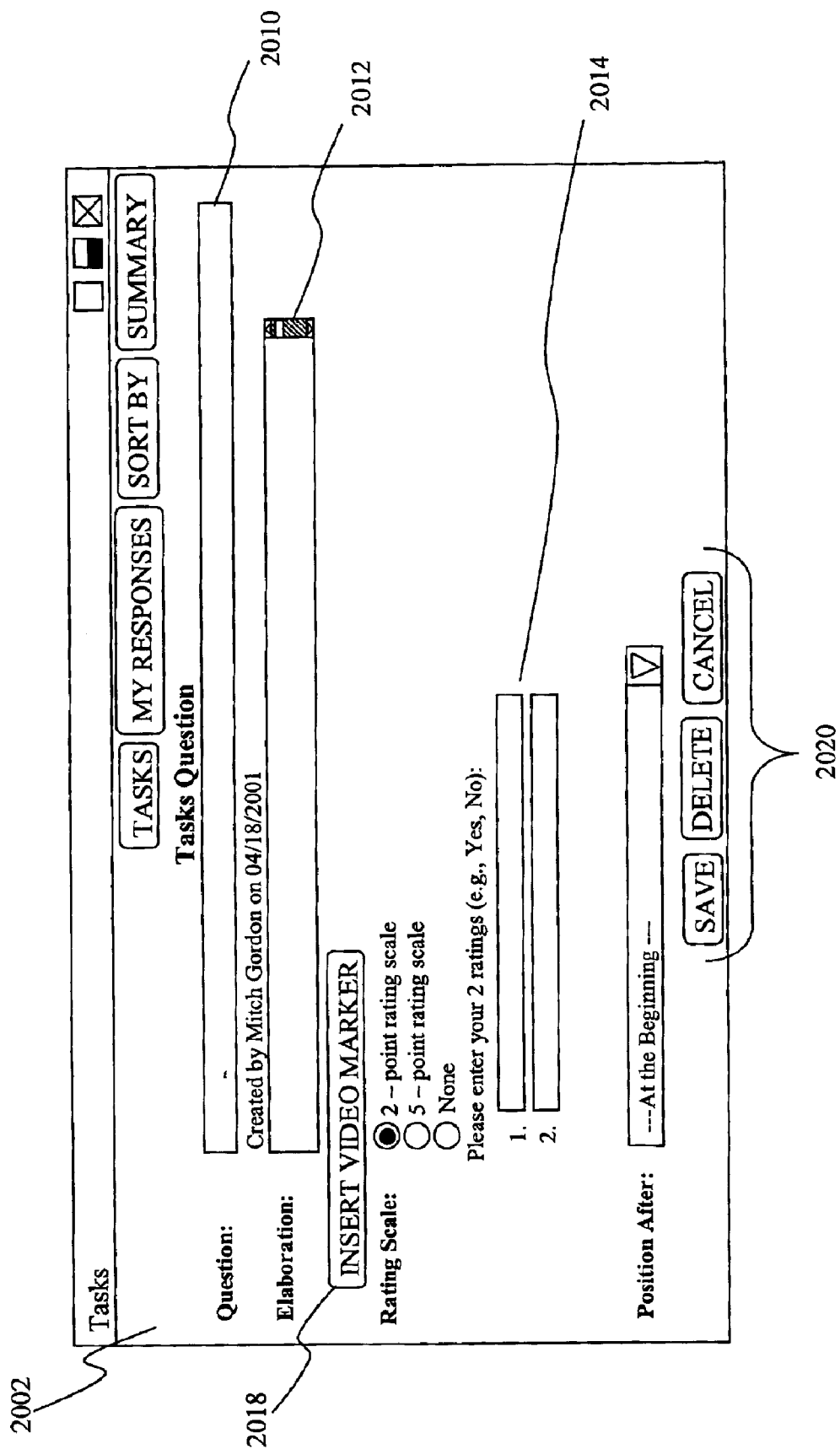
FIG. 20(b) is a screen shot depicting a 2-point rating scale of a time-indexed video case task (exercise) page for the lesson-building program.
Figure 20C:
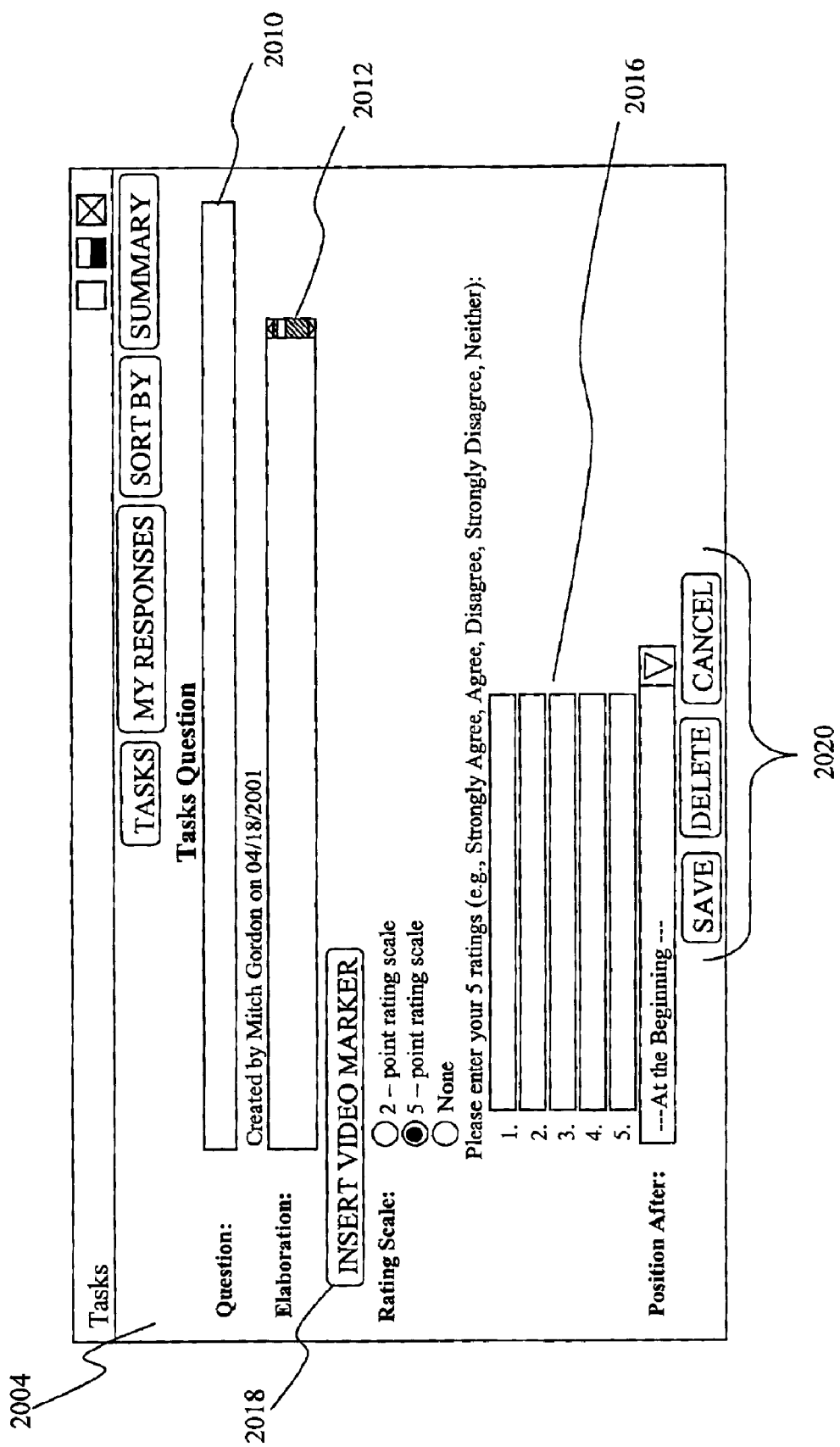
FIG. 20(c) is a screen shot depicting a 5-point rating scale of a time-indexed video case task (exercise) page for the lesson-building program.

An example of a page that may appear subsequent to saving an exercise via pages FIG. 19(a) and FIG. 19(b) is shown in FIG. 20(a), FIG. 20(b), and FIG. 20(c). A exercise/answer exercise information page 2000, a 2-point rating scale exercise information page 2002, and a 5-point rating scale exercise information page 2004 are shown in FIG. 20(a), FIG. 20(b), and FIG. 20(c), respectively. Note that the appearance of these pages depends on a choice made in a rating scale selection radio button 2006. If the teacher-user selects to have no rating scale, then the only entries available for the exercise are via the exercise text box 2010 and the exercise elaboration text box 2012. Depending on whether the teacher-user selects a 2-point rating scale or a 5-point rating scale, the page is re-configured to provide a two-entry rating field 2014 or a five-entry rating field 2016, as shown in FIG. 20(b) and FIG. 20(c), respectively. Note that many other rating field configurations could be provided. For instance, a teacher-user could be prompted for the number of ratings, to allow for a greater variety of rating scales. Rating scales can be employed for exercises of degree (e.g., strongly agree, agree, disagree, strongly disagree, neither) or for multiple-choice exercises. An insert video marker button 2018 is also provided in order to allow the teacher-user to associate the exercise 1804 with a particular point in a video case displayed in the media player 802. For example, an insert video marker button 2018 allows the exercise author (i.e., teacher-user) to indicate and embed a video segment containing subject matter pertinent to the textual description of the exercise, thereby allowing a user (i.e., respondent) to read the text of the exercise, click on the video marker indicating the start and end of a video segment, and thereafter play and view the video segment displayed in the media player 802 to its ending point in light of the textual description of the exercise. An exercise respondent is allowed to insert a video marker that is linked to a video segment containing subject matter pertinent to the text of the response, thereby allowing a user to read the textual response, click on the video marker indicating the start and end of the video segment, and thereafter play and view the video segment to its ending point in light of the textual response. The insert video marker button 2018 can cause a pop-up window (not shown) to open for the addition of a video marker, basically allowing a user to identify and mark the starting and ending points (i.e., otherwise referred to as time-codes) of a video segment, or it can re-configure the page to provide space for entry. Finalizing buttons 2020, including options for saving, deleting, and canceling the current exercise are also provided.

Figure 21:
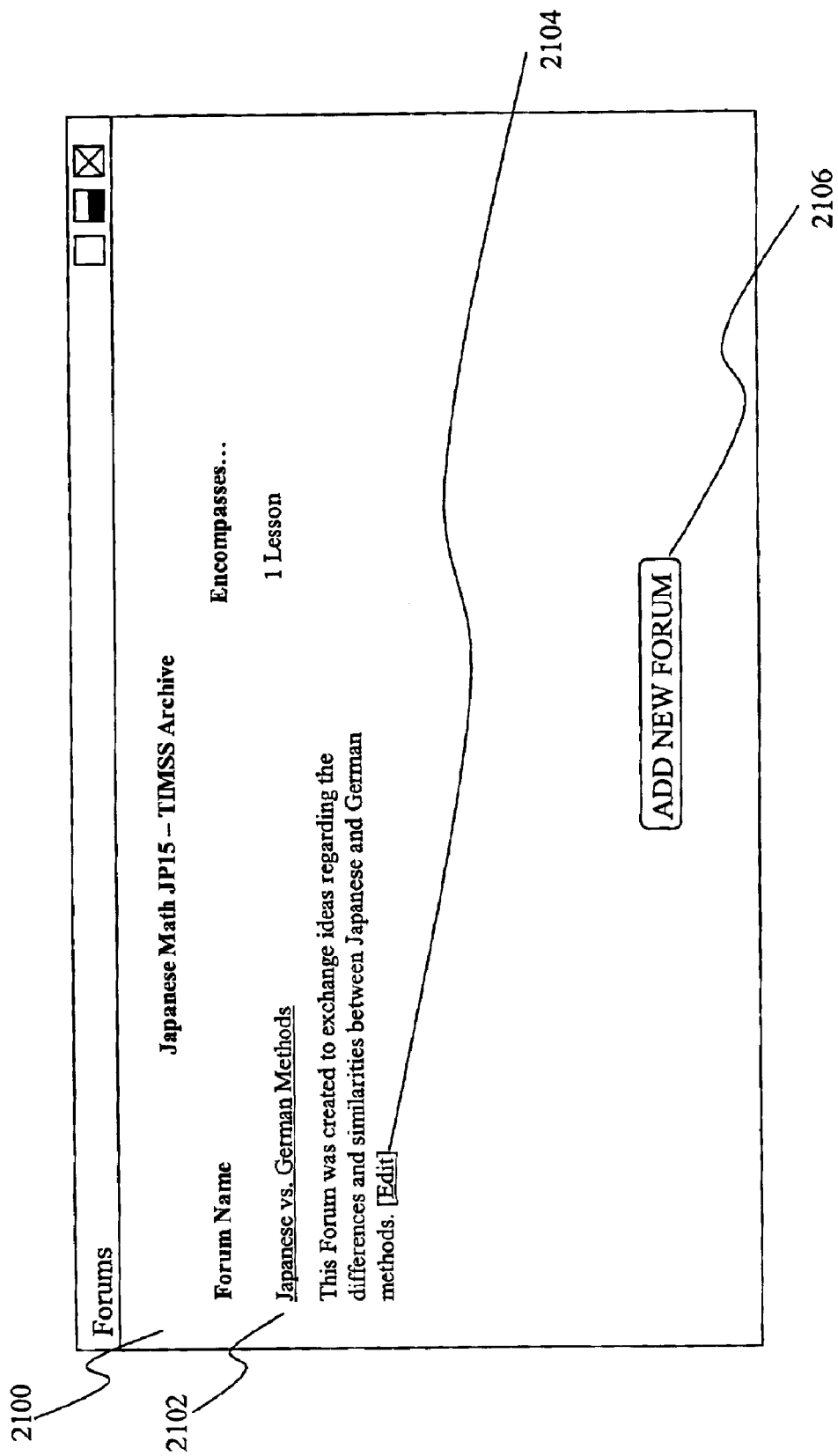
FIG. 21 is a screen shot depicting a forums page for the lesson-building program.

In addition to providing access to exercise creation facilities, the workbook button 822 also provides access to time-indexed video case discussion forums as shown in FIG. 21. The forums page 2100 provides a list of forums available to the particular user and for the particular course or lesson. The actual scope of access for a particular forum may be determined by the teacher-user. Forums provide a way for teacher-users or users to interact with one another. Forums may be common to groups of lessons or courses, with access provided on the basis of subject matter relevancy. In the embodiment of the forums page 2100 used in conjunction with the lesson-building program 114 (not shown in FIG. 21), a forum list 2102 provides a user with all of the forums they can access. Note that this screen appears different depending on access permissions granted. The forum list 2102 provides a forum title, a forum description, and an indication of the lessons or courses to which the forum relates. In the lesson-building program, a forum editing link 2104 and an add new forum button 2106 are provided to enable a teacher user to edit an existing forum or to add a new forum.

After a teacher-user clicks on either the forum editing link 2104 or the add new forum button 2106, a forum adding/editing page is displayed, as shown in FIG. 22. The forum adding/editing page 2200 includes various controls 2202 to enable a teacher-user to create a forum and to provide an appropriate scope for the forum (in terms of lessons or courses it encompasses). As shown, text boxes are provided for the forum name and a forum description. Radio buttons are provided to allow the teacher-user to indicate a forum type and the scope of the forum. Examples of useful forum types include free discussion in which users can add topics and/or respond to topics created by others and guided discussions in which only the forum owner (i.e., the teacher-user) can create new topics, and where users are able to respond to pre-created topics. Note that a forum may be designated as applying to a particular lesson, all lessons and cases, or selected lessons and/or cases. The lesson's applicability and availability may be governed separately by the teacher-user.

Figure 23:
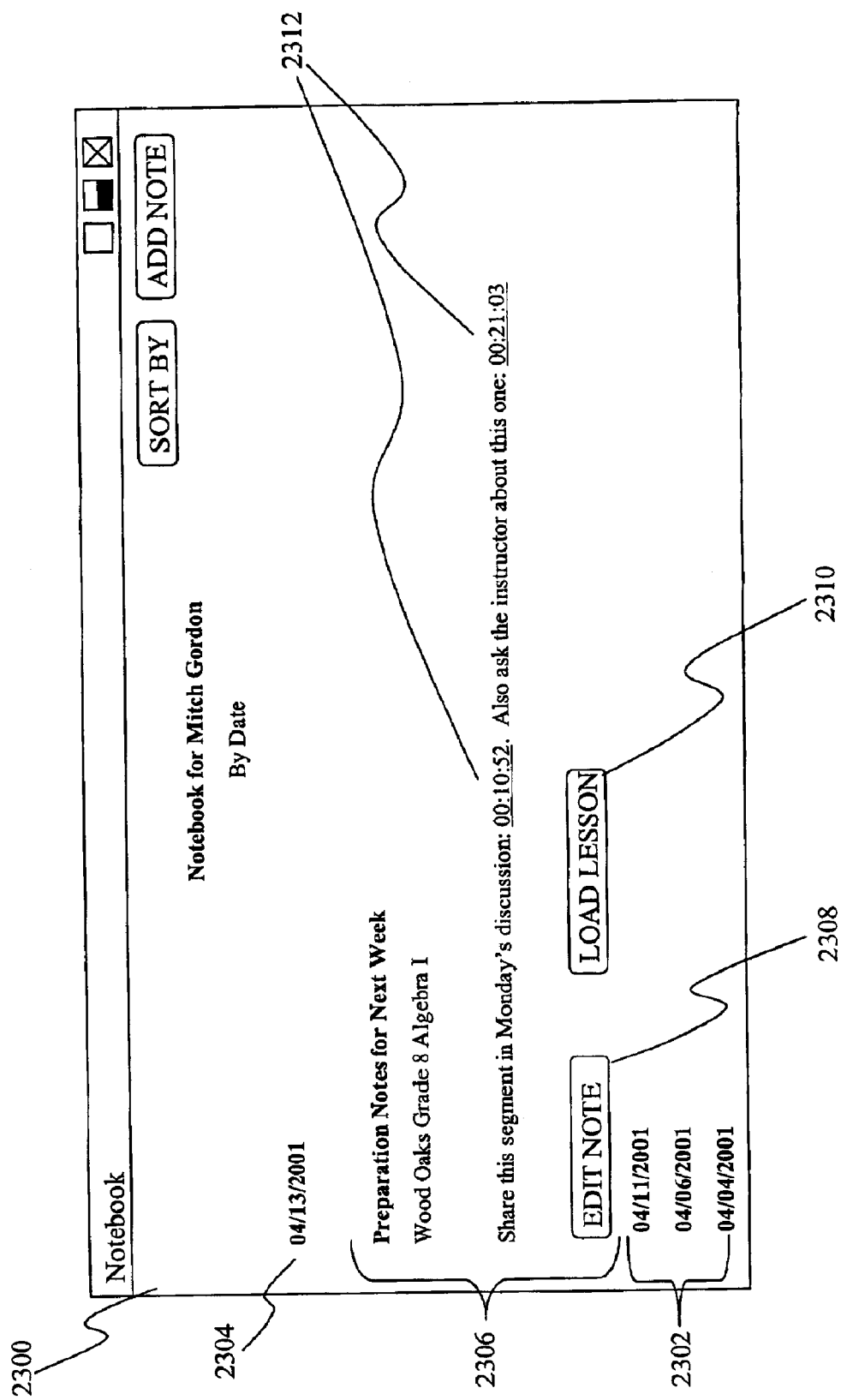
FIG. 23 is a screen shot depicting a notebook page of time-indexed video case personal user notes for the lesson-building program.

In addition to providing access to forums, the workbook button 822 also provides a teacher-user or a general user with access to a private notebook, which may be viewed as a list of notes. The teacher-user or general user can add notes or edit existing notes. As shown in FIG. 23, a notebook page 2300 provides a list of notes 2302. The list of notes 2302 may be tagged and sorted by date, associated lesson, title, subject, or any other desired sorting mechanism. After clicking on a note link 2304, the note expands to provide the information contained in the note 2306.

On the notebook page 2300, an expanded note demonstrates the inclusion of time-codes 2312 into the text of the note. Preferably, the time codes in the note serve as links to begin playback of a video case in the media player 802. The expanded note also provides an edit note button 2308 and a load lesson button 2310.

Figure 24:
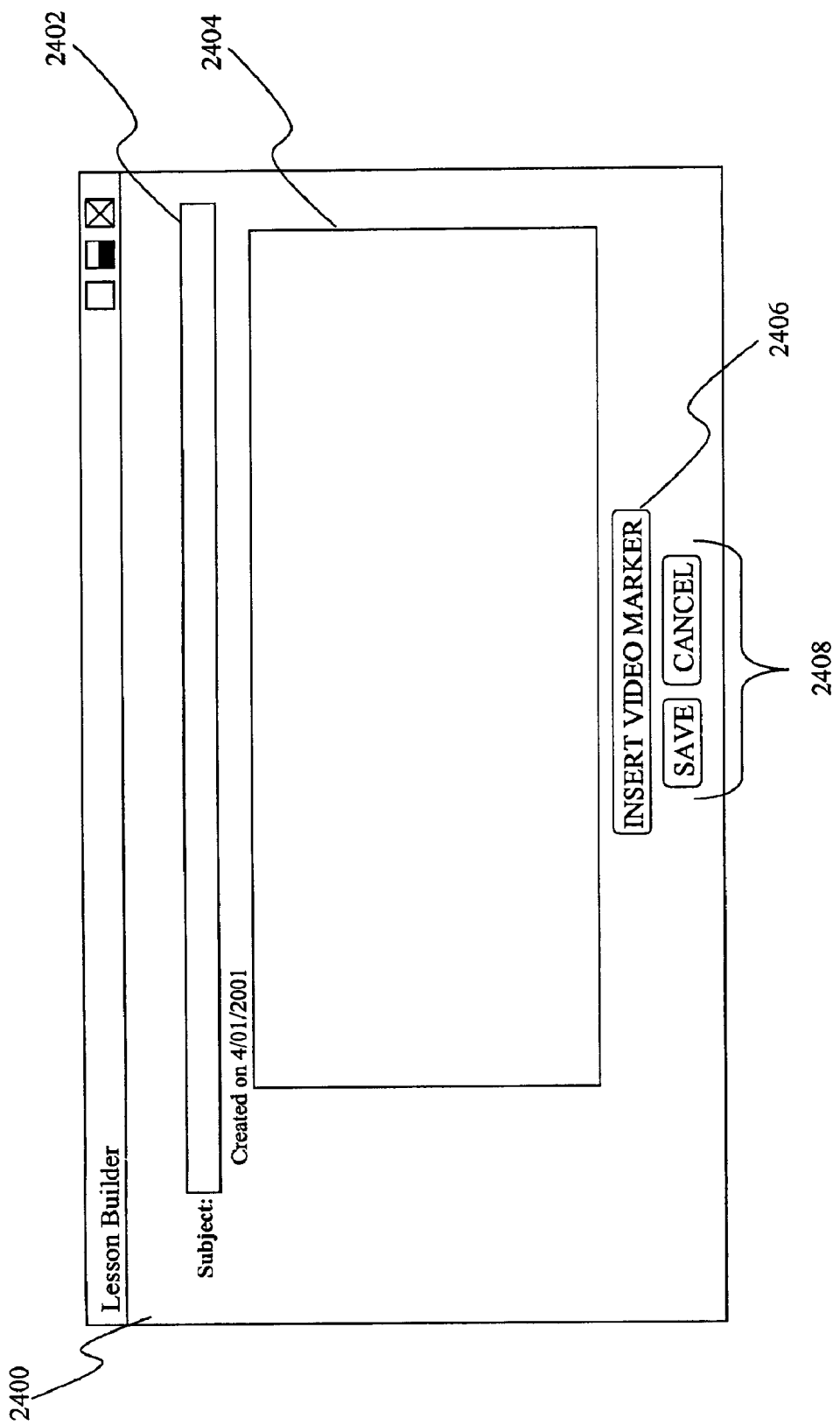
FIG. 24 is a screen shot depicting a note editor page of time-indexed video case personal user notes for the lesson-building program.

The edit note button 2308 opens a note editor such as that shown in FIG. 24. The note editor page 2400 includes a subject text box 2402 and a note text box 2404. An insert video marker button 2406 is also provided in order to allow the teacher-user or a general user to insert a blank time-code to allow the association of a note with a particular portion of a video case. Save and cancel buttons 2408 are also provided to enable a teacher-user or user to confirm their additions or changes.

Typically, the notebook for a teacher-user or a general user is present for each session in which the teacher-user or general user is logged onto the system. In other words, the notebook is stored in the user database 106 and is associated with a particular user regardless of the lesson or course in which they are participating. Additionally, the functionality of the notebook is generally the same whether in use for a teacher-user or a general user. The notebook serves as a personal and private repository of information.

Figure 25:
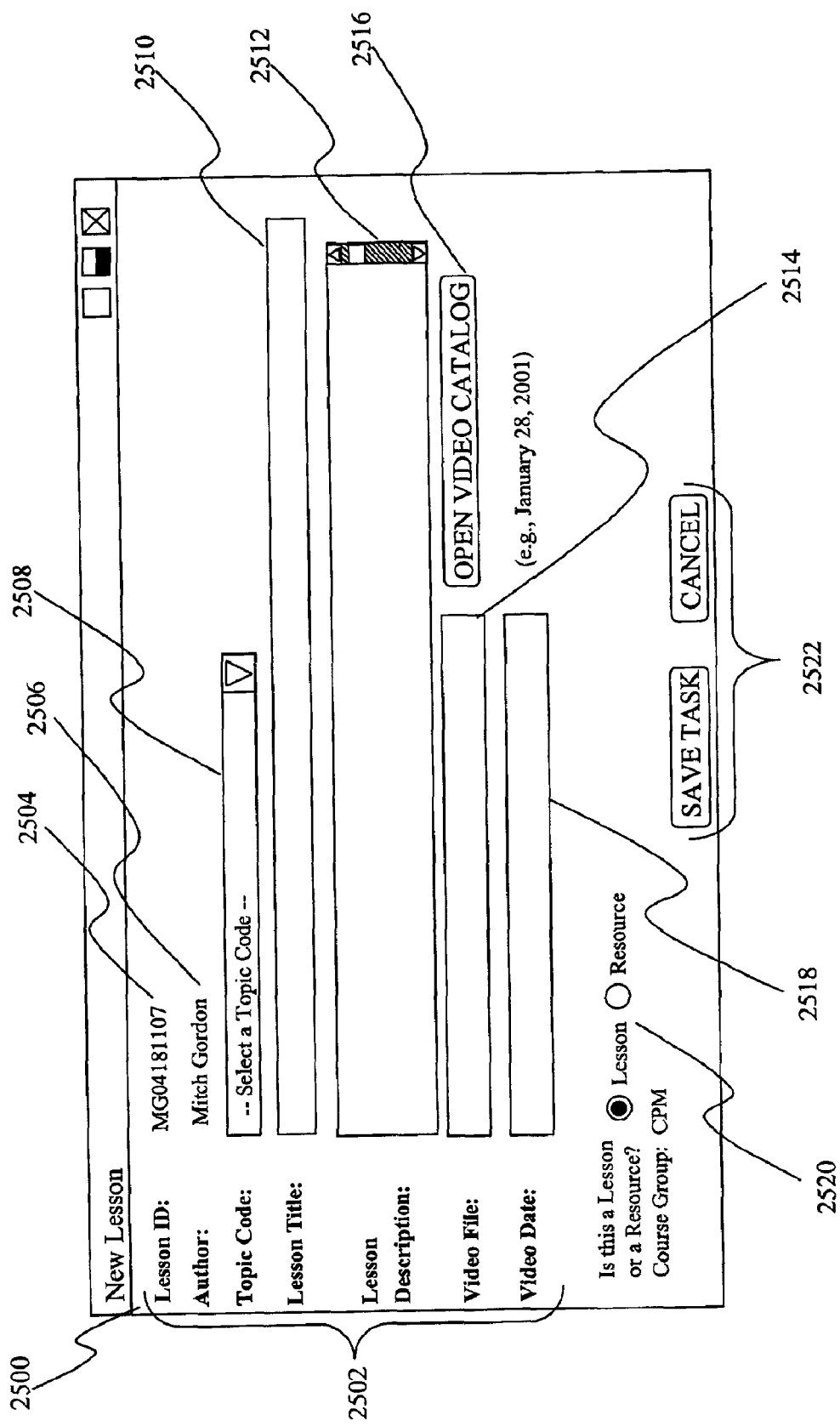
FIG. 25 is a screen shot depicting an example of a page which may serve as the entry point into a lesson-building wizard for the creation of a lesson.

As previously stated, the new lesson link 828 can link a teacher-user with either an empty lesson or into a lesson creation wizard depending on the specifics of a particular embodiment. An example of a lesson-building page that the new lesson link 828 may open is shown in FIG. 25. The lesson-building page 2500, as shown, includes basic controls 2502 for setting up a lesson. Note that in the embodiment shown, the controls 2502 are essentially the same as those on the edit lesson summary page 900, including a lesson ID number 2502, which provides a unique identity for the lesson as a collection of files, the lesson author name 2504, a lesson topic code drop down box 2506 for identifying the subject matter of the lesson, a lesson title text box 2508, a lesson description text box 2510, a video file name box 2512, a video catalog opening button 2514, and a video date box 2516. The new lesson may be designated as a lesson or as a resource by means of radio buttons 2518. Note that in this case, the same page may be used to enter a video resource or to create a new lesson. Depending on the particular embodiment, this may or may not be desirable. In addition, the lesson-building page 2500 includes save and cancel buttons 2520 to allow for confirmation of the information entered into the lesson creation page 2500 or for its cancellation.

Figure 26:
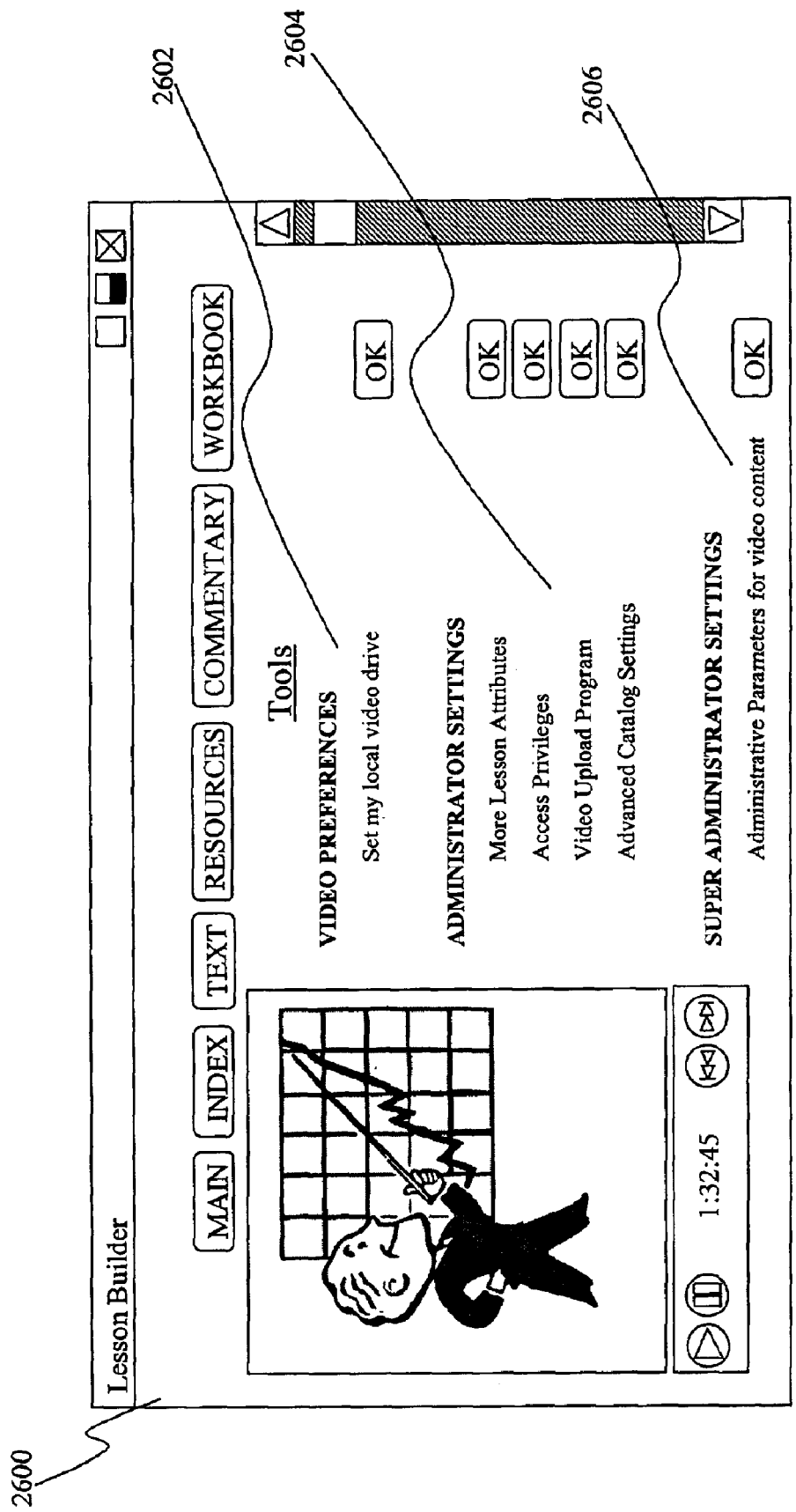
FIG. 26 is a screen shot depicting a tools page for the lesson-building program.

Traversing the tools link 830 in the navigation system provides access to a tools page, as exemplified in FIG. 26. The tools page 2600 generally provides access to various user-specific and administration settings that control the system. The changes implemented through the tools page 2600 may be system wide or they may be made specific to a user, a group of users, a course, a group of courses, a lesson, a group of lessons, or to a session. The settings available on the tools page 2600 may be tailored to the particular needs of a specific embodiment. Typical settings available through the tools page 2600 include video preferences 2602, administrator settings 2604, and super administrator settings 2606. The video preferences may allow a teacher-user or a general user to set their local video drive in order to designate videos locally for viewing rather than over a network in order to conserve bandwidth. To set the local video drive, typically a window is opened to allow a user to enter either a relative or absolute path to a video or to browse on their system for a video. Note that depending on the configuration of the system, a local video may be played from a local area network to which the user is connected (assuming that the video server for the system resides outside the local area network), or it may be played directly from the user's computer (stored on a hard drive or through other computer-readable media). The administrator settings can include settings such as additional lesson attributes including related lessons, courses that use the lesson, key words associated with the lesson for search and retrieval purposes, and other bibliographic information related to the lesson; user access privileges; access to a video upload program for uploading a video to the system server (s); and other catalog settings. The super administrator settings typically include administrative parameters for video content and other settings needed for general system administration.

Figure 27:
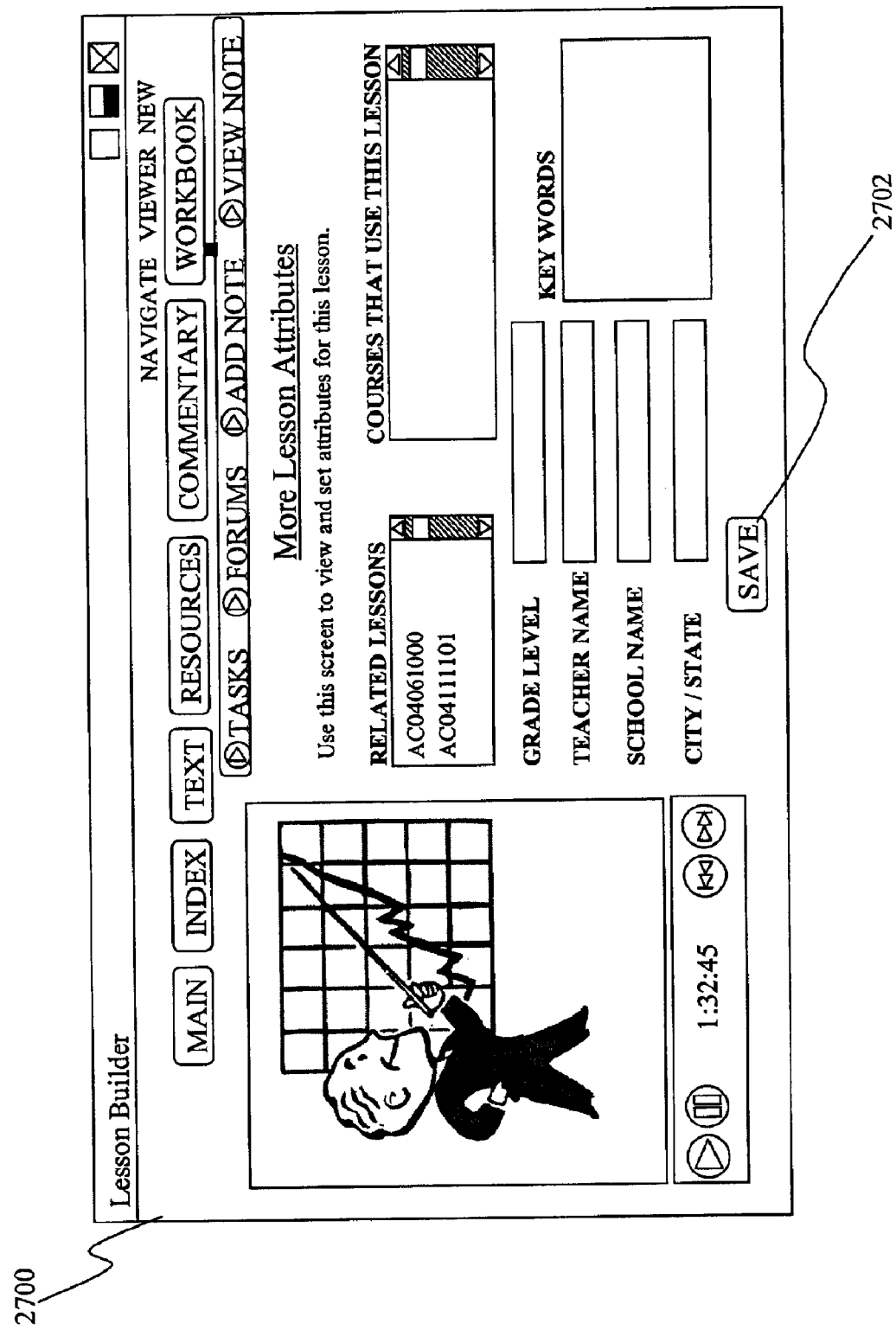
FIG. 27 is a screen shot depicting a more lessons attributes page for the lesson-building program.
Figure 28:
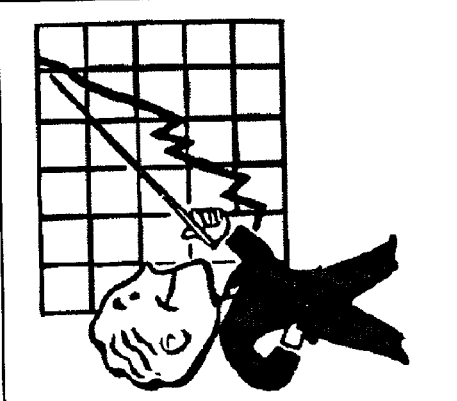
FIG. 28 is a screen shot depicting an access privileges page for the lesson-building program.
Figure 29:
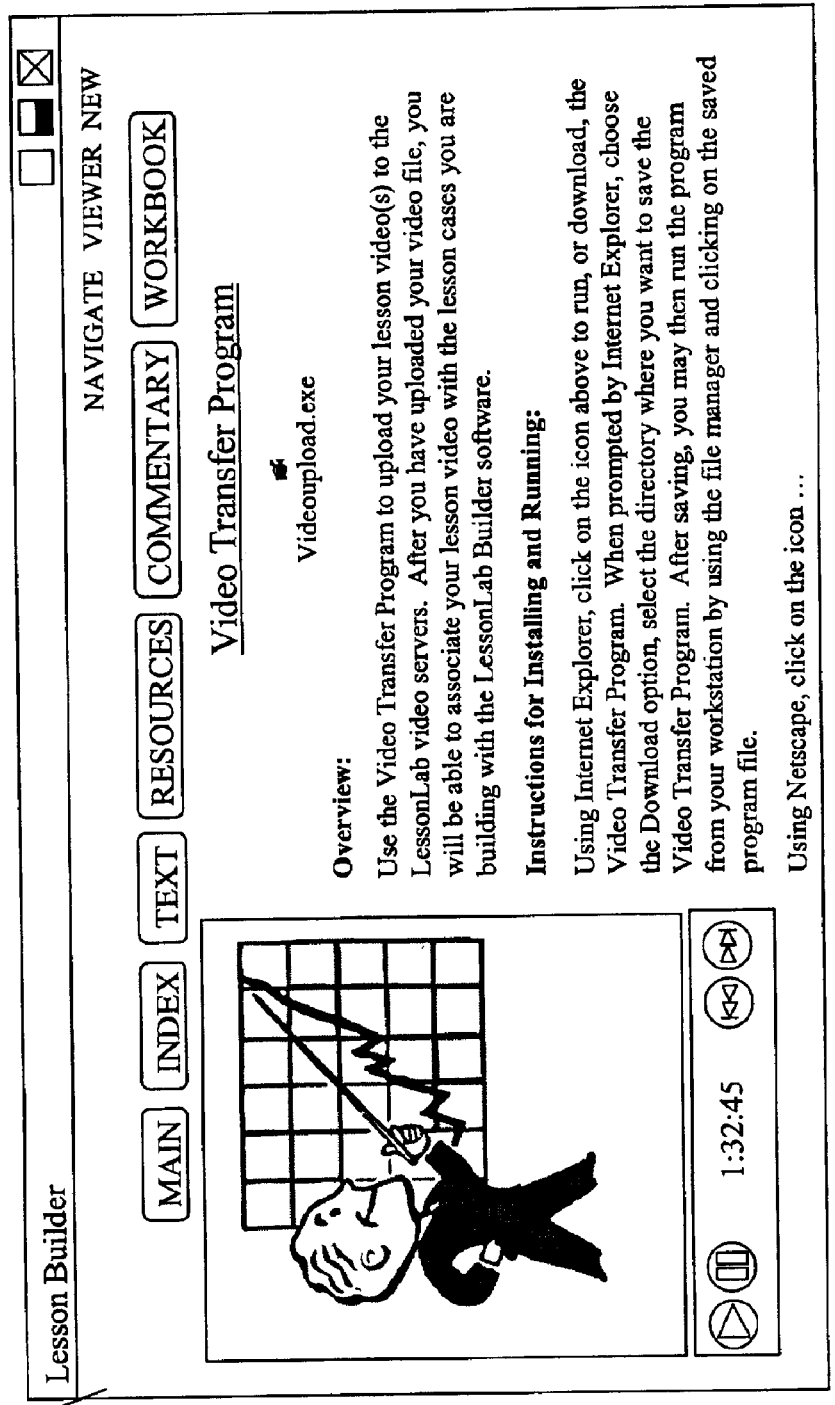
FIG. 29 is a screen shot depicting a video upload program page for the lesson-building program.

Examples of a more lessons attributes page, an access privileges page, and a video upload program page are depicted in FIG. 27, FIG. 28, and FIG. 29, respectively. As shown in FIG. 27, the more lesson attributes page 2700 allows a teacher-user to indicate lessons related to the current lesson, courses that use the current lesson, key words associated with the lesson for search and retrieval purposes, and other bibliographic information. Specifically, in the embodiment of the lesson attributes page 2700 depicted in FIG. 27, the other bibliographic information includes text boxes for entering the grade level being taught in the video case, the teacher name of the teacher depicted in the video, the school name associated with the teacher, and the city/state of the school. Additionally, a save button 2702 is provided to allow the teacher-user to save the information entered into the more lesson attributes page 2700.

The access privileges page 2800 allows a teacher-user to control the access privileges related to a lesson. The access privileges shown in the access privileges page 2800 of FIG. 28 include view only, which allows for entry of a list of the names of individuals or groups who can only view the lesson; comment and view, which allows for entry of a list of the names of individuals or groups who can view or comment on the lesson's content; edit, comment, and view only, which allows for entry of a list of the names of individuals or groups who can edit, view, or comment on the lesson; and administer, which allows for entry of a list of names of individuals or groups who can administer the lesson. Note that, in this embodiment, the system must allow for users to be set into groups of users to be treated as a single user for purposes of administrative actions within the system.

The video upload program page 2900 depicted in FIG. 29 provides access to a mechanism to allow a teacher-user to upload a locally created video case to the system server(s). This program acts by using a transfer protocol such as file transfer protocol (FTP), hypertext transfer protocol (HTTP), or other protocols to transfer the video case to the system server. The uploading mechanism may be tailored to the particular needs of the network, and can either be an off-the-shelf upload program or can be specifically developed for the purposes of the system.

One important note regarding uploading, whether for video cases or for files associated with resources, comments, notes, or answers to exercises is the need for anti-virus and/or other security protection. Unless protected, the system is very vulnerable to attack from users or others who gain access to the system. Protection is particularly important in cases where users are able to both upload and download video cases from the system server. Because file transfer can take place in both directions, it is particularly important to protect users from other users who upload corrupted files or otherwise corrupt files on the system server.

The lesson-viewing program 116 is very similar to the lesson-building program 114 in its interface. The main difference lies in the fact that the lesson-viewing program 114 does not allow users to access certain features of the lesson-building program 116, as the users of the lesson-viewing program 114 are typically users under the supervision of a teacher-user. The differences between the lesson-viewing program 114 and the lesson-building program 116 will be more apparent with reference to the disclosure relating to the lesson-viewing program 116 provided below.

Lesson-viewing Program 116

The interface of the lesson-viewing program 116 mirrors that of the lesson-building program 114. Upon logging on to the system, a welcome screen 600, as was shown in FIG. 6 is presented to allow a user to enter a user ID and password in order to gain access to the system.

After gaining entry to the system, the user is presented with a screen providing a menu of the courses, lessons, and resources available to the user. The menu of lessons and cases is presented essentially the same as was shown in FIG. 7. After selecting a course, the lessons associated with the course are presented to allow the user to select a lesson to study. Alternatively, the user can view a particular resource accessible to the user.

Figure 30:
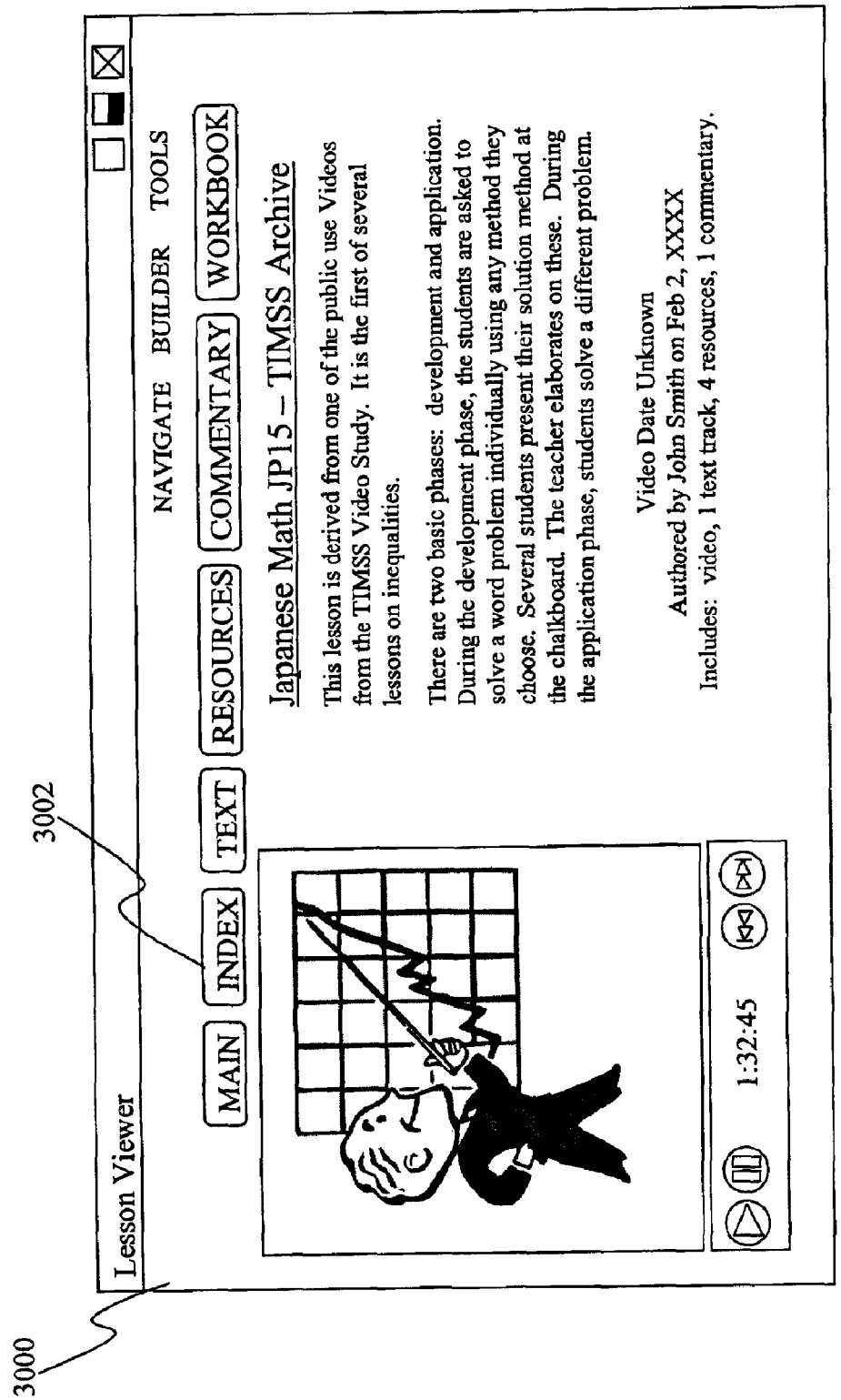
FIG. 30 is a screen shot depicting a lesson summary page for the lesson-viewing program.

When the user opens a particular lesson, a lesson summary page as presented in FIG. 30 is displayed. Note that the lesson summary page 3000 for the lesson-viewing program 116 is very similar to the lesson summary page 800 presented relative to the lesson-building program 114 in FIG. 8. The main difference between the lesson summary pages for the lesson-viewing program 116 and the lesson-building program 114 is the absence of the summary-editing button 834, which is present in the lesson-building program 114 in order to allow a teacher-user to modify the information presented. The navigation system for the lesson-viewing program 116 is generally the same as that which was presented for the lesson-building program 114.

Figure 31:
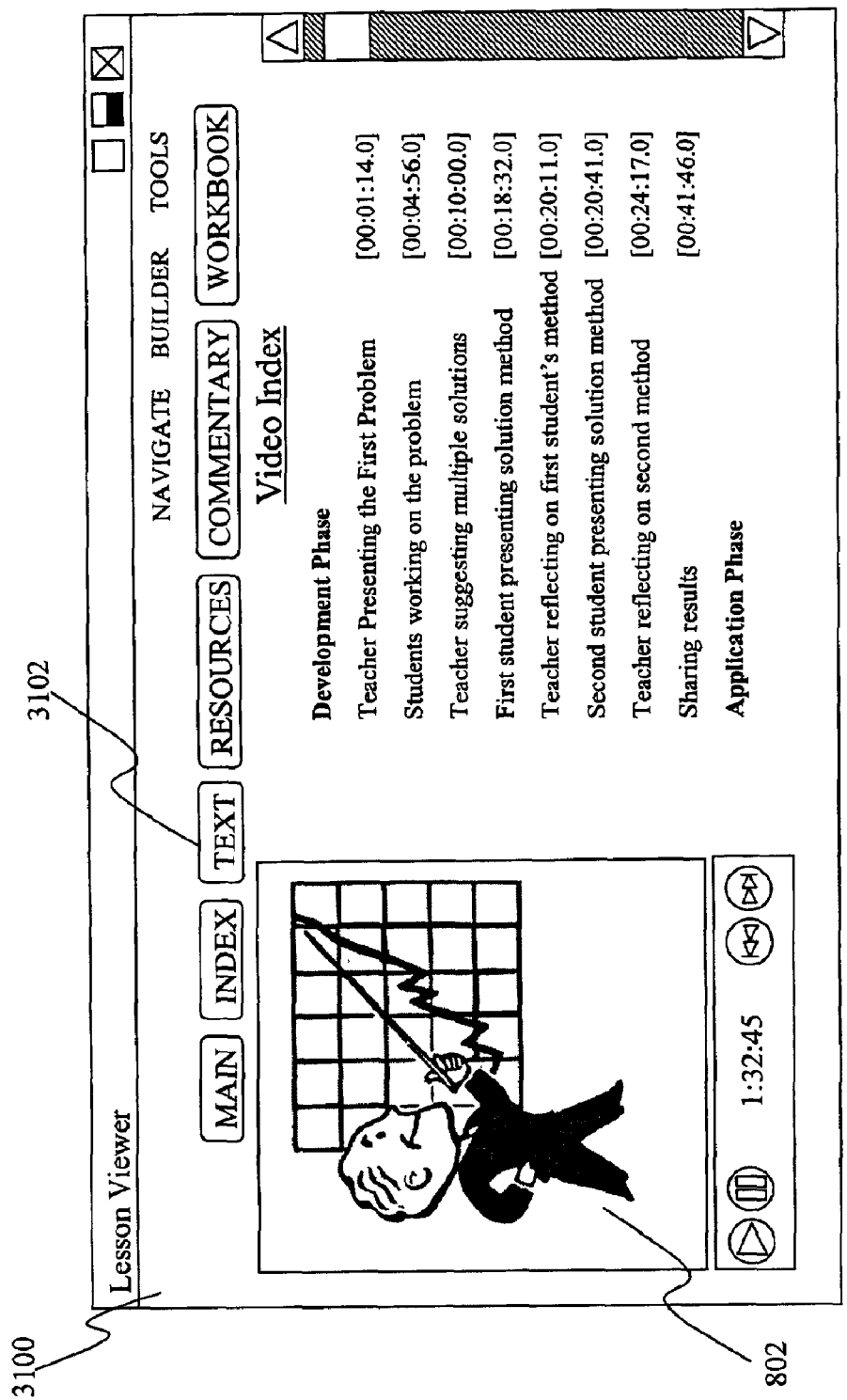
FIG. 31 is a screen shot depicting a video index page for the lesson-viewing program.

Upon pressing the index button 3002, the user is taken to a video index page as shown in FIG. 31. The video index page 3100 displays a textual index to various sections of the video case played in the media player 802. The video index page 3100 is essentially the same as that for the lesson-building program 114, as shown in FIG. 11. The main difference is that in the video index page 3100 of the lesson-viewing program 116, the user is not provided with an opportunity to edit the contents of the video index.

The text button 3102 of the navigation system allows a user to view the time-coded text track of a video case. If text tracks are available in multiple languages, the user may be prompted to select the language of choice. The text track page for the lesson-viewing program 116 is essentially the same as that for the lesson-building program 114, with the same options and settings described relative to FIG. 13.

Figure 32:
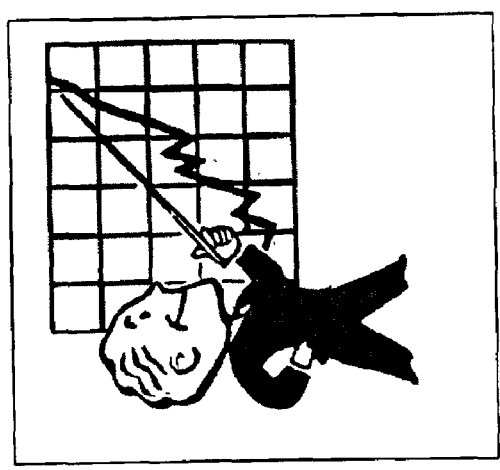
FIG. 32 is a screen shot depicting an embodiment of the resources page for the lesson-viewing program.

An embodiment of the resources page for the lesson-viewing program 116 is shown in FIG. 32. The resources page 3200 is accessed by pressing the resources button of the navigation system, and is very similar to the resources page 1400 of the lesson-building program 114, as shown in FIG. 14, with the exception of the add new resource button 1404. In the lesson-viewing program 116, a user may view, but not alter, the resources available to the user within the lesson.

Figure 33:
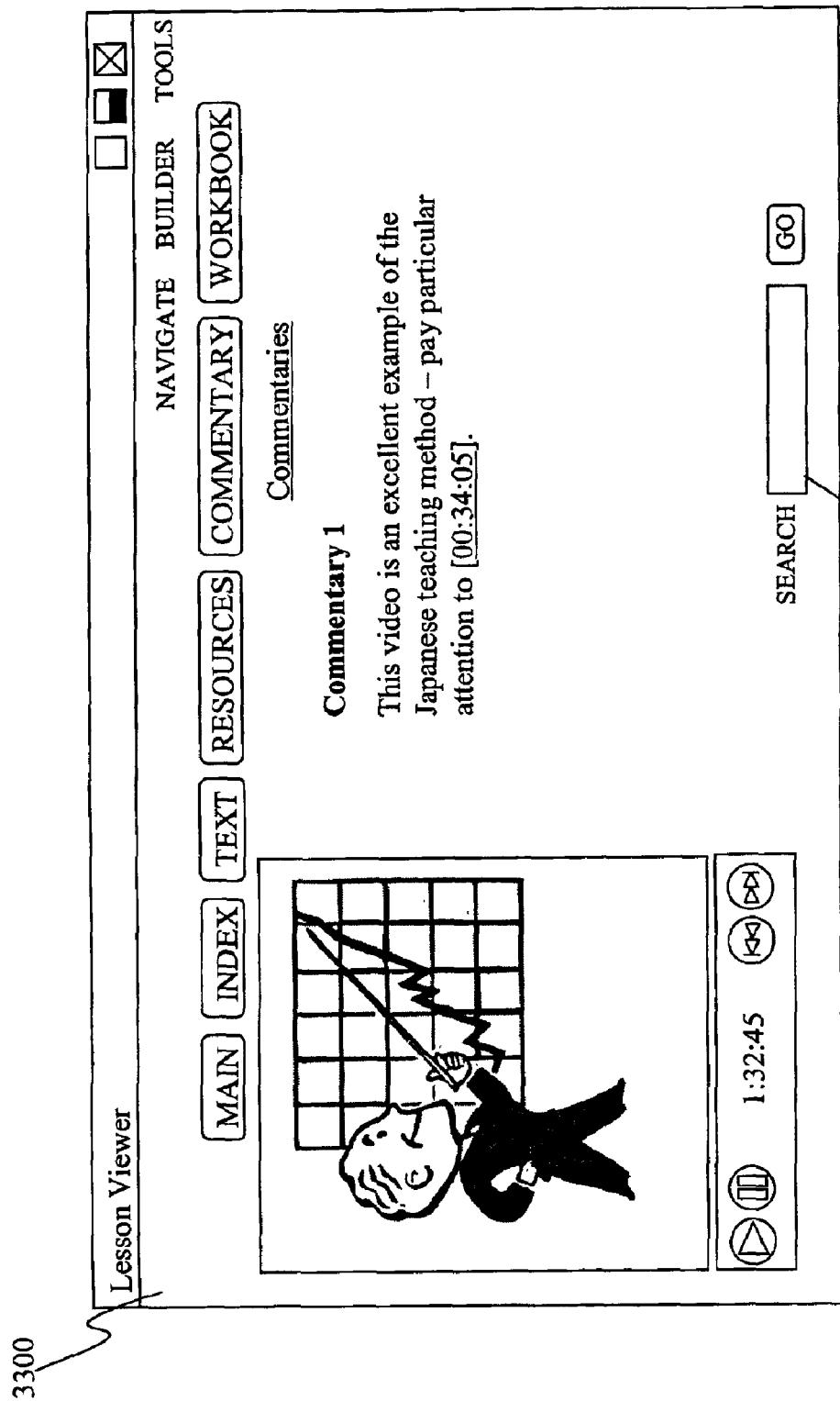
FIG. 33 is a screen shot depicting a commentary page of the lesson-viewing program.

Similarly, the commentary page of the lesson-viewing program 116, which is shown in FIG. 33, is accessible through the commentary button of the navigation system. The commentary page 3300 in the lesson-viewing program 116 typically presents the user with commentary relevant to the lesson they are currently studying. Note that unlike the commentary page 1600 shown for the lesson-building program 114 in FIG. 16, the commentary page 3300 presented for the lesson-viewing program 116 includes a search box 3302 that allows the user to search the commentaries to find comments of interest. Depending on the particular embodiment, a search box may be provided for the lesson-viewing program 116, the lesson-building program 114, or both. The commentaries typically include a commentary title, commentary text, and a time-code for linking to a point of the video case relevant to the commentary.

Figure 34:
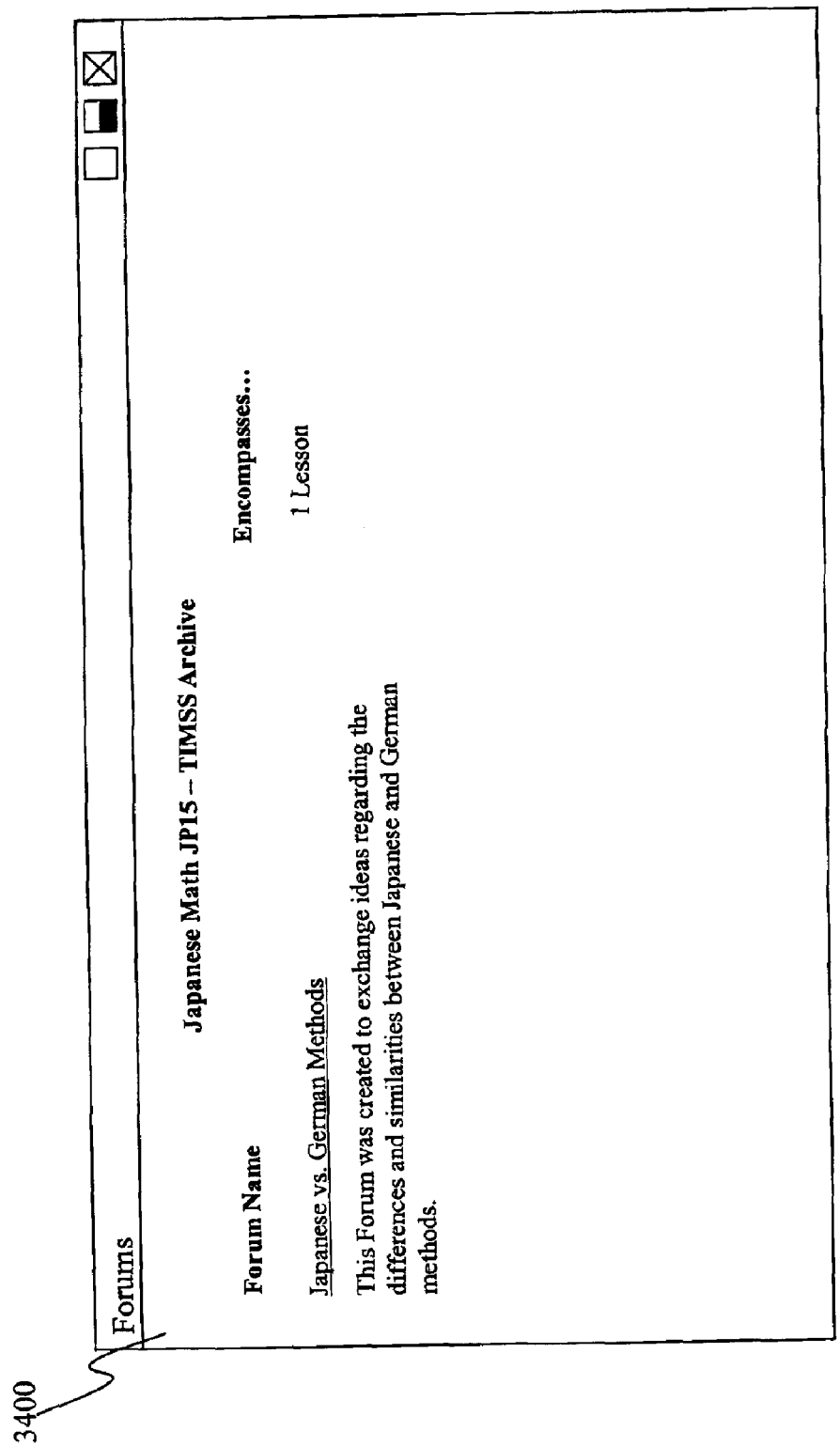
FIG. 34 is a screen shot depicting a forums page of the lesson-viewing program.
Figure 35:
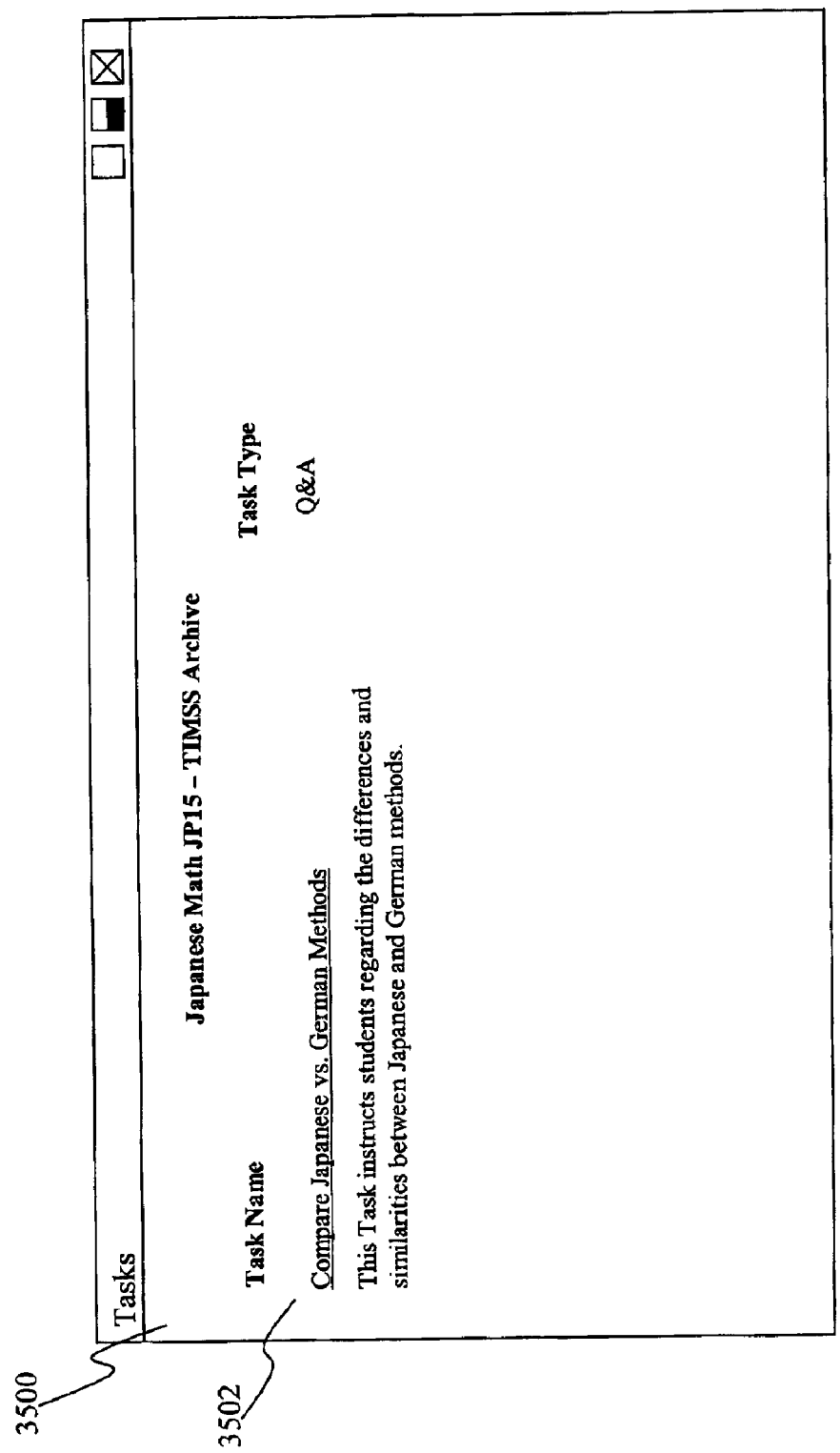
FIG. 35 is a screen shot depicting an exercises page of the lesson-viewing program.

The workbook portion of the lesson-viewing program 116, accessible through the workbook button of the navigation system, allows a user to access forums, exercises, and a user notebook. Examples of pages for forums and exercises are shown in FIG. 34 and FIG. 35, respectively. The user notebook provides a private location for a user to keep notes, including note titles and time-codes to relevant portions of video cases, and is preferably the same for both the lesson-building program 114 and the lesson-viewing program 116. For reference, the user notebook was previously described in the section on the lesson-building program 114 relative to FIG. 23 and FIG. 24.

The forum page 3400, as shown in FIG. 34, provides a list of forums available to the user. The list of forums includes a forum title, a description of the forum, and an indication of the scope of the forum. A link is provided to enable a user to gain access to all of the information posted on the forum. As discussed relative to FIG. 22, a teacher-user designing a forum can provide permissions for a forum that he or she creates. Some forums may be set up as free discussions in which users can add topics and/or respond to the topics created by others. Other forums may be set up as guided discussions, in which only the forum owner can create new topics, but with the users able to respond to the pre-created topics. Depending on the embodiment, the information in the forums can appear as separate pages devoted to the topic of the forum, or the forums page can be a collapsible/expandable list of topics. The forums act as an area for teacher-users and general purpose users to provide information back and forth on particular topics. Depending on the permissions granted to a user, the user may be allowed to create new forum topics or only to post under pre-defined topics.

The exercises page 3500, as shown in FIG. 35 provides a list of exercises 3502 for the user to perform during a lesson. The list of exercises typically includes an exercise name, a brief description of the exercise, and an indication of the exercise type (i.e., exercise and answer or codes, as previously discussed in the lesson-building program 114 section). A link is provided to allow a user to view the entire contents of the exercise. Depending on the specifics of a particular embodiment and on the permissions granted to a user for a particular exercise or on the general settings relative to the particular exercise, the viewing of the exercise results will vary. In some circumstances, after performing an exercise and entering the result, the user may be presented with the results of other students' performance of the exercise. In other circumstances, only the teacher-user may be allowed to view the results of the student entries relative to an exercise. Generally, the results of the exercises are presented to the user or the teacher-user on a separate page. Alternative means of providing the teacher-user with the results of user exercise entries are also envisioned within the scope of the present invention. For example, user exercise entries may be provided to the teacher-user by e-mail or through other electronic means. Additionally, should a grading procedure be used for the user exercise entries, it may be incorporated electronically into the system, or it may be performed manually by the teacher-user.

Figure 36:
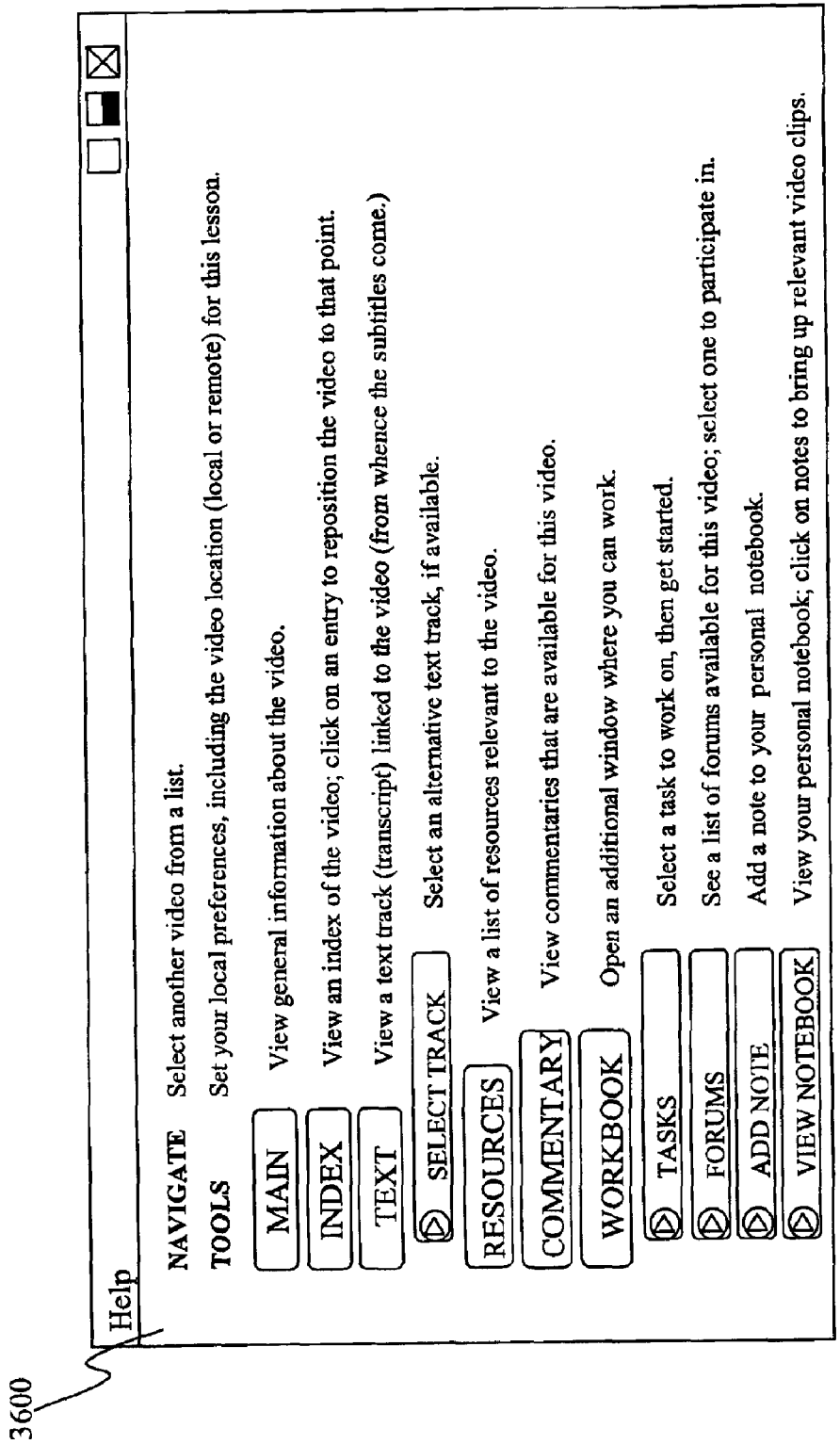
FIG. 36 is a screen shot depicting an example help page of both the lesson-viewing program and the lesson-building program.

In the navigation system for both the lesson-building program 114 and the lesson-viewing program 116, a help link provides a user or teacher-user with access to a help menu in order to define different features of the system. A very simple help page is shown in FIG. 36, in which the various buttons of the navigation system are described. The help page 3600 shown in the figure includes the following descriptions and definitions.

Navigate: Select another video from a list.

Tools: Set your local preferences, including the video location (local or remote) for this lesson.

Main Button: View general information about the video.

Index Button: View an index of the video; click on an entry to reposition the video to that point.

Text Button: View a text track (transcript) linked to the video (from whence the subtitles come).

Select Track Sub-Button: Select an alternative text track, if available.

Resources Button: View a list of resources relevant to the video.

Commentary Button: View commentaries that are available for this video.

Workbook Button: Open an additional window where you can work.

Exercises Sub-Button: Select an exercise to work on, and then get started.

Forums Sub-Button: See a list of forums available for this video; select one to participate in.

Add Note Sub-Button: Add a note to your personal notebook.

View Notebook Sub-Button: View your personal notebook; click on notes to bring up relevant video clips.

Figure 37:
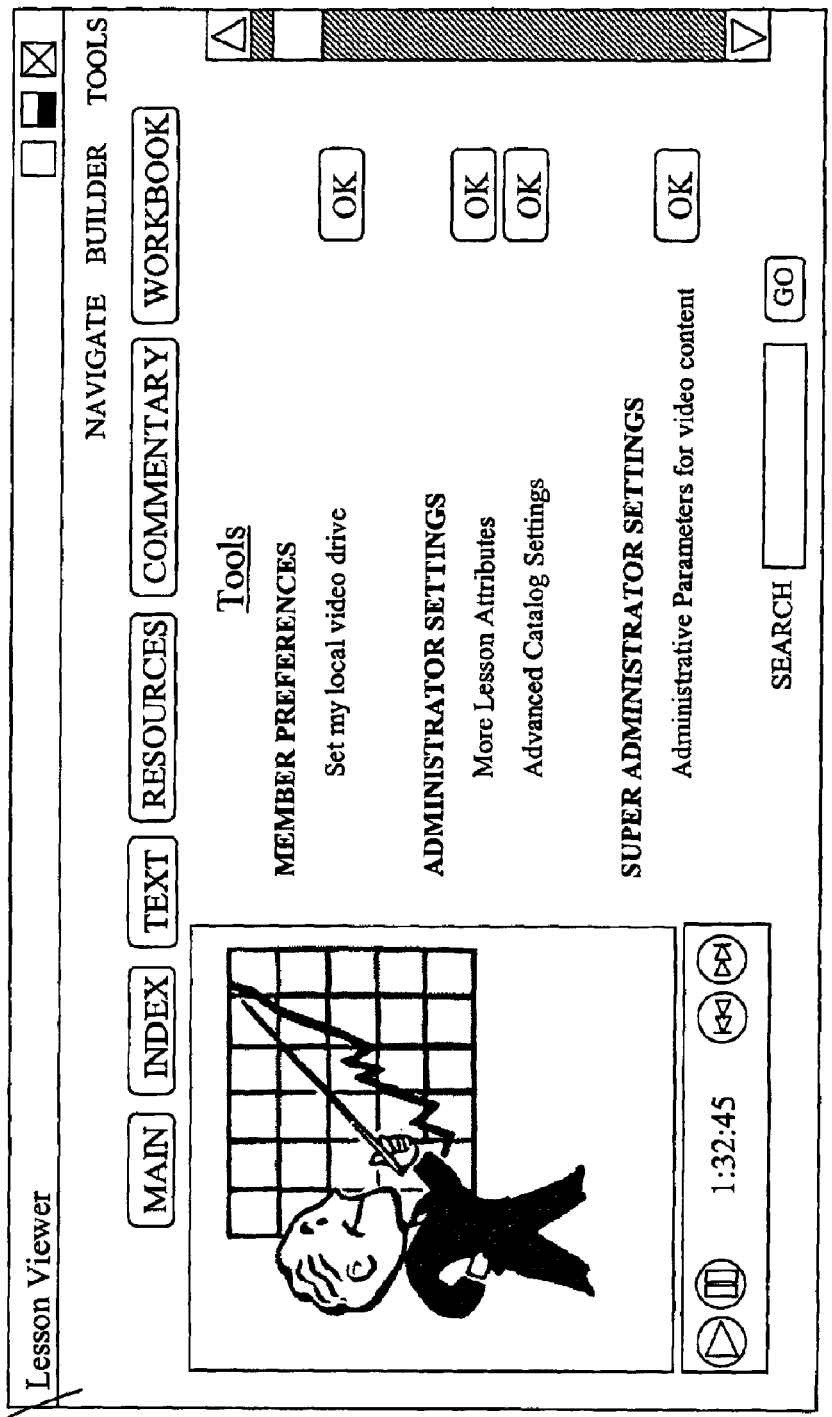
FIG. 37 is a screen shot depicting a tools page as seen in the lesson-viewing program of the present invention.

A set of tools is also accessible via the navigation system, as shown in FIG. 37. The tools page 3700 is similar to the tools page 2600 shown in FIG. 26, relative to the lesson-building program 114, but typically with a more limited set of tools. The tools page 3700, as shown in FIG. 37 includes member preferences including an option to set the local video drive; administrator settings allowing the use to view more lesson attributes and advanced catalog settings; and super administrator settings including administrative parameters for video content. The tools page 3700 for the lesson-viewing program 116 will vary widely depending on the needs of a particular embodiment.

Figure 38:
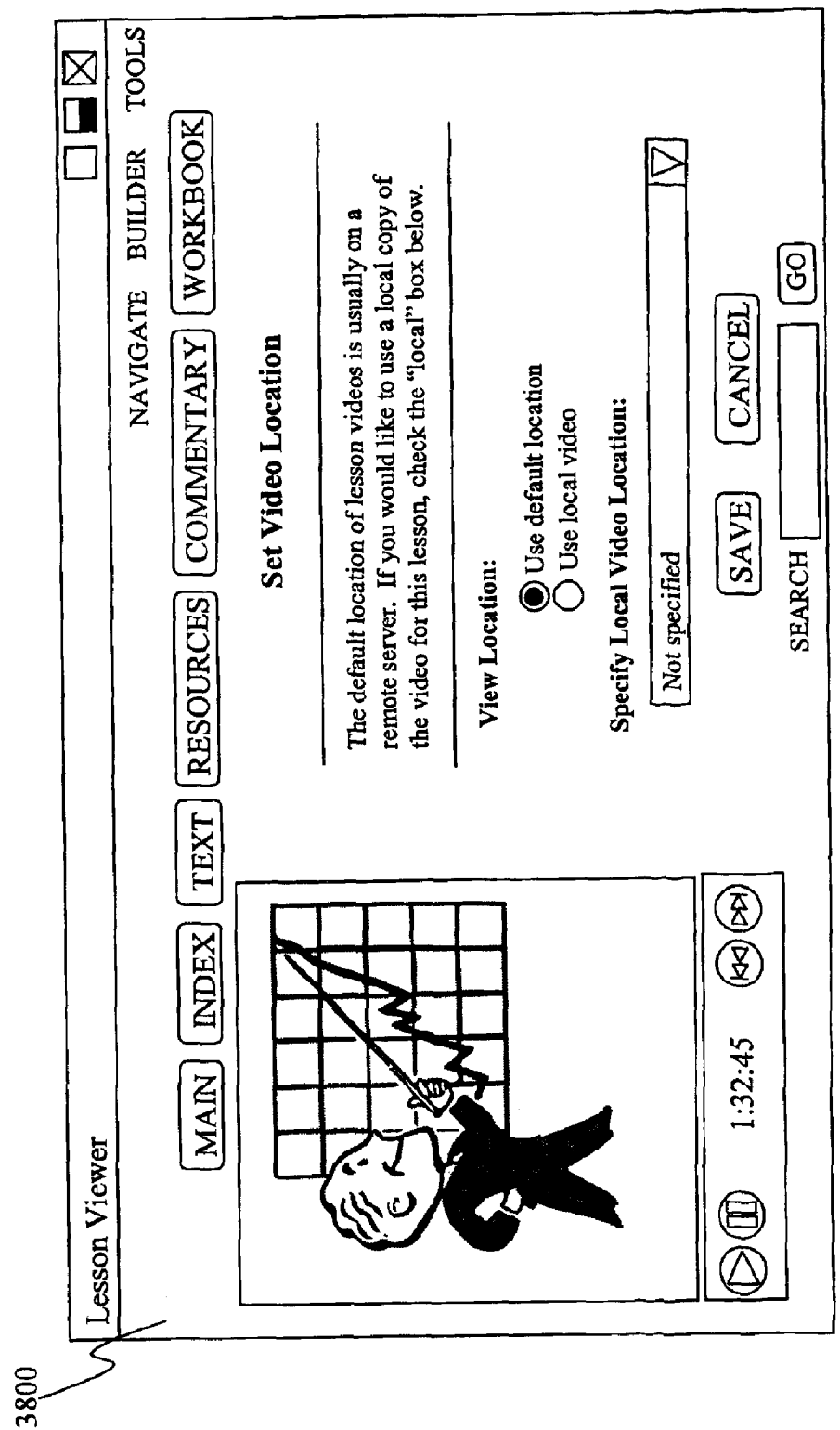
FIG. 38 is a screen shot depicting a page for setting the video location for the lesson-viewing program of the present invention.

The only important tool accessible via the tools page 3700 for the lesson-viewing program 116 is an option for setting the video location, as shown in FIG. 38. The video location setting page 3800 allows a user to either use the default location on the network for a video case or to set a local location for the video. As previously discussed, allowing the user to set a local video case location can help to ensure that the video quality is acceptable and can also conserve network resources, since video transmission requires the greatest bandwidth of any procedure of the system.

Some of the other options provided on the tools page 3700 were described relative to the lesson-building program 114. The other options include options needed by the users to provide limited configuration for the lesson-viewing program 116. Typically, options available to users limit the amount of customization or alteration of the program to that necessary to facilitate the user's activities with a lesson. For example, with respect to the more lesson attributes page 2700, as shown relative to the lesson-building program 114 in FIG. 27, the save button 2702 will be removed for the lesson-viewing program 116 so that a user may view, but not alter, the information in the more lesson attributes page.

The embodiment of the present invention described herein includes several database storage units, a lesson-building program 114, a lesson-viewing program 116, and a plurality of program pages operated either on a single computer system or on a network of computers. Although several configurations and embodiments of the system are described herein, a wide range of modifications may readily be incorporated while staying within the scope of the present invention. Notably, the configuration of the databases and the program pages are presented for convenience, and the exact organization and storage of data for the system as well as the presentation of the program pages are subject to wide modification.

What is claimed is:

1. An interactive, case-based system for video-centric professional development of users by teacher-users, the interactive system comprising:

a. a computer system including a processor for executing programs and a memory for storing programs, with the computer system having at least one display and at least one input element;

b. the computer system further comprising:

i. a media database for storing at least one time-indexed digital video case, optionally at least one time-indexed text track with each text track corresponding to a digital video case, and with the time-indexes of the text track corresponding to time-indexes of the digital video case; the media database further, and optionally, including a time-indexed table of contents for each digital video case, digital resources relevant to each digital video case, and commentary relevant to each digital video case;

ii. a video assignment database for storing at least one video case exercise and at least one video case user response;

iii. an administration database for storing user access permissions and system settings;

iv. a user database for storing personal user notes; and v. a lesson database for storing lessons including a combination of items from the media database, the video assignment database, and the administration database that are organized to create a video-based lesson, and for storing groups of related lessons as courses; and c. a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons; and d. a lesson viewer program for allowing a user to view and navigate through the courses and lessons to select a lesson to perform, to navigate through and view the elements of the lesson to perform, and to provide input into the video assignments in the form of responses to exercises and to view, create, and edit entries into a notebook of personal user notes; and e. wherein the video assignments include request for user input in the form of video-case exercises, video-case responses and video markers, wherein the video-case exercises are exercises with video markers embedded in the exercises, each video marker indicating a starting point and an ending point in a video segment and being linked to the video segment, with the video segment containing subject matter pertinent to an exercise, thereby allowing a user to read the exercise, click on the video marker to position the video segment at the starting point, and thereafter play and view the video segment to its ending point in light of the exercise in order to aid the user in completing the exercise, and wherein the video-case responses allow a user to respond to the exercise with at least one video marker embedded in the response, each video marker indicating a starting point and an ending point in a video segment and being linked to the video segment, with the video segment containing subject matter pertinent to the response, thereby allowing an individual reviewing the response to click on the video marker to position the video segment at the starting point, and thereafter play and view the video segment to its ending point in light of the response, and wherein the video assignments may be configured to allow video case user responses to be viewable only by the user or by a plurality of users and to be applicable to only one digital video case or to a plurality of digital video cases, and wherein video assignments can optionally accommodate the use of file attachments to allow for uploading video case responses from client systems to a server system.

2. An interactive, case-based system for video-centric professional development of users by teacher-users, the interactive system comprising:

a. a computer network including a server system and at least one client system, with the server system and each respective client system including a processor for executing programs, a memory for storing programs, and input and output devices for interconnecting the server system and client systems;

b. at least one of the server system and client systems including at least one display for providing output to a user and a user input device;

c. the server system further comprising:
  i. a media database for storing at least one time-indexed digital video case, optionally at least one time-indexed text track with each text track corresponding to a digital video case, and with the time-indexes in the text tracks corresponding to time-indexes of the digital video case; the media database farther, and optionally, including a time-indexed table of contents for each digital video case, digital resources relevant to each digital video case, and commentary relevant to each digital video case;
  ii. a video assignment database for storing at least one video case exercise and at least one video case user responses;
  iii. an administration database for storing user access permissions and system settings;
  iv. a user database for storing personal user notes; and
  v. a lesson database for storing lessons including a combination of items from the media database, the video assignment database, and the administration database that are organized to create a video-based lesson, and for storing groups of related lessons as courses; and
  vi. a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons; and d. the client computers further including:
  i. a lesson viewer program for allowing a user to view and navigate through the courses and lessons to select a lesson to perform, to navigate through and view the elements of the lesson to perform, and to provide input into the video assignments in the form of responses to exercises and to view, create, and edit entries into a notebook of personal user notes; and e. wherein the video assignments include request for user input in the form of video-case exercises, video-case responses and video markers, wherein the video-case exercises are exercises with video markers embedded in the exercises, each video marker indicating a starting point and an ending point in a video segment and being linked to the video segment, with the video segment containing subject matter pertinent to an exercise, thereby allowing a user to read the exercise, click on the video marker to position the video segment at the starting point, and thereafter play and view the video segment to its ending point in light of the exercise in order to aid the user in completing the exercise, and wherein the video-case responses allow a user to respond to the exercise with at least one video marker embedded in the response, each video marker indicating a starting point and an ending point in a video segment and being linked to the video segment, with the video segment containing subject matter pertinent to the response, thereby allowing an individual reviewing the response to click on the video marker to position the video segment at the starting point, and thereafter play and view the video segment to its ending point in light of the response, and wherein the video assignments may be configured to allow video case user responses to be viewable only by the user or by a plurality of users and to be applicable to only one digital video case or to a plurality of digital video cases, and wherein video assignments can optionally accommodate the use of file attachments to allow for uploading video case responses from the client systems to a server system.

3. An interactive, case-based system for video-centric professional development of teacher-users, as set forth in claim 2, wherein server system further includes a web server system for serving lessons to the client computers, and wherein the lesson viewer program on the client computers is a web browser.

4. An interactive, case-based system for video-centric professional development of teacher-users, as set forth in claim 3, wherein the digital video cases are stored locally on the client systems to minimize the information transfer across the network during lessons.

5. An interactive, case-based system for video-centric professional development of teacher-users as set forth in claim 4, where the digital video cases are provided on a storage medium selected from the group consisting of hard disks, optical disks, magnetic disks, and magnetic tapes.

6. An interactive, case-based system for video-centric professional development of teacher-users as set forth in claim 4, wherein the digital video cases are downloaded from the server system onto the client systems so that they may be played back locally during lessons.

7. An interactive, case-based system for video-centric professional development of teacher-users as set forth in claim 2, wherein the server system further comprises a video and index builder, whereby a teacher-user can build a time-coded text track, a time-coded index, and a time-coded table of contents for a time-coded digital video case.

8. An interactive, case-based system for video-centric professional development of teacher-users as set forth in claim 7, further including means for uploading digital video cases, time-coded text tracks, time-coded indexes, and time-coded tables of contents from the client computers to the server computer for use by a teacher-user in creating a lesson.

9. A client system for an interactive, case-based system for video-centric professional development of users by teacher-users, wherein the interactive system includes a server system including a processor for executing programs, a memory for storing programs, and input and output devices for connecting with at least one client system, the server system further including a media database for storing at least one time-indexed digital video case, optionally at least one time-indexed text tracks with each text track corresponding to a digital video case, and with the time-indexes in the text track corresponding to time-indexes of the digital video case; the media database further, and optionally, including a time-indexed table of contents for each digital video case, digital resources relevant to each digital video case, and commentary relevant to each digital video case; a video assignment database for storing at least one video-case exercise and at least one user response; an administration database for storing user access permissions and system settings; a user database for storing personal user notes; and a lesson database for storing lessons including a combination of items from the media database, the video assignment database, and the administration database that are organized to create a video-based lesson, and for storing groups of related lessons as courses; and a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons, the client computer comprising:

a. a computer system including a processor for executing programs, a memory for storing programs, input and output devices for communicating with the server system, and at least one display for providing output to a user and a user input device; and b. the client computer further including a lesson viewer program for allowing a user to view and navigate through the courses and lessons to select a lesson to perform, to navigate through and view the elements of the lesson to perform, and to provide input into the video assignments in the form of responses to exercises and to view, create, and edit entries into a notebook of personal user notes; and c. wherein the video assignments include request for user input in the form of video-case exercises, video-case responses and video markers, wherein the video-case exercises are exercises with video markers embedded in the exercises, each video marker indicating a starting point and an ending point in a video segment and being linked to the video segment, with the video segment containing subject matter pertinent to an exercise, thereby allowing a user to read the exercise, click on the video marker to position the video segment at the starting point, and thereafter play and view the video segment to its ending point in light of the exercise in order to aid the user in completing the exercise, and wherein the video-case responses allow a user to respond to the exercise with at least one video marker embedded in the response, each video marker indicating a starting point and an ending point in a video segment and being linked to the video segment, with the video segment containing subject matter pertinent to the response, thereby allowing an individual reviewing the response to click on the video marker to position the video segment at the starting point, and thereafter play and view the video segment to its ending point in light of the response, and wherein the video assignments may be configured to allow video case user responses to be viewable only by the user or by a plurality of users and to be applicable to only one digital video case or to a plurality of digital video cases, and wherein video assignments can optionally accommodate the use of file attachments to allow for uploading video case responses from the client systems to a server system.

10. A client system for an interactive, case-based system for video-centric professional development of teacher-users, as set forth in claim 9, wherein the lesson viewer program on the client computers is a web browser.

11. A client system for an interactive, case-based system for video-centric professional development of teacher-users, as set forth in claim 10, wherein the digital video cases are stored locally on the client systems to minimize the information transfer across the network during lessons.

12. A client system for an interactive, case-based system for video-centric professional development of teacher-users as set forth in claim 11, where the digital video cases are provided on a storage medium selected from the group consisting of hard disks, optical disks, magnetic disks, and magnetic tapes.

13. A client system for an interactive, case-based system for video-centric professional development of teacher-users as set forth in claim 11, wherein the digital video cases are downloaded from the server system onto the client systems so that they may be played back locally during lessons.

14. A client system for an interactive, case-based system for video-centric professional development of teacher-users as set forth in claim 9, further including means for uploading digital video cases, time-coded text tracks, time-coded indexes, and time-coded tables of contents from the client computers to the server computer for use by a teacher-user in creating a lesson.

15. A server system for an interactive, case-based system for video-centric professional development of users by teacher-users, wherein the interactive system includes at least one client system, each client system including a processor for executing programs, a memory for storing programs, input and output devices for connecting with the server system, a display for providing output to a user, a user input device, and a lesson viewer program for allowing a user to view and navigate through the courses and lessons to select a lesson to perform, to navigate through and view the elements of the lesson to perform, and to provide input into the video assignments in the form of responses to exercises and to view, create, and edit entries into a notebook of personal user notes, the server system comprising:

a. a computer including a including a processor for executing programs, a memory for storing programs, and input and output devices for interconnecting the server system and client systems;

b. the server system further comprising:
   i. a media database for storing at least one time-indexed digital video case, optionally at least one text tracks with each text track corresponding to a digital video case, and with the time-indexes in the text track corresponding to time-indexes of the digital video case; the media database further, and optionally, including a time-indexed table of contents for each digital video case, digital resources relevant to each digital video case, and commentary relevant to each digital video case;
   ii. a video assignment database for storing at least one video-case exercise and at least one user response;
   iii. an administration database for storing user access permissions and system settings;
   iv. a user database for storing personal user notes; and
   v. a lesson database for storing lessons including a combination of items from the media database, the video assignment database, and the administration database that are organized to create a video-based lesson, and for storing groups of related lessons as courses; and c. a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons; and d. wherein the video assignments include request for user input in the form of video-case exercises, video-case responses and video markers, wherein the video-case exercises are exercises with video markers embedded in the exercises, each video marker indicating a starting point and an ending point in a video segment and being linked to the video segment, with the video segment containing subject matter pertinent to an exercise, thereby allowing a user to read the exercise, click on the video marker to position the video segment at the starting point, and thereafter play and view the video segment to its ending point in light of the exercise in order to aid the user in completing the exercise, and wherein the video-case responses allow a user to respond to the exercise with at least one video marker embedded in the response, each video marker indicating a starting point and an ending point in a video segment and being linked to the video segment, with the video segment containing subject matter pertinent to the response, thereby allowing an individual reviewing the response to click on the video marker to position the video segment at the starting point, and thereafter play and view the video segment to its ending point in light of the response, and wherein the video assignments may be configured to allow video-case responses to be viewable only by the user or by a plurality of users and to be applicable to only one digital video case or to a plurality of digital video cases, and wherein video assignments can optionally accommodate the use of file attachments to allow for uploading video case responses from the client systems to a server system.

16. A server system for an interactive, case-based system for video-centric professional development of teacher-users, as set forth in claim 15, wherein server system further includes a web server system for serving lessons to the client computers, and wherein the lesson viewer program on the client computers is a web browser.

17. A server system for an interactive, case-based system for video-centric professional development of teacher-users, as set forth in claim 16, wherein the digital video cases are stored locally on the client systems to minimize the information transfer across the network during lessons.

18. A server system for an interactive, case-based system for video-centric professional development of teacher-users as set forth in claim 17, where the digital video cases are provided on a storage medium selected from the group consisting of hard disks, optical disks, magnetic disks, and magnetic tapes.

19. A server system for an interactive, case-based system for video-centric professional development of teacher-users as set forth in claim 17, wherein the digital video cases are downloaded from the server system onto the client systems so that they may be played back locally during lessons.

20. A server system for an interactive, case-based system for video-centric professional development of teacher-users as set forth in claim 15, wherein the server system further comprises a video and index builder, whereby a teacher-user can build a time-coded text track, a time-coded index, and a time-coded table of contents for a time-coded digital video case.

21. A server system for an interactive, case-based system for video-centric professional development of teacher-users as set forth in claim 20, further including means for uploading digital video cases, time-coded text tracks, time-coded indexes, and time-coded tables of contents from the client computers to the server computer for use by a teacher-user in creating a lesson.

22. An interactive, case-based method for providing video-centric professional development of users by teacher-users, the method comprising the steps of:

a. providing a computer system including a processor for executing programs and a memory for storing programs, with the computer system having at least one display and an input element;

b. providing a media database on the computer system for storing at least one time-indexed digital video case, optionally at least one text track with each text track corresponding to a digital video case, and with the time-indexes of the video text track corresponding to time-indexes of the digital video case; the media database further, and optionally, including a time-indexed table of contents for each digital video case, digital resources relevant to each digital video case, and case commentary relevant to each digital video case;

c. providing a video assignment database on the computer system for storing at least one video-case exercise and at least one user response;

d. providing an administration database on the computer system for storing user access permissions and system settings;

e. providing a user database on the computer system for storing personal user notes; and providing a lesson database on the computer system for storing lessons including a combination of items from the media database, the video assignment database, and the administration database that are organized to create a video-based lesson, and for storing groups of related lessons as courses;

f. providing a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons; and g. providing a lesson viewer program for allowing a user to view and navigate through the courses and lessons to select a lesson to perform, to navigate through and view the elements of the lesson to perform, and to provide input into the video assignments in the form of responses to exercises and to view, create, and edit entries into a notebook of personal user notes; and h. requesting for user input in the video assignments in the form of video-case exercises, video-case responses and video markers, wherein the video-case exercises are exercises with video markers embedded in the exercises, each video marker indicating a starting point and an ending point in a video segment and being linked to the video segment, with the video segment containing subject matter pertinent to an exercise, thereby allowing a user to read the exercise, click on the video marker to position the video segment at the starting point, and thereafter play and view the video segment to its ending point in light of the exercise in order to aid the user in completing the exercise, and wherein the video-case responses allow a user to respond to the exercise with at least one video marker embedded in the response, each video marker indicating a starting point and an ending point in a video segment and being linked to the video segment, with the video segment containing subject matter pertinent to the response, thereby allowing an individual reviewing the response to click on the video marker to position the video segment at the starting point, and thereafter play and view the video segment to its ending point in light of the response, and wherein the video assignments may be configured to allow video-case responses to be viewable only by the user or by a plurality of users and to be applicable to only one digital video case or to a plurality of digital video cases, and wherein video assignments can optionally accommodate the use of file attachments to allow for uploading video case responses from client systems to a server system.

23. An interactive, case-based method for video-centric professional development of users by teacher-users, the method comprising the steps of:

a. providing a computer network including a server system and at least one client system, with the server system and each respective client system including a processor for executing programs, a memory for storing programs, and input and output devices for interconnecting the server system and client systems, with at least one of the server system and client systems including at least one display for providing output to a user and a user input device;

b. providing, on the server system:
   i. a media database for storing at least one time-indexed digital video case, optionally at least one text track with each text track corresponding to a digital video case, and with the time-indexes in the video text track corresponding to time-indexes of the digital video case; the media database further, and optionally, including a time-indexed table of contents for each digital video case, digital resources relevant to each digital video case, and commentary relevant to each digital video case;
   ii. a video assignment database for storing at least one video-case exercise and at least one user response;
   iii. an administration database for storing user access permissions and system settings;
   iv. a user database for storing personal user notes; and
   v. a lesson database for storing lessons including a combination of items from the media database, the video assignment database, and the administration database that are organized to create a video-based lesson, and for storing groups of related lessons as courses; and
   vi. a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons; and c. providing on the client computers:
   i. a lesson viewer program for allowing a user to view and navigate through the courses and lessons to select a lesson to perform, to navigate through and view the elements of the lesson to perform, and to provide input into the video assignments in the form of responses to exercises and to view, create, and edit entries in a notebook of personal user notes; and d. wherein the video assignments include request for user input in the form of video-case exercises, video-case responses and video markers, wherein the video-case exercises are exercises with video markers embedded in the exercises, each video marker indicating a starting point and an ending point in a video segment and being linked to the video segment, with the video segment containing subject matter pertinent to an exercise, thereby allowing a user to read the exercise, click on the video marker to position the video segment at the starting point, and thereafter play and view the video segment to its ending point in light of the exercise in order to aid the user in completing the exercise, and wherein the video-case responses allow a user to respond to the exercise with at least one video marker embedded in the response, each video marker indicating a starting point and an ending point in a video segment and being linked to the video segment, with the video segment containing subject matter pertinent to the response, thereby allowing an individual reviewing the response to click on the video marker to position the video segment at the starting point, and thereafter play and view the video segment to its ending point in light of the response, and wherein the video assignments may be configured to allow video case user responses to be viewable only by the user or by a plurality of users and to be applicable to only one digital video case or to a plurality of digital video cases, and wherein video assignments can optionally accommodate the use of file attachments to allow for uploading video case responses from the client systems to the server system.

24. An interactive, case-based method for video-centric professional development of teacher-users, as set forth in claim 23, further including the step of providing the server system with a web server system for serving lessons to the client computers, and wherein the lesson viewer program provided on the client computers is a web browser.

25. An interactive, case-based method for video-centric professional development of teacher-users, as set forth in claim 24, wherein the digital video cases are stored locally on the client systems to minimize the information transfer across the network during lessons.

26. An interactive, case-based method for video-centric professional development of teacher-users, as set forth in claim 25, where the digital video cases are provided on a storage medium selected from the group consisting of hard disks, optical disks, magnetic disks, and magnetic tapes.

27. An interactive, case-based method for video-centric professional development of teacher-users, as set forth in claim 25, wherein the digital video cases may be downloaded from the server system onto the client systems so that they can be played back locally during lessons.

28. An interactive, case-based method for video-centric professional development of teacher-users, as set forth in claim 23, further including the step of providing the server system with a video and index builder, whereby a teacher-user can build a time-coded text tracks, a time-coded index, and a time-coded table of contents for a time-coded digital video case.

29. An interactive, case-based method for video-centric professional development of teacher-users, as set forth in claim 28, further including the step of providing means for uploading digital video cases, time-coded text tracks, time-coded indexes, and time-coded tables of contents from the client computers to the server computer for use by a teacher-user in creating a lesson.

30. A method of providing a client system for an interactive, case-based system for video-centric professional development of users by teacher-users, wherein the interactive system includes a server system including a processor for executing programs, a memory for storing programs, and input and output devices for connecting with at least one client system, the server system further including a media database for storing at least one time-indexed digital video case, optionally at least one time-indexed text track with each text track corresponding to a digital video case, and with the time-indexes in the video text tracks corresponding to time-indexes of the digital video case; the media database further, and optionally, including a time-indexed table of contents for each digital video case, digital resources relevant to each digital video case, and commentary relevant to each digital video case; a video assignment database for storing at least one lesson exercise for a user to perform and at least one workbook to store user responses to the lesson exercise; an administration database for storing user access permissions and system settings; a user database for storing personal user notes; and a lesson database for storing lessons including a combination of items from the media database, the video assignment database, and the administration database that are organized to create a video-based lesson, and for storing groups of related lessons as courses; and a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons, the method of providing the client system comprising the steps of:

a. providing a computer system including a processor for executing programs, a memory for storing programs, input and output devices for communicating with the server system, and at least one display for providing output to a user and a user input device; and b. providing, on the client system, a lesson viewer program for allowing a user to view and navigate through the courses and lessons to select a lesson to perform, to navigate through and view the elements of the lesson to perform, and to provide input into the video assignments in the form of responses to video-case exercises and to view, create, and edit entries in a notebook of personal user notes; and c. requesting for user input in the video assignments in the form of video-case exercises, video-case responses and video markers, wherein the video-case exercises are exercises with video markers embedded in the exercise, each video marker indicating a starting point and an ending point in a video segment and being linked to the video segment, with the video segment containing subject matter pertinent to an exercise, thereby allowing a user to read the exercise, click on the video marker to position the video segment at the starting point, and thereafter play and view the video segment to its ending point in light of the exercise in order to aid the user in completing the exercise, and wherein the video-case responses allow a user to respond to the exercise with at least one video marker embedded in the response, each video marker indicating a starting point and an ending point in a video segment and being linked to the video segment, with the video segment containing subject matter pertinent to the response, thereby allowing an individual reviewing the response to click on the video marker to position the video segment at the starting point, and thereafter play and view the video segment to its ending point in light of the response, and wherein the video assignments may be configured to allow video case user responses to be viewable only by the user or by a plurality of users and to be applicable to only one digital video case or to a plurality of digital video cases, and wherein video assignments can optionally accommodate the use of file attachments to allow for uploading video case responses from the client systems to the server system.

31. A method of providing a client system for an interactive, case-based system for video-centric professional development of teacher-users, as set forth in claim 30, wherein the lesson viewer program provided on the client computers is a web browser.

32. A method of providing a client system for an interactive, case-based system for video-centric professional development of teacher-users, as set forth in claim 31, further including the step of providing means whereby digital video cases may be stored locally on the client systems to minimize the information transfer across the network during lessons.

33. A method of providing a client system for an interactive, case-based system for video-centric professional development of teacher-users as set forth in claim 32, where the digital video cases are provided on a storage medium selected from the group consisting of hard disks, optical disks, magnetic disks, and magnetic tapes.

34. A method of providing a client system for an interactive, case-based system for video-centric professional development of teacher-users as set forth in claim 32, further including the step of providing means by which the digital video cases may be downloaded from the server system onto the client systems so that they may be played back locally during lessons.

35. A method of providing a client system for an interactive, case-based system for video-centric professional development of teacher-users as set forth in claim 30, further including the step of providing means for uploading digital video cases, time-coded text tracks, time-coded indexes, and time-coded tables of contents from the client computers to the server computer for use by a teacher-user in creating a lesson.

36. A method for providing a server system for an interactive, case-based system for video-centric professional development of users by teacher-users, wherein the interactive system includes at least one client system, each client system including a processor for executing programs, a memory for storing programs, input and output devices for connecting with the server system, a display for providing output to a user, a user input device, and a lesson viewer program for allowing a user to view and navigate through the courses and lessons to select a lesson to perform, to navigate through and view the elements of the lesson to perform, and to provide input into the video assignments in the form of responses to exercises and to view, create, and edit entries in a notebook of personal user notes, the method of providing the server system comprising:

a. providing a computer including a including a processor for executing programs, a memory for storing programs, and input and output devices for interconnecting the server system and client systems;

b. providing the server system with:
  i. a media database for storing at least one time-indexed digital video case, optionally at least one time-indexed text track with each text track corresponding to a digital video case, and with the time-indexes in the video text tracks corresponding to time-indexes of the digital video case; the media database further, and optionally, including a time-indexed table of contents for each digital video case, digital resources relevant to each digital video case, and commentary relevant to each digital video case;
  ii. a video assignment database for storing at least one video-case exercise and at least one user response;
  iii. an administration database for storing user access permissions and system settings;
  iv. a user database for storing personal user notes; and
  v. a lesson database for storing lessons including a combination of items from the media database, the video assignment database, and the administration database that are organized to create a video-based lesson, and for storing groups of related lessons as courses; and c. a lesson building program for allowing a teacher-user to combine elements from the media database, the video assignment database, and the administration database to create a case-based video lesson therefrom and to store the lessons within the lesson database, the lesson building program further allowing the teacher-user to add elements to, to delete elements from, and to alter elements within the media database, the video assignment database, and the administration database; the lesson building program further allowing the teacher-user to organize lessons and exercises to create courses, each including a plurality of lessons; and d. wherein the video assignments include request for user input in the form of video-case exercises, video-case responses and video markers, wherein the video-case exercises are exercises with video markers embedded in the exercises, each video marker indicating a starting point and an ending point in a video segment and being linked to the video segment, with the video segment containing subject matter pertinent to an exercise, thereby allowing a user to read the exercise, click on the video marker to position the video segment at the starting point, and thereafter play and view the video segment to its ending point in light of the exercise in order to aid the user in completing the exercise, and wherein the video-case responses allow a user to respond to the exercise with at least one video marker embedded in the response, each video marker indicating a starting point and an ending point in a video segment and being linked to the video segment, with the video segment containing subject matter pertinent to the response, thereby allowing an individual reviewing the response to click on the video marker to position the video segment at the starting point, and thereafter play and view the video segment to its ending point in light of the response, and wherein the video assignments may be configured to allow video-case responses to be viewable only by the user or by a plurality of users and to be applicable to only one digital video case or to a plurality of digital video cases, and wherein video assignments can optionally accommodate the use of file attachments to allow for uploading video case responses from the client systems to the server system.

37. A method for providing a server system for an interactive, case-based system for video-centric professional development of teacher-users, as set forth in claim 36, further comprising the step of providing the server system with a web server system for serving lessons to the client computers, and wherein the lesson viewer program on the client computers is a web browser.

38. A method for providing a server system for an interactive, case-based system for video-centric professional development of teacher-users, as set forth in claim 37, further comprising means for storing the digital video cases locally on the client systems to minimize the information transfer across the network during lessons.

39. A method for providing a server system for an interactive, case-based system for video-centric professional development of teacher-users as set forth in claim 38, where the digital video cases are provided on a storage medium selected from the group consisting of hard disks, optical disks, magnetic disks, and magnetic tapes.

40. A method for providing a server system for an interactive, case-based system for video-centric professional development of teacher-users as set forth in claim 38, further comprising the step of providing means for downloading the digital video cases from the server system onto the client systems so that they may be played back locally during lessons.

41. A method for providing a server system for an interactive, case-based system for video-centric professional development of teacher-users as set forth in claim 36, further comprising the step of providing the server system with a video and index builder, whereby a teacher-user can build a time-coded text track, a time-coded index, and a time-coded table of contents for a time-coded digital video case.

42. A method for providing a server system for an interactive, case-based system for video-centric professional development of teacher-users as set forth in claim 41, further comprising the step of providing means for uploading digital video cases, time-coded text tracks, time-coded indexes, and time-coded tables of contents from the client computers to the server computer for use by a teacher-user in creating a lesson.

* * * * *